(12) United States Patent
Yoshimoto

(10) Patent No.: US 12,471,402 B2
(45) Date of Patent: Nov. 11, 2025

(54) IMAGING APPARATUS, MANUFACTURING METHOD THEREOF, AND ELECTRONIC EQUIPMENT

(71) Applicant: SONY SEMICONDUCTOR SOLUTIONS CORPORATION, Kanagawa (JP)

(72) Inventor: Nao Yoshimoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 768 days.

(21) Appl. No.: 17/756,388

(22) PCT Filed: Dec. 2, 2020

(86) PCT No.: PCT/JP2020/044865
§ 371 (c)(1),
(2) Date: May 24, 2022

(87) PCT Pub. No.: WO2021/112128
PCT Pub. Date: Jun. 10, 2021

(65) Prior Publication Data
US 2022/0399391 A1 Dec. 15, 2022

(30) Foreign Application Priority Data
Dec. 3, 2019 (JP) .................... 2019-219032

(51) Int. Cl.
*H10F 39/00* (2025.01)
*H10F 39/18* (2025.01)

(52) U.S. Cl.
CPC ......... *H10F 39/812* (2025.01); *H10F 39/014* (2025.01); *H10F 39/024* (2025.01);
(Continued)

(58) Field of Classification Search
None
See application file for complete search history.

(56) References Cited

U.S. PATENT DOCUMENTS

2014/0131779 A1 5/2014 Takeda
2015/0069471 A1 3/2015 Kawamura
(Continued)

FOREIGN PATENT DOCUMENTS

CN 103811507 A 5/2014
CN 104425535 A 3/2015
(Continued)

OTHER PUBLICATIONS

International Search Report and Written Opinion of PCT Application No. PCT/JP2020/044865, issued on Feb. 22, 2021, 13 pages of ISRWO.

*Primary Examiner* — Zandra V Smith
*Assistant Examiner* — Molly K Reida
(74) *Attorney, Agent, or Firm* — CHIP LAW GROUP

(57) ABSTRACT

An imaging apparatus includes a semiconductor substrate, a photoelectric conversion unit in the semiconductor substrate and generates charge corresponding to the amount of received light by photoelectric conversion, a charge holding unit on a side closer to a first surface of the semiconductor substrate than to the photoelectric conversion unit, and holds the charge transferred from the photoelectric conversion unit, a charge transfer unit which transfers the charge from the photoelectric conversion unit to the charge holding unit, a vertical electrode in a depth direction of the semiconductor substrate, the vertical electrode transmitting the charge generated by the photoelectric conversion unit to the charge transfer unit, and a first light control member at a position overlapping the vertical electrode when the semiconductor substrate is seen in a plan view from a normal direction of
(Continued)

the first surface, and in a pixel region without straddling a boundary between pixels.

20 Claims, 59 Drawing Sheets

(52) U.S. Cl.
CPC ........... *H10F 39/18* (2025.01); *H10F 39/803* (2025.01); *H10F 39/80373* (2025.01); *H10F 39/806* (2025.01); *H10F 39/011* (2025.01)

(56) References Cited

U.S. PATENT DOCUMENTS

| | | | |
|---|---|---|---|
| 2017/0203954 A1 | 7/2017 | Zhang et al. | |
| 2018/0033809 A1 | 2/2018 | Tayanaka et al. | |
| 2018/0213174 A1 | 7/2018 | Sano | |
| 2019/0088701 A1 | 3/2019 | Mizuta et al. | |
| 2022/0150428 A1* | 5/2022 | Kido | H04N 25/77 |

FOREIGN PATENT DOCUMENTS

| | | |
|---|---|---|
| CN | 107431075 A | 12/2017 |
| CN | 107851655 A | 3/2018 |
| CN | 108701704 A | 10/2018 |
| CN | 109983581 A | 7/2019 |
| CN | 110313067 A | 10/2019 |
| EP | 3196617 A1 | 7/2017 |
| EP | 3432358 A1 | 1/2019 |
| EP | 3447801 A1 | 2/2019 |
| EP | 3552236 A1 | 10/2019 |
| JP | 2013-098446 A | 5/2013 |
| JP | 2014-096490 A | 5/2014 |
| JP | 2015-053411 A | 3/2015 |
| JP | 2017-168566 A | 9/2017 |
| JP | 2018-093126 A | 6/2018 |
| JP | 2018-148039 A | 9/2018 |
| JP | 2020-047616 A | 3/2020 |
| JP | 2020-077650 A | 5/2020 |
| KR | 10-2019-0089843 A | 7/2019 |
| KR | 10-2019-0119050 A | 10/2019 |
| WO | 2013/065569 A1 | 5/2013 |
| WO | 2016/136486 A1 | 9/2016 |
| WO | 2017/159361 A1 | 9/2017 |
| WO | 2017/183477 A1 | 10/2017 |
| WO | 2018/105359 A1 | 6/2018 |
| WO | 2018/163732 A1 | 9/2018 |
| WO | 2019/240207 A1 | 12/2019 |
| WO | 2020/054545 A1 | 3/2020 |
| WO | 2020/095674 A1 | 5/2020 |
| WO | 2020/195825 A1 | 10/2020 |

* cited by examiner (a)

| ETCHING ORIENTATION | ELEMENT FORMATION PLANE | | | | | | | |
|---|---|---|---|---|---|---|---|---|
| | (111) | (-111) | (1-11) | (11-1) | (-1-11) | (-11-1) | (1-1-1) | (-1-1-1) |
| [110] | | ○ | | | | | ○ | |
| [101] | | ○ | | | | | ○ | |
| [011] | | | ○ | | | ○ | | |
| [-110] | ○ | | ○ | | ○ | | | |
| [1-10] | ○ | | | ○ | ○ | | | |
| [-101] | ○ | | ○ | ○ | | | | |
| [10-1] | ○ | | | ○ | | ○ | | |
| [0-11] | ○ | ○ | | | | | | ○ |
| [01-1] | ○ | ○ | | | | | | ○ |
| [-1-10] | | ○ | | | | ○ | ○ | ○ |
| [-10-1] | | ○ | | | ○ | | ○ | ○ |
| [0-1-1] | | | ○ | ○ | | ○ | | ○ |

IMAGING APPARATUS, MANUFACTURING METHOD THEREOF, AND ELECTRONIC EQUIPMENT

CROSS REFERENCE TO RELATED APPLICATIONS

This application is a U.S. National Phase of International Patent Application No. PCT/JP2020/044865 filed on Dec. 2, 2020, which claims priority benefit of Japanese Patent Application No. JP 2019-219032 filed in the Japan Patent Office on Dec. 3, 2019. Each of the above-referenced applications is hereby incorporated herein by reference in its entirety.

TECHNICAL FIELD

The present disclosure relates to an imaging apparatus for performing imaging based on photoelectric conversion, a manufacturing method thereof, and electronic equipment.

BACKGROUND ART

An imaging apparatus that is compatible with a global shutter system in which all pixels are imaged at the same timing is known (see PTL 1). This type of imaging apparatus includes a charge holding unit that accumulates charge accumulated in a photoelectric conversion unit, and a vertical gate electrode for efficiently transferring charge after photoelectric conversion performed by the photoelectric conversion unit to the charge holding unit, for each pixel.

CITATION LIST

Patent Literature

[PTL 1]
  WO 2016/136486

SUMMARY

Technical Problem

Light being incident on a vertical gate electrode results in noise, and thus a light shielding portion may be provided at a location where the vertical gate electrode is covered. Such a type of light shielding portion is formed to extend in a horizontal direction from a boundary region of a pixel. That is, the light shielding portion is formed with the boundary region of the pixel as a reference, and thus a location where the light shielding portion is provided is restricted. In addition, the vertical gate electrode has to be disposed in accordance with the position of the light shielding portion, and thus a location where the vertical gate electrode is disposed is also restricted when a location where the light shielding portion is disposed is restricted.

The present disclosure provides an imaging apparatus capable of suppressing noise, color mixture, and the like while reducing a restriction on layout disposition, a manufacturing method thereof, and electronic equipment.

Solution to Problem

In order to solve the above-described problem, the present disclosure provides an imaging apparatus including a semiconductor substrate, a photoelectric conversion unit which is provided in the substrate and generates charge corresponding to the amount of light received by photoelectric conversion, a charge holding unit which is disposed on a side closer to a first surface of the substrate than to the photoelectric conversion unit, and holds the charge transferred from the photoelectric conversion unit, a charge transfer unit which transfers the charge from the photoelectric conversion unit to the charge holding unit, a vertical electrode which is disposed in a depth direction of the substrate, the vertical electrode transmitting the charge generated by the photoelectric conversion unit to the charge transfer unit, and a first light control member which is disposed at a position overlapping the vertical electrode when the substrate is seen in a plan view from a normal direction of the first surface, and is provided in a pixel region without straddling a boundary between pixels.

The first light control member may include a first light control portion which is disposed along the second surface on a side closer to a second surface of the substrate on a side opposite to the first surface than to the vertical electrode, and a second light control portion which is connected to the first light control portion and extends in the depth direction of the substrate.

The second light control portion may be provided inside the photoelectric conversion unit in the pixel region, and
  the first light control portion may be separately provided for each pixel.

The imaging apparatus may further include an element separation portion which extends in the depth direction of the substrate along the boundary between the pixels,
  in which the first light control portion and the second light control portion may be disposed in the pixel region surrounded by the element separation portion.

The semiconductor substrate may have a crystal plane of silicon represented by plane indices {111}, and
  the first light control portion may include
  a first light control surface which is disposed in a first direction different from the depth direction of the substrate, and is disposed along a first crystal plane represented by a plane index (111), and
  a second light control surface which is disposed in a second direction different from the depth direction of the substrate, and is disposed along a second crystal plane represented by a plane index (111).

A plurality of the vertical electrodes may be provided for each pixel, and the first light control portion may be disposed at a position overlapping the plurality of vertical electrodes when the substrate is seen in a plan view from the normal direction of the first surface.

An end side of the first light control portion may be disposed substantially parallel to an end side of the second light control portion when the substrate is seen in a plan view from the normal direction of the first surface.

An end side of the charge holding unit may be disposed substantially in parallel with a least one of the end side of the first light control portion and the end side of the second light control portion when the substrate is seen in a plan view from the normal direction of the first surface.

The second light control portion may be disposed in the depth direction of the substrate toward the first light control portion from the second surface side.

The second light control portion may be disposed in the depth direction of the substrate toward the first light control portion from the first surface side.

The first light control portion may have a shape corresponding to an extension direction, extension length, and number of second light control portions.

One end portion of the second light control portion may be connected to the first light control portion.

The second light control portion may be disposed in the depth direction of the substrate so as to penetrate the first light control portion.

At least one of the first light control portion and the second light control portion may have a property of absorbing or reflecting incident light.

At least one of the first light control portion and the second light control portion may include an insulator, a metal, polysilicon, a metal oxide, a carbon-containing material, or an electrochromic material.

The imaging apparatus may further include a second light control member which is disposed on a side closer to the first surface of the substrate than to the first light control member and is disposed to surround the charge holding unit.

The second light control member may include
a third light control portion which is disposed along a direction of the first surface, and
a fourth light control portion which is connected to the third light control portion and is disposed in a direction intersecting the third light control portion.

One end portion of the fourth light control portion may be connected to the third light control portion, and the other end portion of the fourth light control portion may be disposed along the first surface.

The fourth light control portion may penetrate the third light control member and extend in the depth direction of the substrate.

In another aspect of the present disclosure, provided is an imaging apparatus manufacturing method including a step of forming a photoelectric conversion unit in a semiconductor substrate, the photoelectric conversion unit generating charge corresponding to the amount of received light by photoelectric conversion,
   a step of forming a charge holding unit that holds the charge transferred from the photoelectric conversion unit on a side closer to a first surface of the substrate than to the photoelectric conversion unit,
   a step of forming a charge transfer unit that transfers the charge from the photoelectric conversion unit to the charge holding unit,
   a step of forming a vertical electrode in a depth direction of the substrate, the vertical electrode transmitting the charge generated by the photoelectric conversion unit to the charge transfer unit, and
   a step of forming a first light control member which is disposed at a position overlapping the vertical electrode when seen in a plan view from a normal direction of the first surface of the substrate, and is provided in a pixel region without straddling a boundary between pixels.

In still another aspect of the present disclosure, provided is electronic equipment including an imaging apparatus, in which the imaging apparatus includes
   a semiconductor substrate,
   a photoelectric conversion unit which is provided in the substrate and generates charge corresponding to the amount of received light by photoelectric conversion,
   a charge holding unit which is disposed on a side closer to a first surface of the substrate than to the photoelectric conversion unit, and holds the charge transferred from the photoelectric conversion unit,
   a charge transfer unit which transfers the charge from the photoelectric conversion unit to the charge holding unit,
   a vertical electrode which is disposed in a depth direction of the substrate, the vertical electrode transmitting the charge generated by the photoelectric conversion unit to the charge transfer unit, and
   a first light control member which is disposed at a position overlapping the vertical electrode when the substrate is seen in a plan view from a normal direction of the first surface, and is provided in a pixel region without straddling a boundary between pixels.

BRIEF DESCRIPTION OF DRAWINGS

FIG. 20 is a diagram illustrating a specific combination of a plane and an orientation that establish etching in a <110> direction in a {111} plane.

DESCRIPTION OF EMBODIMENTS

First Embodiment

Hereinafter, embodiments of the present disclosure will be described in detail. An imaging apparatus according to the present disclosure is a backside irradiation-type image sensor using, for example, a complementary metal oxide semiconductor (CMOS) image sensor. The imaging apparatus according to the present disclosure receives light from a subject for each pixel and performs photoelectric conversion thereon to generate a pixel signal which is an electric signal.

The imaging apparatus of the present disclosure may be a global shutter system or a rolling shutter system. The global shutter system is a system in which the exposure of all pixels is started and ends at the same time. Here, all pixels indicate all pixels forming an effective image, and dummy pixels and the like that do not contribute to image formation are excluded. In addition, the starting and ending need not necessarily be performed at the same time as long as image distortion and a difference in exposure time are sufficiently small to such an extent that no problem occurs. A case where an operation of performing simultaneous exposure in units of a plurality of rows (several tens of rows, or the like) is repeated with a shift in units of a plurality of rows in a row direction, for example, is also included in the global shutter system. In addition, a case where simultaneous exposure is performed only on a portion of the pixel region is also included in the global shutter system. On the other hand, the rolling shutter system is a system in which the start and ending of exposure are performed for each pixel line. In the global shutter system, a charge holding unit (MEM) 54 in which pixel signals for all pixels are accumulated is necessary, but is not necessary in the rolling shutter system. In addition, a light shielding portion for preventing light from being incident on the charge holding unit (MEM) 54 is also made unnecessary by omitting the charge holding unit (MEM) 54, whereby it is possible to simplify a device structure of an imaging apparatus. Hereinafter, the imaging apparatus of the global shutter system will be mainly described.

The backside irradiation-type image sensor is an image sensor in which a photoelectric conversion unit such as a photodiode that receives light from a subject and converts the light into an electric signal is disposed for each pixel between a light receiving surface on which light from the subject is incident and a wiring layer in which a wiring of a transistor or the like for driving each pixel is provided. Note that the present disclosure is able to be applied to an image sensor of an imaging system other than the CMOS image sensor.

Figure 1:
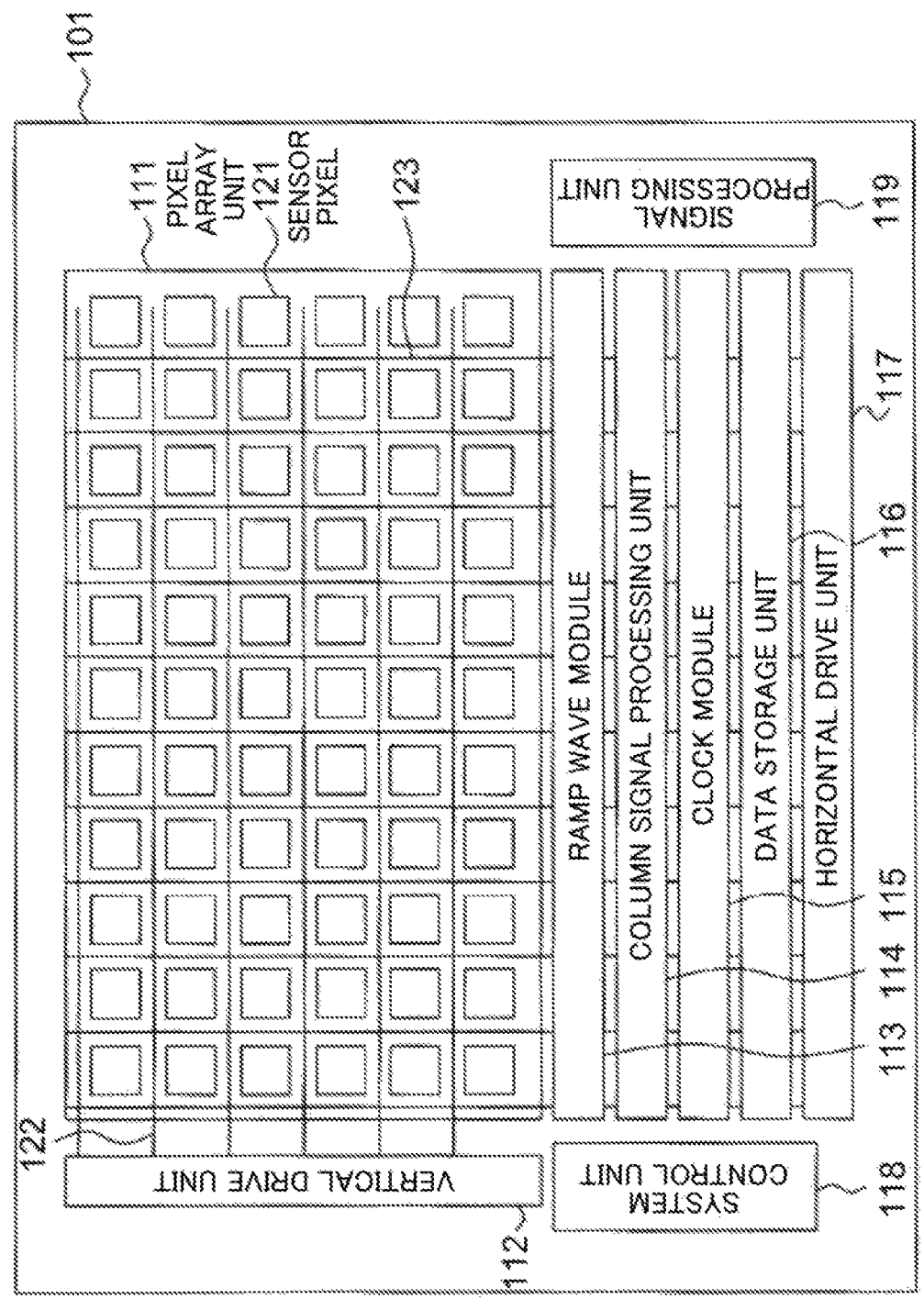
FIG. 1 is a block diagram illustrating a schematic configuration of an imaging apparatus 101 according to a first embodiment of the present disclosure.

FIG. 1 is a block diagram illustrating a schematic configuration of an imaging apparatus 101 according to a first embodiment of the present disclosure. Although the imaging apparatus 101 in FIG. 1 is accurately a solid imaging apparatus 101 since the imaging apparatus 101 is formed on a semiconductor substrate 11, it will simply be referred to as an imaging apparatus 101 below. The imaging apparatus 101 in FIG. 1 includes a pixel array unit 111 in which a plurality of sensor pixels 121 that perform photoelectric conversion are disposed in a matrix shape, namely a two-dimensional planar shape. The sensor pixels 121 correspond to one specific example of the "pixels" according to the present disclosure. A pixel signal after photoelectric conversion in the pixel array unit 111 is read via a reading circuit.

The imaging apparatus 101 includes, for example, a pixel array unit 111, a vertical drive unit 112, a ramp wave module 113, a column signal processing unit 114, a clock module 115, a data storage unit 116, a horizontal drive unit 117, a system control unit 118, and a signal processing unit 119.

The imaging apparatus 101 is configured by a single or a plurality of semiconductor substrates 11. For example, the imaging apparatus 101 can be configured by electrically connecting, to the semiconductor substrate 11 on which the pixel array unit 111 is formed, another semiconductor substrate 11 on which the vertical drive unit 112, the ramp wave module 113, the column signal processing unit 114, the clock module 115, the data storage unit 116, the horizontal drive unit 117, the system control unit 118, the signal processing unit 119, and the like are formed through Cu—Cu bonding or the like.

The pixel array unit 111 includes a plurality of sensor pixels 121 including photoelectric conversion elements that generate and accumulate charge in accordance with the amount of light that is incident from a subject. The sensor pixels 121 are aligned in the lateral direction (row direction) and the longitudinal direction (column direction) as illustrated in FIG. 1. In the pixel array unit 111, a pixel drive line 122 is arranged along the row direction for each pixel row including sensor pixels 121 aligned in one line in the row direction, and a vertical signal line 123 is arranged along the column direction for each pixel column including sensor pixels 121 aligned in one line in the column direction.

The vertical drive unit 112 includes a shift resister, an address decoder, or the like. The vertical drive unit 112 causes all the plurality of sensor pixels 121 in the pixel array unit 111 to be driven at the same time or in units of pixel rows by supplying a signal or the like to each of the plurality of sensor pixels 121 via the plurality of pixel drive lines 122.

The ramp wave module 113 generates a ramp wave signal used for analog/digital (A/D) conversion of the pixel signal and supplies the ramp wave signal to the column signal processing unit 114. The column signal processing unit 114 includes, for example, a shift resister, an address decoder, or the like and performs noise removal processing, correlated double sampling processing, A/D conversion processing, and the like to generate a pixel signal. The column signal processing unit 114 supplies the generated pixel signal to the signal processing unit 119.

The clock module 115 supplies a clock signal for an operation to each component of the imaging apparatus 101.

The horizontal drive unit 117 selects unit circuits of the column signal processing unit 114 corresponding to the pixel columns in order. The pixel signal after signal processing performed thereon for each unit circuit in the column signal processing unit 114 is output to the signal processing unit 119 in order through selective scanning performed by the horizontal drive unit 117.

The system control unit 118 includes a timing generator or the like that generates various timing signals. The system control unit 118 controls driving of the vertical drive unit 112, the ramp wave module 113, the column signal processing unit 114, the clock module 115, and the horizontal drive unit 117 on the basis of the timing signals generated by the timing generator.

The signal processing unit 119 performs signal processing such as an arithmetic operation on a pixel signal supplied from the column signal processing unit 114 while temporarily storing data in the data storage unit 116 as needed and outputs an image signal including each pixel signal.

Figure 2:
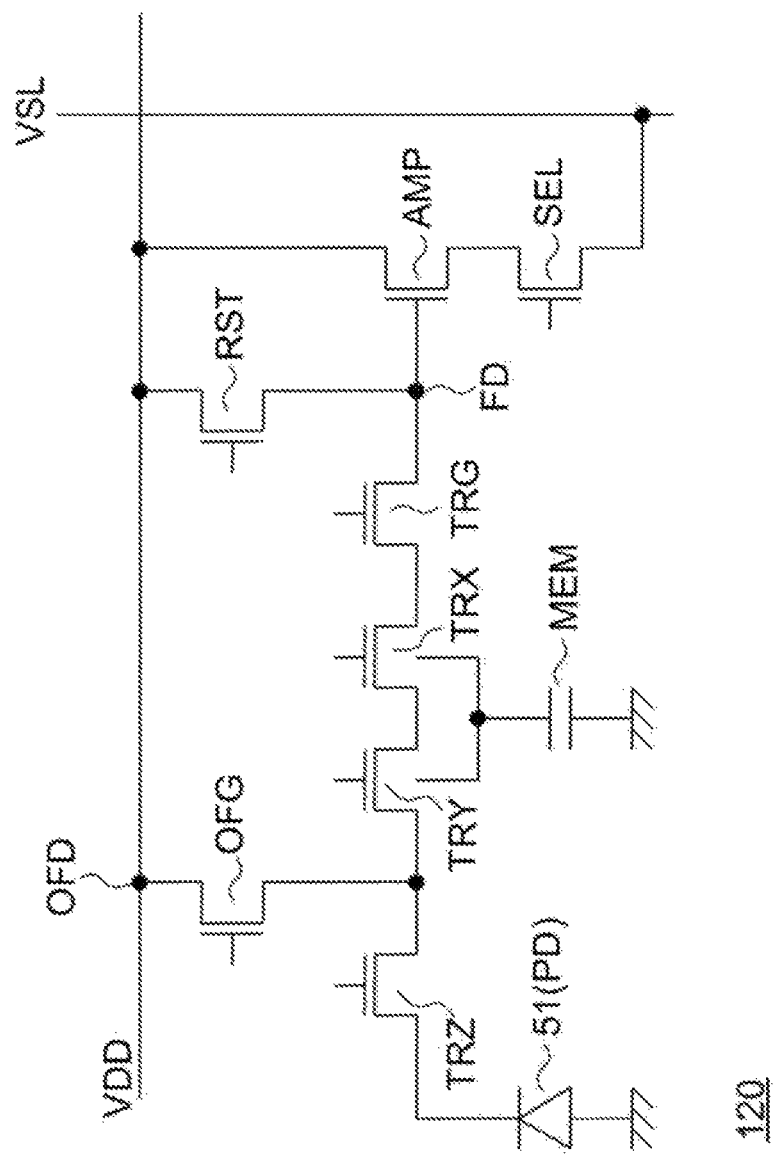
FIG. 2 is an equivalent circuit diagram of a sensor pixel 121 and a reading circuit 120.
Figure 3:
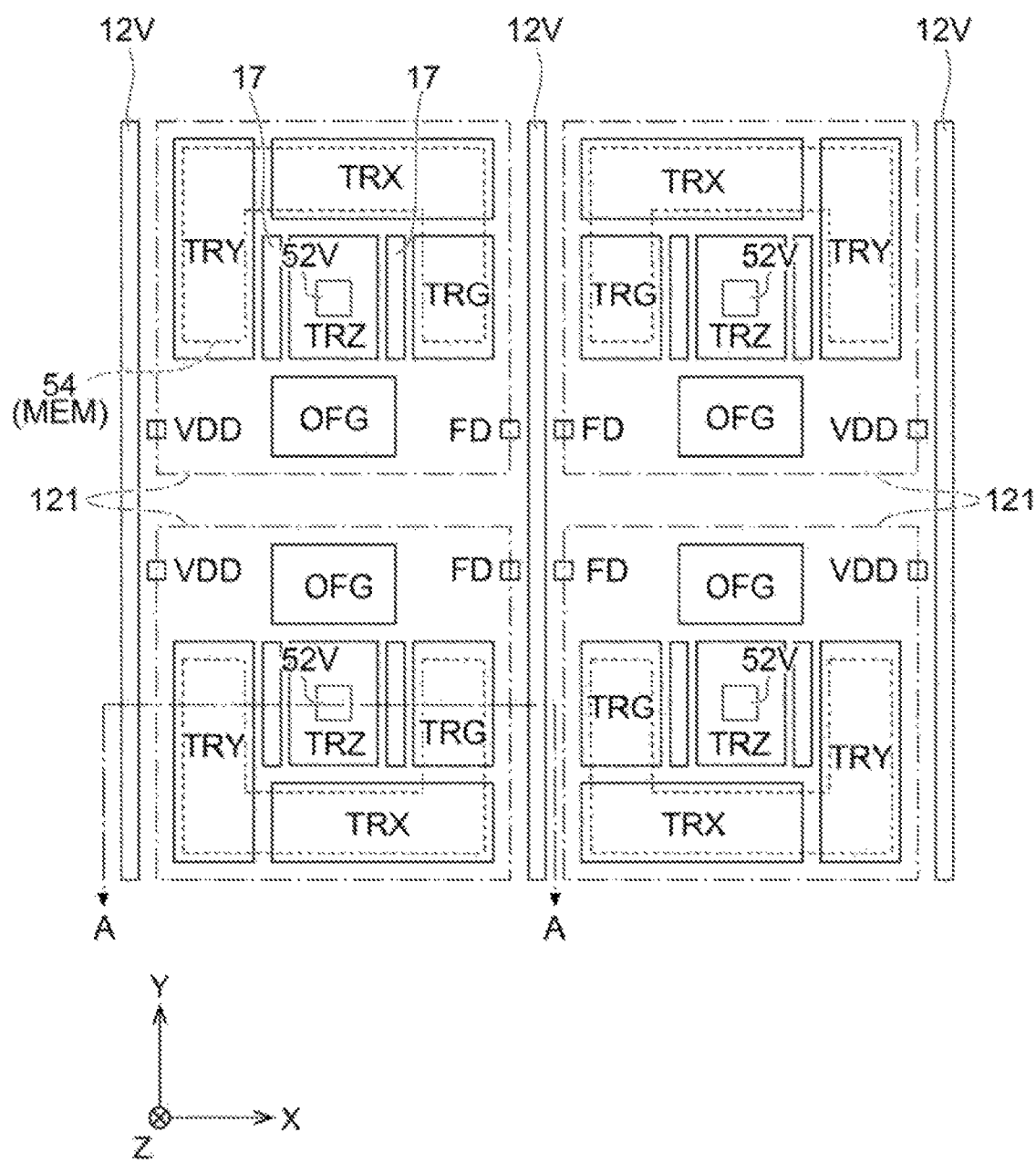
FIG. 3 is a planar layout diagram of a portion of a pixel region in a pixel array unit 111.

FIG. 2 is an equivalent circuit diagram of a sensor pixel 121 and a reading circuit 120. FIG. 3 is a planar layout diagram of a portion of a pixel region inside the pixel array unit 111. FIG. 3 illustrates a planar layout of a pixel region including two pixels in the X direction and two pixels in the Y direction.

As illustrated in FIGS. 2 and 3, the reading circuit 120 includes four transfer transistors TRZ, TRY, TRX, and TRG, a discharge transistor OFG, a reset transistor RST, an amplification transistor AMP, and a selection transistor SEL. These transistors are N-type MOS transistors. The reset transistor RST, the amplification transistor AMP, and the selection transistor SEL are formed on and attached to the semiconductor substrate that is different from the semiconductor substrate 11 on which the pixel array unit 111 is disposed, and these transistors are not explicitly illustrated in the planar layout in FIG. 3.

Hereinafter, an example in which a photodiode PD is used as the photoelectric conversion unit 51 will be mainly described. The transfer transistor TRZ is connected to the photodiode PD inside the sensor pixel 121 and transfers charge (pixel signal) after photoelectric conversion performed thereon by the photodiode PD to the transfer transistor TRY. A vertical transistor is assumed as the transfer transistor TRZ, and the transfer transistor TRZ includes a vertical gate electrode.

The transfer transistor TRY transfers the charge transferred from the transfer transistor TRZ to the transfer transistor TRX. The transfer transistors TRY and TRX may be replaced with one transfer transistor. A charge holding unit (MEM) 54 is connected to the transfer transistors TRY and TRX. A potential of the charge holding unit (MEM) 54 is controlled by a control signal applied to gate electrodes of the transfer transistors TRY and TRX. For example, the potential of the charge holding unit (MEM) 54 becomes deep when the transfer transistors TRY and TRX are turned on, and the potential of the charge holding unit (MEM) 54 becomes shallow when the transfer transistors TRY and TRX are turned off. For example, when the transfer transistors TRZ, TRY, and TRX are turned on, the charge accumulated in the photodiode PD is transferred to the charge holding unit (MEM) 54 via the transfer transistors TRZ, TRY, and TRX. A drain of the transfer transistor TRX is electrically connected to a source of the transfer transistor TRG, and gates of the transfer transistors TRY and TRX are connected to a pixel drive line.

The charge holding unit (MEM) 54 is a region that temporarily holds the charge accumulated in the photodiode PD in order to realize a global shutter function. The charge holding unit (MEM) 54 holds the charge transferred from the photodiode PD.

The transfer transistor TRG is connected between the transfer transistor TRX and a floating diffusion FD and transfers the charge held by the charge holding unit (MEM) 54 to the floating diffusion FD in response to a control signal applied to the gate electrode. For example, when the transfer transistor TRX is turned off, and the transfer transistor TRG is turned on, the charge held by the charge holding unit (MEM) 54 is transferred to the floating diffusion FD. A drain of the transfer transistor TRG is electrically connected to the floating diffusion FD, and a gate of the transfer transistor TRG is connected to the pixel drive line.

The floating diffusion FD is a floating and diffusion region that temporarily holds the charge output from the photodiode PD via the transfer transistor TRG, and functions as a temporary charge holding unit. For example, a reset transistor RST is connected to the floating diffusion FD, and a vertical signal line VSL is connected to the floating diffusion FD via the amplification transistor AMP and the selection transistor SEL.

The discharge transistor OFG initializes (resets) the photodiode PD in response to a control signal applied to the gate electrode. A drain of the discharge transistor OFG is connected to a power source line VDD, and a source is connected between the transfer transistor TRZ and the transfer transistor TRY.

For example, when the transfer transistor TRZ and the discharge transistor OFG are turned on, the potential of the photodiode PD is reset to the potential level of the power source line VDD. In other words, the photodiode PD is initialized. In addition, the discharge transistor OFG forms, for example, an overflow path between the transfer transistor TRZ and the power source line VDD, and discharges the charge overflowing from the photodiode PD to the power source line VDD.

The reset transistor RST initializes (resets) each region from the charge holding unit (MEM) 54 to the floating diffusion FD in response to a control signal applied to a gate electrode. A drain of the reset transistor RST is connected to the power source line VDD, and a source is connected to the floating diffusion FD. For example, when the transfer transistor TRG and the reset transistor RST are turned on, the potentials of the charge holding unit (MEM) 54 and the floating diffusion FD are reset to the potential level of the power source line VDD. In other words, the charge holding unit (MEM) 54 and the floating diffusion FD are initialized by turning on the reset transistor RST.

The amplification transistor AMP has a gate electrode connected to the floating diffusion FD and a drain connected to the power source line VDD and serves as an input unit of a source follower circuit that reads charge obtained through photoelectric conversion at the photodiode PD. In other words, the amplification transistor AMP constitutes the source follower circuit with a constant current source connected to one end of the vertical signal line VSL by the source thereof being connected to the vertical signal line VSL via the selection transistor SEL.

The selection transistor SEL is connected between the source of the amplification transistor AMP and the vertical signal line VSL, and a control signal as a selection signal is supplied to the gate electrode of the selection transistor SEL. When the control signal is turned on, the selection transistor SEL is brought into a conduction state, and the sensor pixel 121 coupled to the selection transistor SEL is brought into a selected state. When the sensor pixel 121 is brought into a selected state, a pixel signal output from the amplification transistor AMP is read by the column signal processing unit 114 via the vertical signal line VSL.

As illustrate in FIG. 3, each of the sensor pixels 121 has, for example, a rectangular shape, the transfer transistor TRZ is disposed at substantially the center portion thereof, and the transfer transistors TRY, TRX, and TRG and the discharge transistor OFG are disposed in the vicinity of the transfer transistor TRZ. Four sensor pixels 121 illustrated in FIG. 3 are disposed such that, for example, the floating diffusions FD are concentrated in the center, but this is merely an example. Disposition locations and disposition directions of the transfer transistors and the floating diffusions FD in the sensor pixels 121 are arbitrary.

The charge holding unit (MEM) 54 indicated by a dashed line in FIG. 3 is disposed below the transfer transistors TRG, TRX, and TRY. In the example of FIG. 3, in order to increase a charge holding amount by increasing the area of the charge holding unit (MEM) 54 as much as possible, the charge holding unit (MEM) 54 is disposed in a bent shape, but the shape and disposition location of the charge holding unit (MEM) 54 are also arbitrary.

The planar layout of each transistor in the reading circuit 120 is not necessarily limited to the one illustrated in FIG. 3. When the disposition of each transistor in the reading circuit 120 changes, the disposition locations of the photodiode PD and the charge holding unit (MEM) 54 disposed below the transistor also change.

Figure 4A:
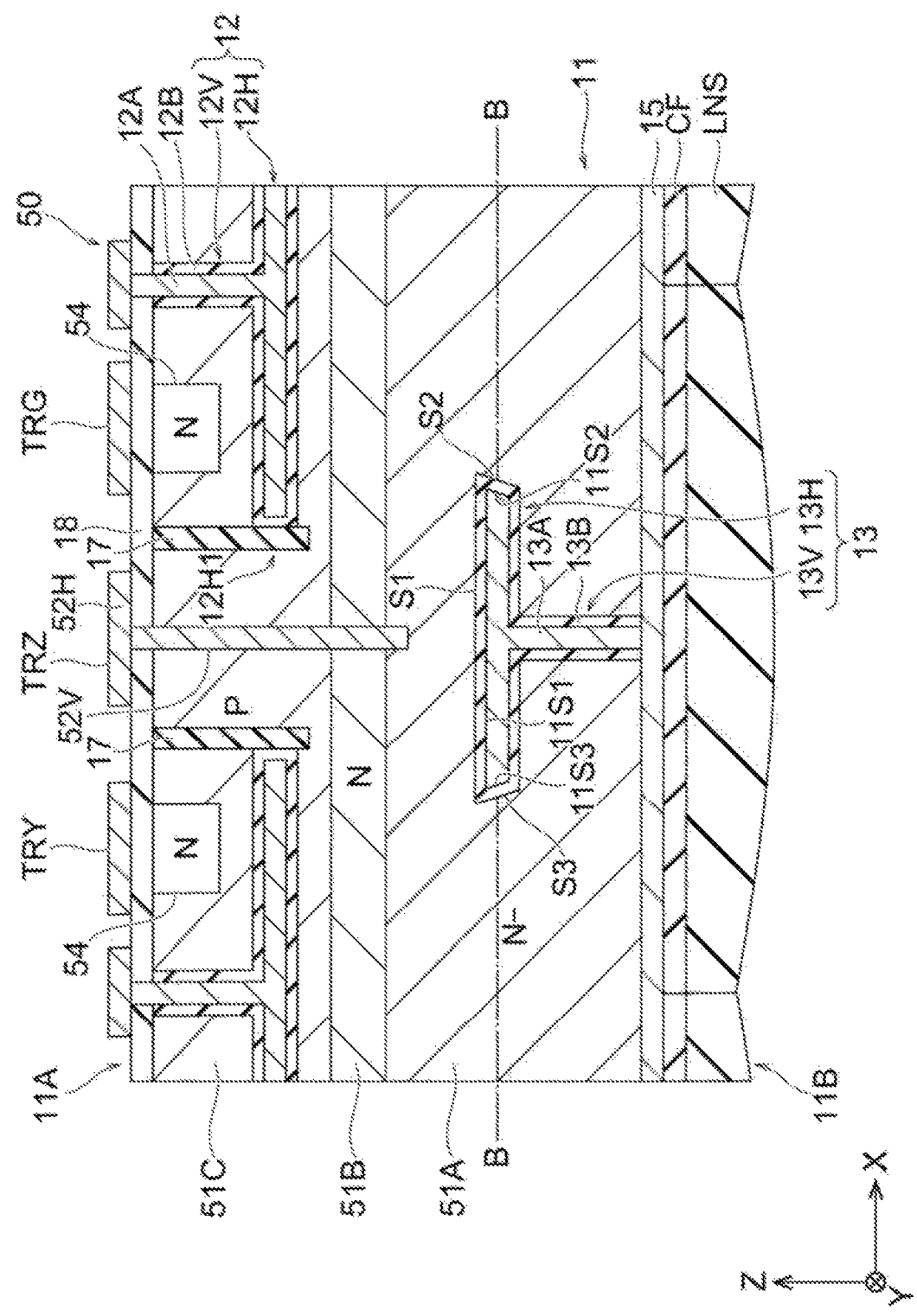
FIG. 4A is a cross-sectional view in a depth direction taken along a line A-A in FIG. 3.

FIG. 4A is a cross-sectional view in a depth direction taken along a line A-A in FIG. 3. The signs "P" and "N" in the drawings represent a P-type semiconductor region and an N-type semiconductor region, respectively. Moreover, "+" or "−" at the end of each of the symbols "P$^{++}$", "P$^+$" "P$^-$", and "P$^{--}$" represents concentration of impurities in the P-type semiconductor region. Similarly, "+" or "−" at the end of each of the signs "N$^{++}$", "N$^+$", "N$^-$", and "N$^{--}$" represents concentration of impurities in the N-type semiconductor region. Here, a larger number of "+" means that the concentration of impurities is higher while a larger number of "−" means that the concentration of impurities is lower. The same applies to the following drawings.

The imaging apparatus 101 illustrated in FIG. 4A includes the semiconductor substrate 11, the photoelectric conversion unit 51, the charge holding unit (MEM) 54, the charge transfer unit 50, the vertical gate electrode 52V that is a vertical electrode of the transfer transistor TRZ, and a first light shielding portion 13 that functions as a first light control member.

The semiconductor substrate 11 is, for example, a monocrystal silicon substrate 11 with a crystal orientation of a plane index (111). Hereinafter, the semiconductor substrate 11 may be referred to as a silicon (111) substrate. One of the reasons that the silicon (111) substrate 11 is used is because a process of performing etching in a direction along the crystal plane is included as will be described later.

Additionally, the imaging apparatus 101 includes a second light shielding portion 12 that functions as a second light control member, an etching stopper 17, a color filter CF, and a light receiving lens LNS. In the specification, one main surface of the semiconductor substrate 11 on the side on which the light receiving lens LNS is disposed will be referred to as a rear surface 11B or a light receiving surface, and one main surface on the side on which the reading circuit 120 is disposed will be referred to as a front surface 11A.

The photoelectric conversion unit 51 in the semiconductor substrate 11 includes an N⁻-type semiconductor region 51A, an N-type semiconductor region 51B, and a P-type semiconductor region 51C in order from the position closest to the rear surface 11B, for example. Photoelectric conversion is performed on light that is incident on the rear surface 11B in the N⁻-type semiconductor region 51A to generate charge, and the charge is accumulated in the N-type semiconductor region 51B. Note that the boundary between the N⁻-type semiconductor region 51A and the N-type semiconductor region 51B is not necessarily clear, and it is only necessary that the concentration of N-type impurities gradually increase from the N⁻-type semiconductor region 51A toward the N-type semiconductor region 51B, for example. In addition, a P-type semiconductor region with higher concentration of P-type impurities than the P-type semiconductor region 51C may be provided between the N-type semiconductor region and the P-type semiconductor region 51C. In this manner, the layer configuration of the photoelectric conversion unit 51 formed inside the semiconductor substrate 11 is not necessarily limited to the one illustrated in FIG. 1.

The first light shielding portion 13 is disposed at a position overlapping the vertical gate electrode 52V when the semiconductor substrate 11 is seen in a plan view from a normal direction of the front surface 11A, and is provided in a region of a pixel without straddling a boundary between the pixels. The first light shielding portion 13 is disposed inside the photoelectric conversion unit 51 on a side closer to the rear surface 11B of the semiconductor substrate 11 than to the vertical gate electrode 52V. At least a portion of the first light shielding portion 13 has a property of reflecting or absorbing incident light. For this reason, in the present specification, the first light shielding portion 13 may be referred to as a first light control member. Note that in the specification, a case where light is absorbed and a case where light is reflected will collectively be referred to as "light shielding". In other words, "light shielding" in the specification means that a property of not allowing light to penetrate therethrough is included. Note that it is assumed that a case where light is allowed to slightly penetrate therethrough is interpreted as being included in "light shielding".

The first light shielding portion 13 includes a vertical light shielding portion 13V extending in the depth direction of the semiconductor substrate 11 and a horizontal light shielding portion 13H extending in the horizontal direction of the semiconductor substrate 11. A cross-sectional shape of the first light shielding portion 13 in the depth direction of the semiconductor substrate 11 is, for example, a T shape. As will be described later, when the semiconductor substrate 11 is seen in a plan view from the normal direction of the front surface 11A, an end side of the horizontal light shielding portion 13H may be disposed substantially in parallel with an end side of the vertical light shielding portion 13V. In addition, when the semiconductor substrate 11 is seen in a plan view from the normal direction of the front surface 11A, an end side of the charge holding unit 54 may be disposed substantially in parallel with at least one of the end side of the horizontal light shielding portion 13H and the end side of the vertical light shielding portion 13V. In addition, the horizontal light shielding portion 13H has a shape corresponding to an extension direction, extension length, and number of the vertical light shielding portion 13V.

The horizontal light shielding portion 13H and the vertical light shielding portion 13V of the first light shielding unit 13 are disposed inside the photoelectric conversion unit 51 on a side closer to the rear surface 11B of the semiconductor substrate 11 than to the vertical gate electrode 52V. The horizontal light shielding portion 13H is disposed at a position overlapping the vertical gate electrode 52V in the depth direction when seen in a plan view from a normal direction of the front surface or the rear surface of the semiconductor substrate 11. Thereby, light incident from the rear surface 11B side of the semiconductor substrate 11 is shielded by the horizontal light shielding portion 13H and is hardly incident on the vertical gate electrode 52V, thereby achieving a reduction in noise. At least a portion of the horizontal light shielding portion 13H has a property of reflecting or absorbing incident light, and thus the horizontal light shielding portion 13H may be referred to as a first light control portion in the present specification.

The vertical light shielding portion 13V of the first light shielding portion 13 is connected to the horizontal light shielding portion 13H, and extends in the depth direction inside the photoelectric conversion unit 51. The vertical light shielding portion 13V in FIG. 4A extends from the rear surface of the semiconductor substrate 11 to the horizontal light shielding portion 13H. At least a portion of the vertical light shielding portion 13V has a characteristic of reflecting or absorbing incident light. For this reason, in the present specification, the vertical light shielding portion 13V may be referred to as a second light control portion. The vertical light shielding portion 13V is disposed on the inner side of a boundary between pixels, that is, inside a pixel region (photoelectric conversion unit 51). As will be described later, the element separation portion 20 may be provided at a boundary between pixels, but the first light shielding portion 13 constituted by the vertical light shielding portion 13V and the horizontal light shielding portion 13H is not connected to the element separation portion 20 but is independently provided inside a pixel region (photoelectric conversion unit 51).

In the example of FIG. 4A, one end portion of the vertical light shielding portion 13V is connected to the horizontal light shielding portion 13H, and the cross-sectional shape of the first light shielding portion 13 is a T shape, but this is merely an example. As a modification example, the vertical light shielding portion 13V may be disposed to penetrate the horizontal light shielding portion 13H. In this case, the cross-sectional shape of the first light shielding portion 13 in the depth direction is a cross shape. In addition, the vertical light shielding portion 13V may be disposed to penetrate the semiconductor substrate 11 from the surface to the rear surface thereof. In a case where the vertical light shielding portion 13 penetrates the semiconductor substrate 11 from the rear surface to the surface thereof, the vertical light shielding portion 13 can completely shield light from an adjacent sensor pixel 121, and thus it is possible to suppress parasitic light sensitivity (PLS).

Figure 4B:
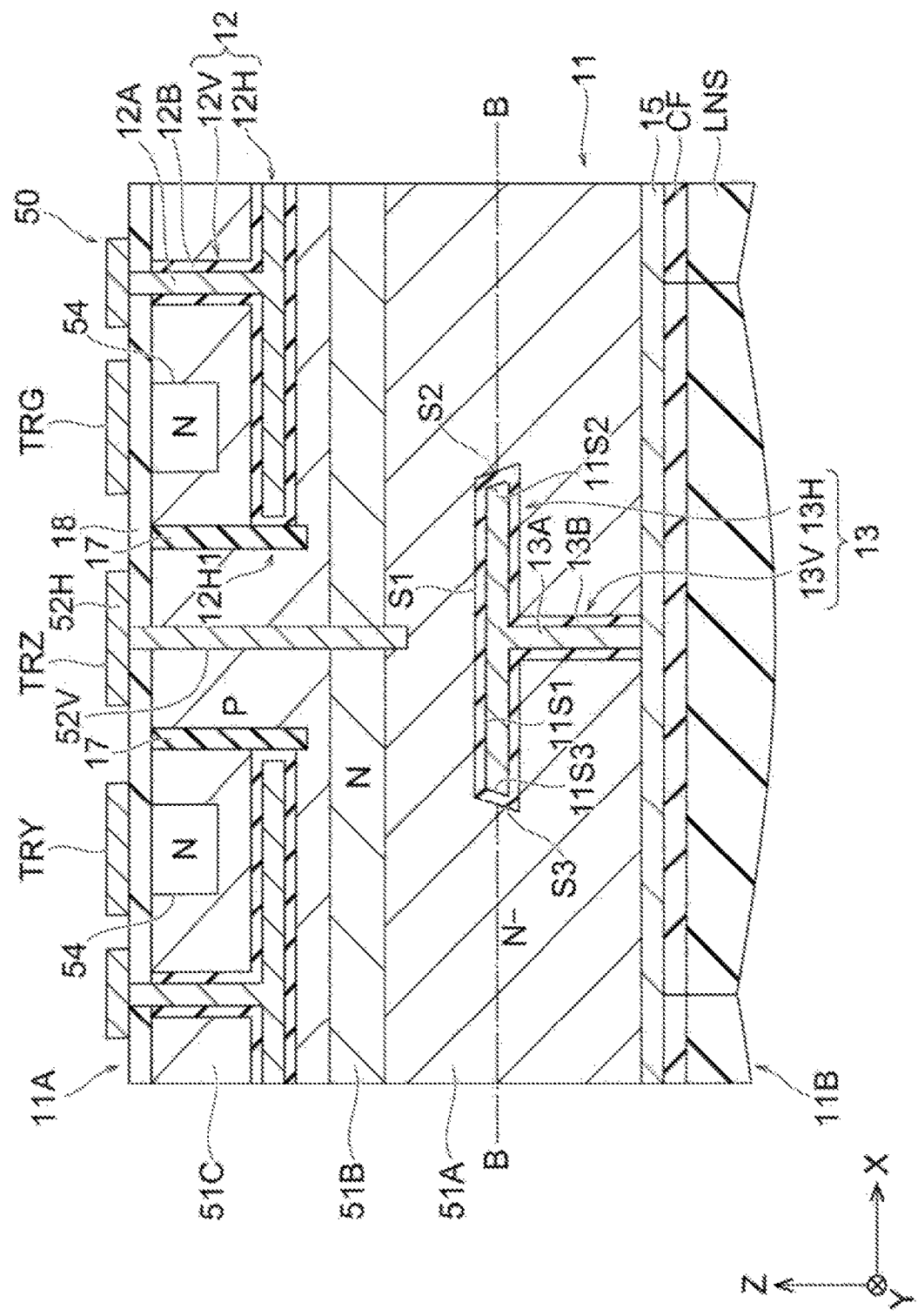
FIG. 4B is a cross-sectional view at a cross-sectional position different from that in FIG. 4A.

The horizontal light shielding portion 13H can be formed of a material having an excellent light reflection characteristic, as will be described later. Thereby, by the reflection of the horizontal light shielding portion 13H in the pixel region, it is possible to increase photoelectric conversion efficiency of the photoelectric conversion unit 51 and improve photoelectric conversion efficiency Qe. In this manner, the first light shielding portion 13 is disposed inside the pixel region, that is, disposed so as not to straddle a boundary between pixels. The first light shielding portion 13 according to the present embodiment can be disposed at any location in the pixel region, and thus restrictions on the layout of the first light shielding portion 13 are reduced, and the first light shielding portion 13 can be disposed at a location which is most suitable for reducing noise and improving sensitivity. As will be described later, the horizontal light shielding portion 13H of the first light shielding portion 13 is formed by filling a space, which is formed by etching, with an insulator or the like, and the planar direction of the end face of the horizontal light shielding portion 13H varies depending on the position of the end face. FIG. 4B illustrates a cross-sectional view at a cross-sectional position different from that in FIG. 4A, and FIG. 4A and FIG. 4B differ in the planar direction of the end face of the horizontal light shielding portion 13H.

The second light shielding portion 12 is a member that functions to prevent light from being incident on the charge holding unit (MEM) 54 and is provided to surround at least a portion of the charge holding unit (MEM) 54. Specifically, the second light shielding portion 12 includes, for example, horizontal light shielding portions 12H spreading along a horizontal plane (XY plane) between the photoelectric conversion unit 51 and the front surface 11A of the semiconductor substrate 11 and vertical light shielding portions 12V spreading along the YZ plane such that the vertical light shielding portions 12V intersect the horizontal light shielding portions 12H. At least a portion of the second light shielding portion 12 has a characteristic of reflecting or absorbing incident light. For this reason, in the present specification, the second light shielding portion 12 may be referred to as a second light control member. In addition, the horizontal light shielding portions 12H of the second light shielding portion 12 may be referred to as a third light control portion, and the vertical light shielding portions 12V of the second light shielding portion 12 may be referred to as a fourth light control portion. Details of the second light shielding portion 12 will be described later.

Each of the gate electrodes of the transfer transistors TRZ, TRY, TRX, and TRG in the reading circuit 120 and the discharge transistor ORG is provided on the side of the front surface 11A of the semiconductor substrate 11 via an insulating layer 18. In addition, the charge holding unit (MEM) 54 that is an N-type semiconductor region is provided inside the P-type semiconductor region 51C in the semiconductor substrate 11. More specifically, the charge holding unit (MEM) 54 is disposed between the front surface 11A of the semiconductor substrate 11 and the horizontal light shielding portions 12H of the second light shielding portion 12. As illustrated in FIG. 4A, the second light shielding portion 12 surrounds at least a portion the periphery of the charge holding unit (MEM) 54 so that light from the rear surface 11B side is prevented from being incident on the charge holding unit (MEM) 54.

The transfer transistor TRZ includes a horizontal gate electrode 52H disposed in the horizontal plane direction of the semiconductor substrate 11 and a vertical gate electrode 52V extending in the depth direction of the semiconductor substrate 11. The deepest position of the vertical gate electrode 52V is inside the N⁻-type semiconductor region 52A, for example. Although FIG. 4A illustrates an example in which each sensor pixel 121 includes one vertical gate electrode 52V, the number of vertical gate electrodes 52V is not limited and may be two or more. The larger the number of vertical gate electrodes 52V, the more efficiently electrons generated by the photoelectric conversion unit 51 can be transferred to the transfer transistor. The transfer transistor TRZ transfers electrons after the photoelectric conversion performed thereon by the photoelectric conversion unit 51 to the transfer electrode TRY via the vertical gate electrode 52V.

The photoelectric conversion unit 51 can efficiently generate charge using a depletion layer generated in the surroundings of PN junction. For this reason, the vertical light shielding portion 13V of the first light shielding portion 13 and the element separation portion 20 may be provided with a P-type semiconductor region, which is not illustrated in the drawing, along the depth direction to widen the area of a PN junction surface.

As illustrated in FIG. 4A, a fixed charge film 15 is provided between the photoelectric conversion unit 51 and the rear surface 11B. The fixed charge film 15 is provided along the rear surface 11B of the semiconductor substrate 11. The fixed charge film 15 has negative fixed charge to curb occurrence of a dark current caused by an interface state of the rear surface 11B that is the light receiving surface of the semiconductor substrate 11. A hole accumulation layer is formed in the vicinity of the rear surface 11B of the semiconductor substrate 11 by an electric field induced by the fixed charge film 15. Generation of electrons from the rear surface 11B is curbed by the hole accumulation layer.

As illustrated in FIG. 4A, a color filter CF is disposed on the front surface 11A of the fixed charge film 15, and a light receiving lens LNS is disposed on the front surface 11A of the color filter CF. The color filter CF and the light receiving lens LNS are provided for each pixel.

Figure 4C:
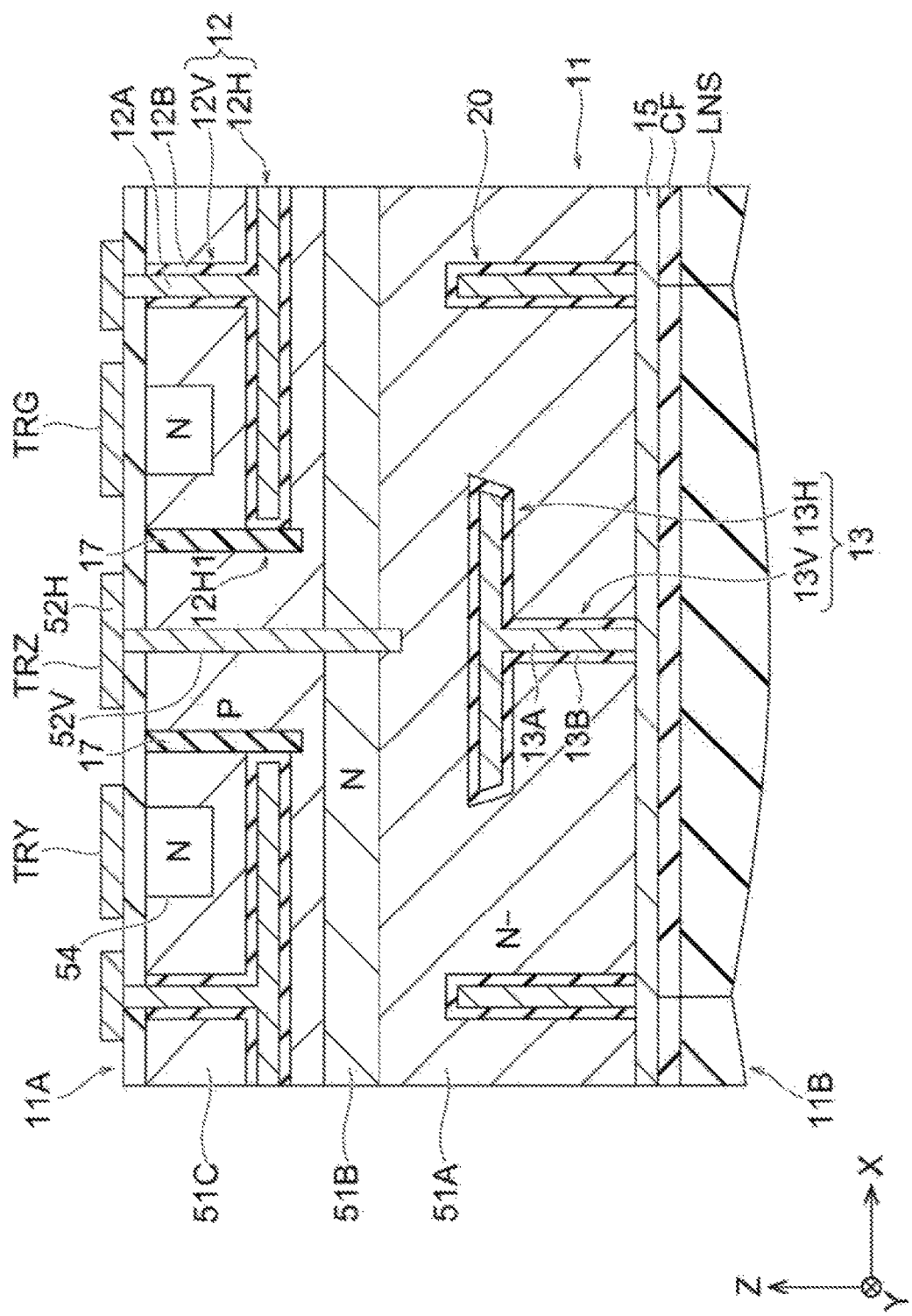
FIG. 4C is a cross-sectional view in which an element separation portion is added to FIG. 3.

The imaging apparatus 101 in FIG. 4A does not include an element separation portion at a boundary portion of a pixel, but the element separation portion 20 may be provided as illustrated in FIG. 4C. Further, in FIG. 4C, the element separation portion 20 includes only a vertical light shielding portion, but the element separation portion 20 may include a horizontal light shielding portion, similar to the first light shielding portion 13 and the second light shielding portion 12. In this case, an end portion of the vertical light shielding portion of the element separation portion 20 may be connected to the horizontal light shielding portion, and the vertical light shielding portion may be disposed to penetrate the horizontal light shielding portion.

The element separation portion 20 in FIG. 4C is provided along a boundary of a pixel. The element separation portion 20 is a member having a wall shape that extends in the depth (Z-axis) direction along a boundary position between the sensor pixels 121 adjacent to each other and surrounds the photoelectric conversion units 51. The element separation portion 20 can electrically separate the sensor pixels 121 adjacent to each other. The element separation portion 20 is formed of an insulating material such as silicon oxide. The element separation portion 20 can be used to prevent light from being incident on the adjacent sensor pixel 121. The element separation portion 20 is formed of a material having an excellent light absorbing property or an excellent light reflecting property. Details of the element separation portion 20 will be described later.

Both the vertical light shielding portion 13V of the first light shielding portion 13 and the element separation portion 20 can prevent light incident into each sensor pixel 121 from the rear surface 11B side of the semiconductor substrate 11 from leaking out to the adjacent sensor pixel 121 and can reduce a crosstalk between the pixels.

Although the first light shielding portion 13, the second light shielding portion 12, and the element separation portion 20 are not necessarily formed to have the same structure and formed of the same material, and these portions have an excellent light absorbing property or an excellent light reflecting property in common. The first light shielding portion 13 and the element separation portion 20 include the vertical light shielding portions extending in the depth direction from the rear surface 11B side of the semiconductor substrate 11, while the second light shielding portion 12 includes the vertical light shielding portion 12V extending in the depth direction from the front surface 11A side of the semiconductor substrate 11.

Figure 5:
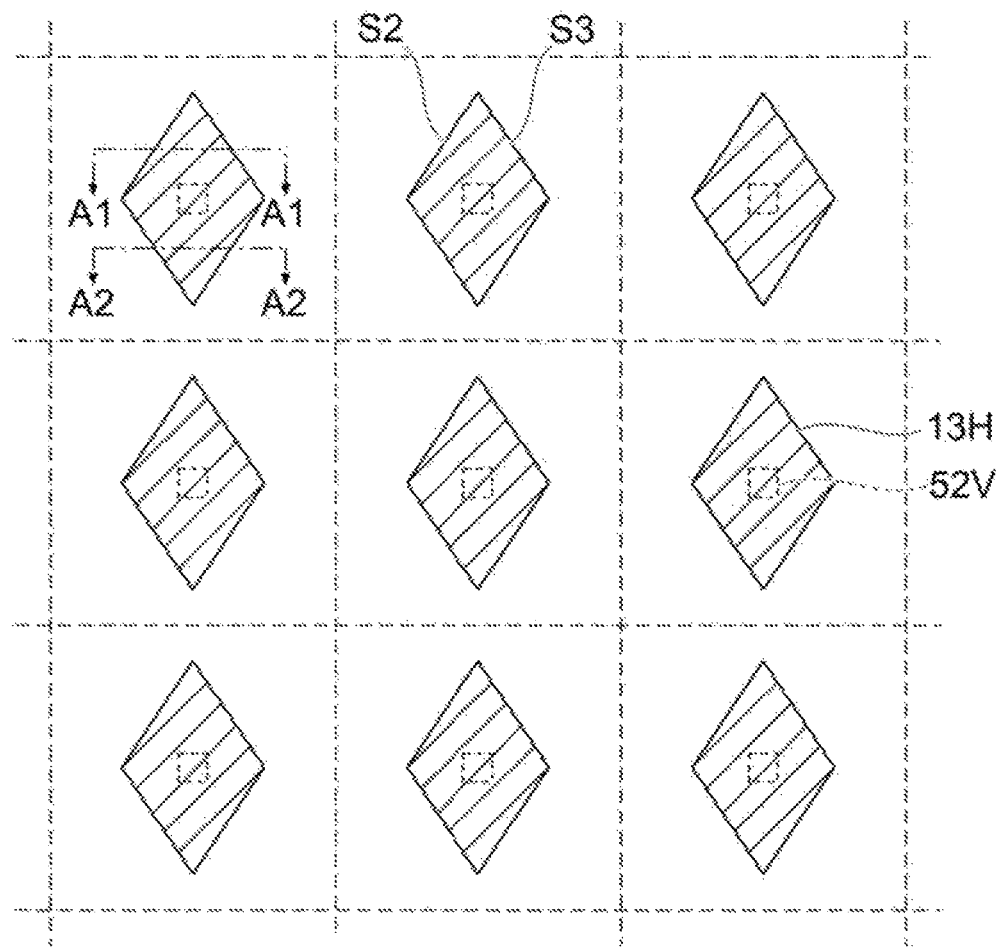
FIG. 5 is a cross-sectional view in a horizontal direction taken along a line B-B in FIG. 4A.
Figure 5:
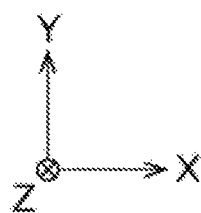

FIG. 5 is a cross-sectional view in a horizontal direction taken along a line B-B in FIG. 4A. As illustrated in the drawing, the element separation portions 20 are disposed along the boundary between the sensor pixels 121 and are disposed to surround the side surface of the photoelectric conversion unit 51 of each sensor pixel 121. In FIG. 5, the boundaries between the pixels are indicated by dashed lines. The vertical light shielding portion (dashed rectangular portion illustrated in the drawing) 13V of the first light shielding portion 13 is disposed at substantially the center portion in each sensor pixel 121, and the horizontal light shielding portion 13H extends into a pixel region (photoelectric conversion unit 51) from one end portion of the vertical light shielding portion 13V. Note that, in a case where the element separation portion 20 is provided as illustrated in FIG. 4C, the element separation portion 20 is disposed at a dashed position in FIG. 5.

As illustrated in FIG. 5, the horizontal light shielding portions 13H extends in the lateral (horizontal) direction from the deepest position of the vertical light shielding portions 13V of the first light shielding portion 13. In FIG. 5, a hatched region indicates the cross-section of the horizontal light shielding portion 13H in the horizontal direction. As will be described later, the horizontal light shielding portion 13H has a function of reflecting light. In the present embodiment, utilization of the silicon substrate 11 of the plane index (111) is assumed, and wet-etching processing is performed using, for example, an etching solution with which it is possible to perform etching of the semiconductor substrate 11 in the <110> direction, for example, an alkali aqueous solution.

Each horizontal light shielding portion 13H includes a pair of first surfaces S1 extending in the horizontal direction and a pair of second surfaces S2 and third surfaces S3 extending in a direction intersecting the pair of first surfaces as illustrated in FIG. 4A. Each of the pair of first surfaces S1 is a surface along a first crystal plane 11S1 of the semiconductor substrate 11, and the first surfaces S1 face each other in the Z-axis direction. Note that the first crystal plane 11S1 of the semiconductor substrate 11 is represented by a plane index (111). In addition, each of the pair of second surfaces S2 is a surface along a second crystal plane 11S2 of the semiconductor substrate 11.

The second crystal plane 11S2 of the semiconductor substrate 11 is represented by a plane index (111) and is inclined by approximately 19.5 degrees with respect to the Z-axis direction. In other words, the inclination angle of the second crystal plane 11S2 with respect to the horizontal plane (XY plane) is about 70.5°. The second crystal plane 11S2 is inclined with respect to the X axis and the Y axis in the horizontal plane (XY plane) and is inclined at an angle of approximately 30 degrees with respect to, for example, the Y axis. Further, the third surface S3 is a surface that defines an outline of each opening portion 12H1 with a planar shape of a rhombus shape, for example, and is a surface along a third crystal plane 11S3 of the semiconductor 11. The third crystal plane 11S3 of the semiconductor substrate 11 is inclined by about 19.5° with respect to the Z-axis direction similarly to the second crystal plane 11S2. In other words, the inclination angle of the third crystal plane 11S3 with respect to the horizontal plane (XY plane) is about 70.5°. In this manner, an Si remaining region other than the region occupied by the horizontal light shielding portions 13H in the horizontal plane perpendicular to the thickness direction has a shape along the third crystal plane 11S3, for example, and has a rhombus shape in the example in FIG. 5. For example, the planar direction of an end face of the horizontal light shielding portion 13H in the cross-section in the direction of a line A1-A1 in FIG. 5 is as illustrated in FIG. 4A, and the planar direction of an end face of the horizontal light shielding portion 13H in the cross-section in the direction of a line A2-A2 in FIG. 5 is as illustrated in FIG. 4B.

The horizontal light shielding portion 13H of the first light shielding portion 13 is formed by forming a trench for the vertical light shielding portion 13V as will be described later, expanding the trench in the horizontal direction by etching processing to form a space, and then filling the space with an insulator or the like. The shape of the horizontal light shielding portion 13H depends on the direction, shape, and number of the trench for the vertical light shielding portion 13V.

Figure 6A:
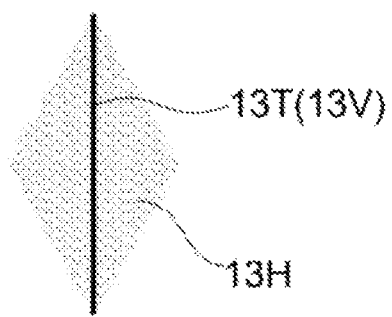
FIG. 6A is a diagram illustrating a specific example of a planar shape of a horizontal light shielding portion of a first light shielding portion.

FIGS. 6A, 6B, 6C, 6D, 6E, 6F, and 6G are diagrams illustrating specific examples of the planar shape of the horizontal light shielding portion 13H of the first light shielding portion 13. FIG. 6A illustrates an example in which a trench 13T for the vertical light shielding portion 13V extends in a <112> direction. In this case, since etching progresses more in a <110> direction, a planar shape of a rhombus shape as illustrated in the drawing is formed, and the planar shape of the horizontal light shielding portion 13H formed by filling the space with an insulator, a metal, or the like is also rhombus shape.

Figure 6B:
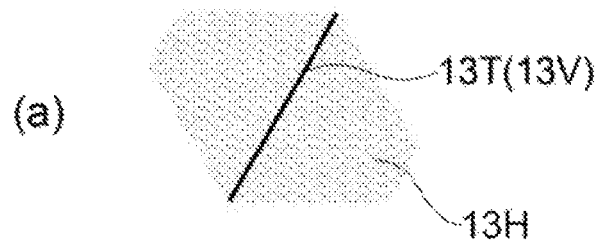
FIG. 6B is a diagram illustrating a specific example of a planar shape of the horizontal light shielding portion of the first light shielding portion.
Figure 6B:
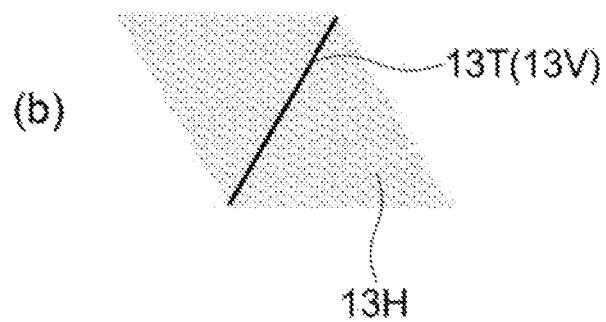
Figure 6B:
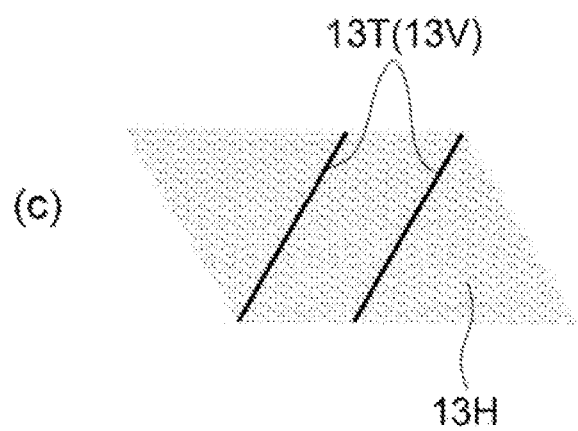

FIG. 6B illustrates an example in which the trench 13T for the vertical light shielding portion 13V of the first light shielding portion 13 extends in a direction which is inclined at 60 degrees with respect to the <110> direction. In this case, a space having a planar shape as illustrated in FIG. 6B(a) is formed, and when etching is continued, a space having a planar shape as illustrated in FIG. 6B(b) is finally formed. Further, in a case where a plurality of trenches 13T in this direction are formed, the horizontal light shielding portion 13H having a planar shape close to a parallelogram is obtained as illustrated in FIG. 6B(c).

Figure 6C:
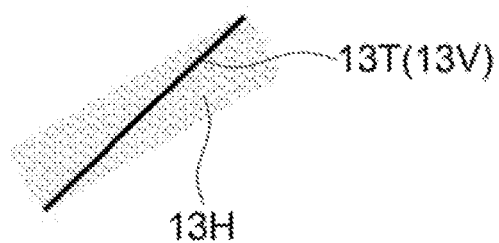
FIG. 6C is a diagram illustrating a specific example of a planar shape of the horizontal light shielding portion of the first light shielding portion.

FIG. 6C illustrates an example in which the trench 13T for the vertical light shielding portion 13V of the first light shielding portion 13 extends in a direction inclined at 45 degrees with respect to the <110> direction. In this case, a space having a planar shape being a rectangular shape as illustrated in FIG. 6C is formed, and thus the planar shape of the horizontal light shielding portion 13H is also a rectangular shape.

Figure 6D:
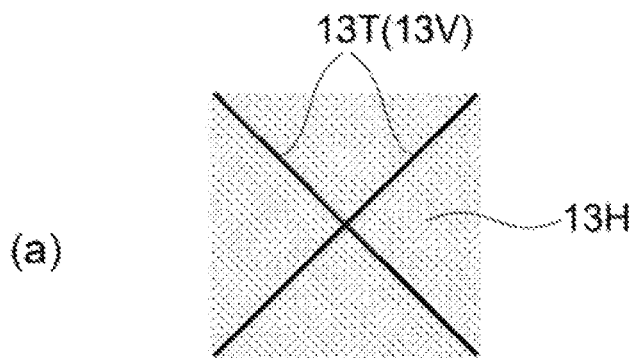
FIG. 6D is a diagram illustrating a specific example of a planar shape of the horizontal light shielding portion of the first light shielding portion.
Figure 6D:
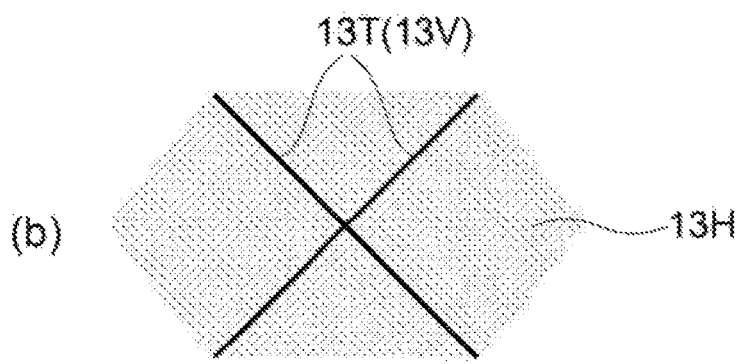
Figure 6D:
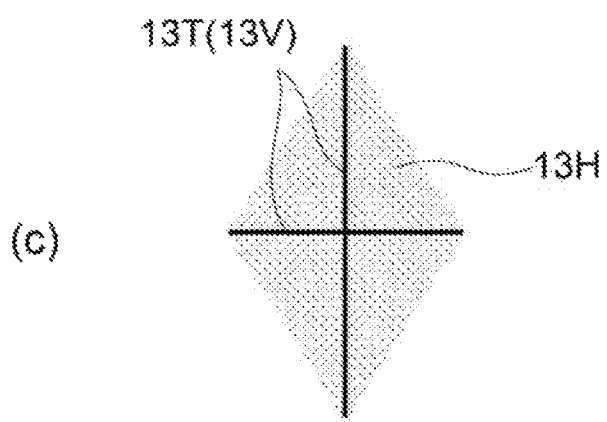

FIG. 6D illustrates an example in which the trench 13T for the vertical light shielding portion 13V of the first light shielding portion 13 has a cross shape. In a case where an extension direction of the trench 13T is inclined at 45 degrees with respect to the <110> direction, the horizontal light shielding portion 13H having a planar shape being a quadrilateral shape as illustrated in FIG. 6D(a) or a polygonal shape of a pentagon or more as illustrated in FIG. 6D(b) is obtained. Further, in a case where the extension direction of the trench 13T is the <110> direction and the <112> direction, the horizontal light shielding portion 13H has a rhombus shape as illustrated in FIG. 6D(c).

Figure 6E:
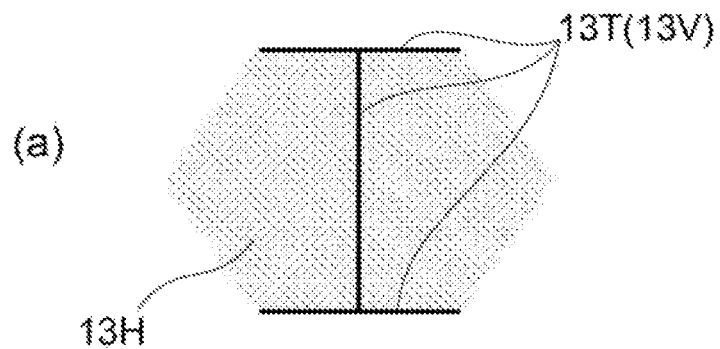
FIG. 6E is a diagram illustrating a specific example of a planar shape of the horizontal light shielding portion of the first light shielding portion.
Figure 6E:
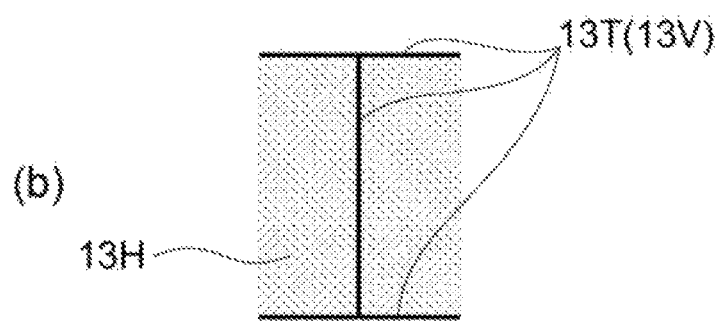

FIG. 6E illustrates an example in which the planar shape of the trench 13T for the vertical light shielding portion 13V of the first light shielding portion 13 is an I shape. In this case, a space having a planar shape being a hexagonal shape is obtained as illustrated in FIG. 6E(a). Further, when etching is continued, a space having a quadrilateral shape is obtained as illustrated in FIG. 6E(b).

Figure 6F:
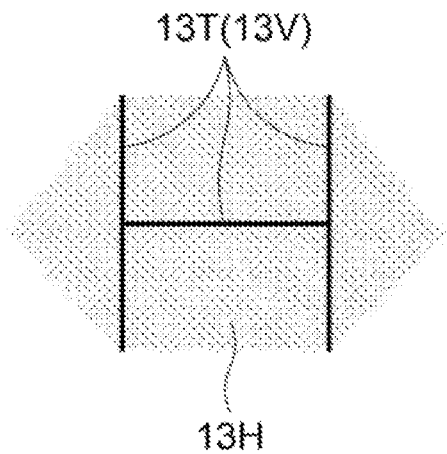
FIG. 6F is a diagram illustrating a specific example of a planar shape of the horizontal light shielding portion of the first light shielding portion.

FIG. 6F illustrates an example in which the orientation of the trench 13T in FIG. 6E is rotated by 90 degrees. In this case, the horizontal light shielding portion 13H having a planar shape being a hexagonal shape is obtained.

Figure 6G:
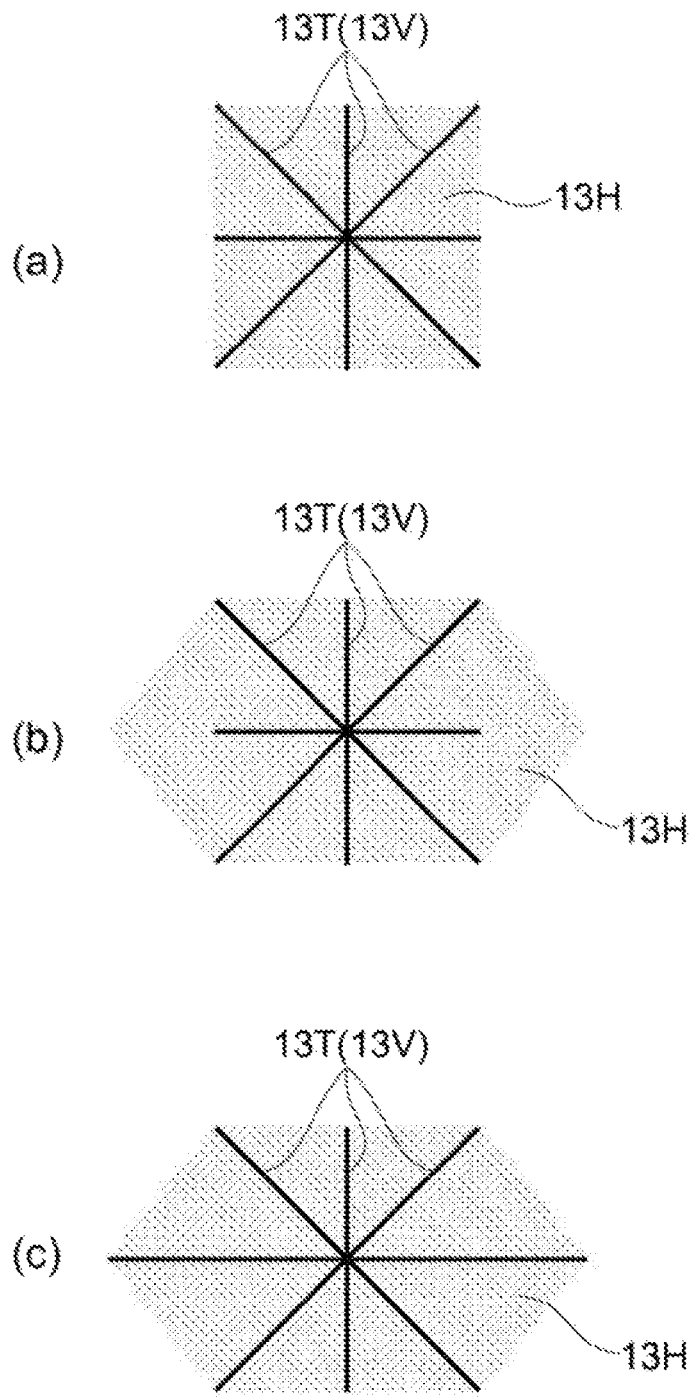
FIG. 6G is a diagram illustrating a specific example of a planar shape of the horizontal light shielding portion of the first light shielding portion.

FIG. 6G illustrates an example in which the planar shape of the trench 13T for the vertical light shielding portion 13V of the first light shielding portion 13 is an asterisk shape. In this case, the horizontal light shielding portions 13H having shapes as illustrated in FIGS. 6G(a), 6G(b), and 6G(c) depending on an etching time are obtained.

In this manner, in the first light shielding portion 13, the shape, size, and direction of the horizontal light shielding portion 13H can be changed in various manners depending on the shape, length, and number of the trench 13T for the vertical light shielding portion 13V. Electrons generated by the photoelectric conversion unit 51 are transferred to the transfer transistor TRZ through the vertical gate electrode 52V. The horizontal light shielding portion 13H is a portion for preventing light from being incident on the vertical gate electrode 52V, and it is preferable to adjust the position and direction of the vertical gate electrode 52V in accordance with the shape, size, and direction of the horizontal light shielding portion 13H. In addition, it is also necessary to change the position and direction of each transfer transistor in accordance with the position and orientation of the vertical gate electrode 52V, and when the position and direction of each transfer transistor are changed, it is also necessary to change the position and direction of the charge holding unit (MEM) 54. In particular, in a case where a plurality of vertical gate electrodes 52V are provided in each sensor pixel 121, the disposition direction of the plurality of vertical gate electrodes 52V also becomes important. This is because electrons cannot be smoothly transferred to each transfer transistor depending on the disposition direction of the plurality of vertical gate electrodes 52V.

Although FIGS. 6A, 6B, 60, 6D, 6E, 6F, and 6G illustrate an example in which the horizontal light shielding portion 13H spreads in the horizontal direction from one end portion of the vertical light shielding portion 13V, there may also be a case where the end portions of the vertical light shielding portion 13V and the horizontal light shielding portion 13H do not completely match each other in a plan view from a normal line direction of the substrate surface.

Figure 7A:
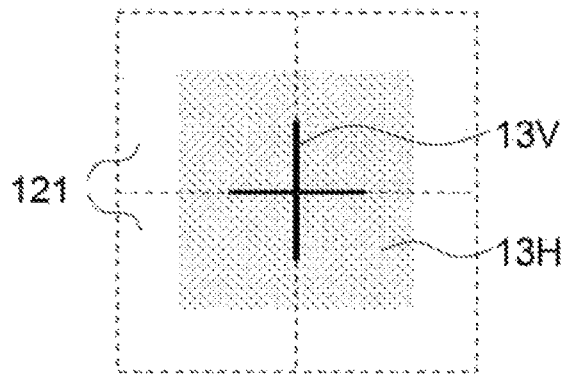
FIG. 7A is a diagram illustrating an example in which the planar shape of the horizontal light shielding portion is larger than a planar shape of a vertical light shielding portion.
Figure 7B:
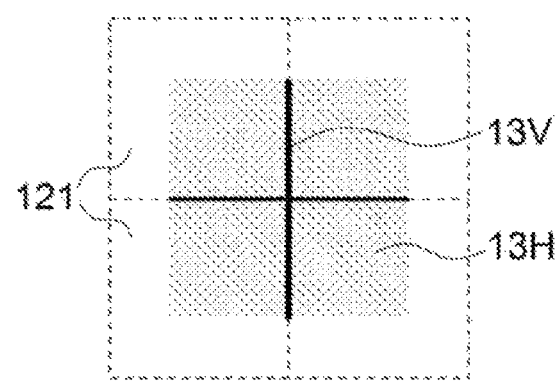
FIG. 7B is a diagram illustrating an example in which the planar shape of the vertical light shielding portion conforms to the planar shape of the horizontal light shielding portion.
Figure 7C:
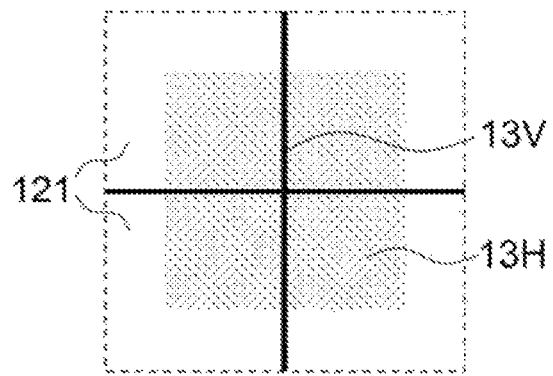
FIG. 7C is a diagram illustrating an example in which the planar shape of the horizontal light shielding portion is smaller than the planar shape of the vertical light shielding portion.

FIG. 7A is a diagram illustrating an example in which the planar shape of the horizontal light shielding portion 13H is larger than the planar shape of the vertical light shielding portion 13V, FIG. 7B is a diagram illustrating an example in which the planar shape of the vertical light shielding portion 13V conform to the planar shape of the horizontal light shielding portion 13H, and FIG. 7C is a diagram illustrating an example in which the planar shape of the horizontal light shielding portion 13H is smaller than the planar shape of the vertical light shielding portion 13V.

In order to form the horizontal light shielding portion 13H and the vertical light shielding portion 13V in FIGS. 7A, 7B, and 7C, the trench for the vertical light shielding portion 13V may be formed first, the trench for the horizontal light shielding portion 13H may be formed through wet-etching using the trench, and the trench may be filled with a light shielding material, or alternatively, a hollow for the horizontal light shielding portion 13H may be formed first, a trench for the vertical light shielding portion 13V may then be formed, and the trench and the hollow may be filled with a light shielding material as will be described later.

The regions surrounded by the dashed lines in FIGS. 7A, 7B, and 7C are regions of unit pixels 121. FIGS. 7A, 7B, and 7C illustrate an example in which the horizontal light shielding portion 13H is disposed at substantially the center portion of a unit pixel 121. Although a white region where the horizontal light shielding portion 13H is not disposed within a unit pixel 121 is a region where charge generated through photoelectric conversion is transferred, the horizontal light shielding portion 12H is disposed at a distance from the horizontal light shielding portion 13H in the depth direction of the paper (the depth direction of the substrate) in the white region. A gap between the horizontal light shielding portion 13H and the horizontal light shielding portion 12H serves as a charge transfer path.

Figure 8:
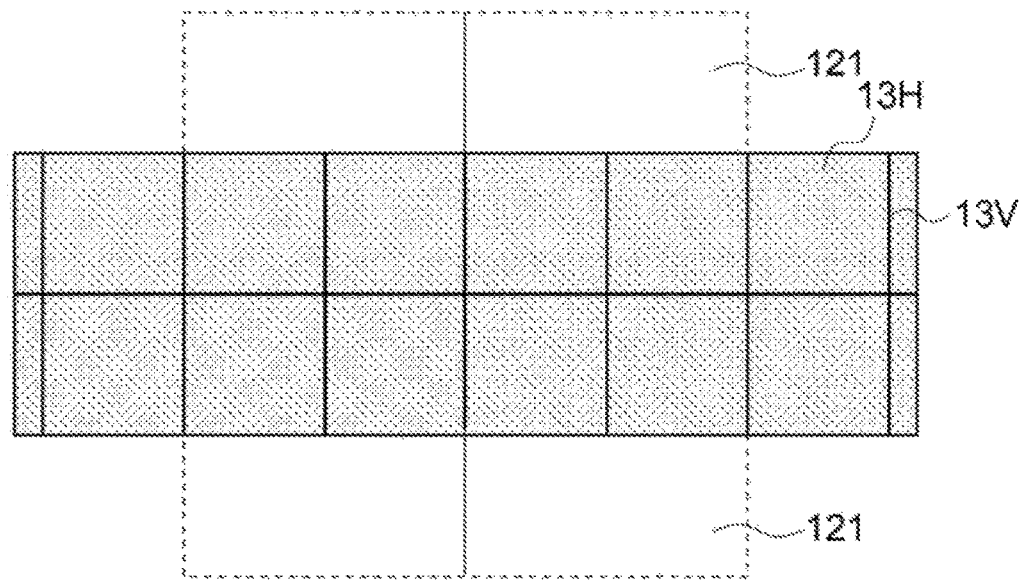
FIG. 8 is a diagram illustrating a transfer path of charge.

FIG. 8 is a diagram illustrating a charge transfer path. Each region surrounded by the dashed line in FIG. 8 is a region of the unit pixel 121, and the horizontal light shielding portion 13H is disposed to overlap a portion of the region of the unit pixel 121. FIG. 8 illustrates an example in which the horizontal light shielding portion 13H with a rectangular shape is disposed along one end portion of the vertical light shielding portion 13V with a cross planar shape. In practice, the planar shape of the vertical light shielding portion 13V can be various shapes as illustrated in FIGS. 6A, 6B, 6C, 6D, 6E, 6F, and 6G. Although the white region in FIG. 8 is a charge transfer path, the horizontal light shielding portion 12H is disposed in at least a portion of the white region as described in FIGS. 7A, 7B, and 7C as well, and the charge generated through the photoelectric conversion is thus guided to the vertical gate electrode 52V through the gap between the horizontal light shielding portion 13H illustrated in FIG. 8 and the horizontal light shielding portion 12H disposed in the depth direction of the paper.

Figure 9:
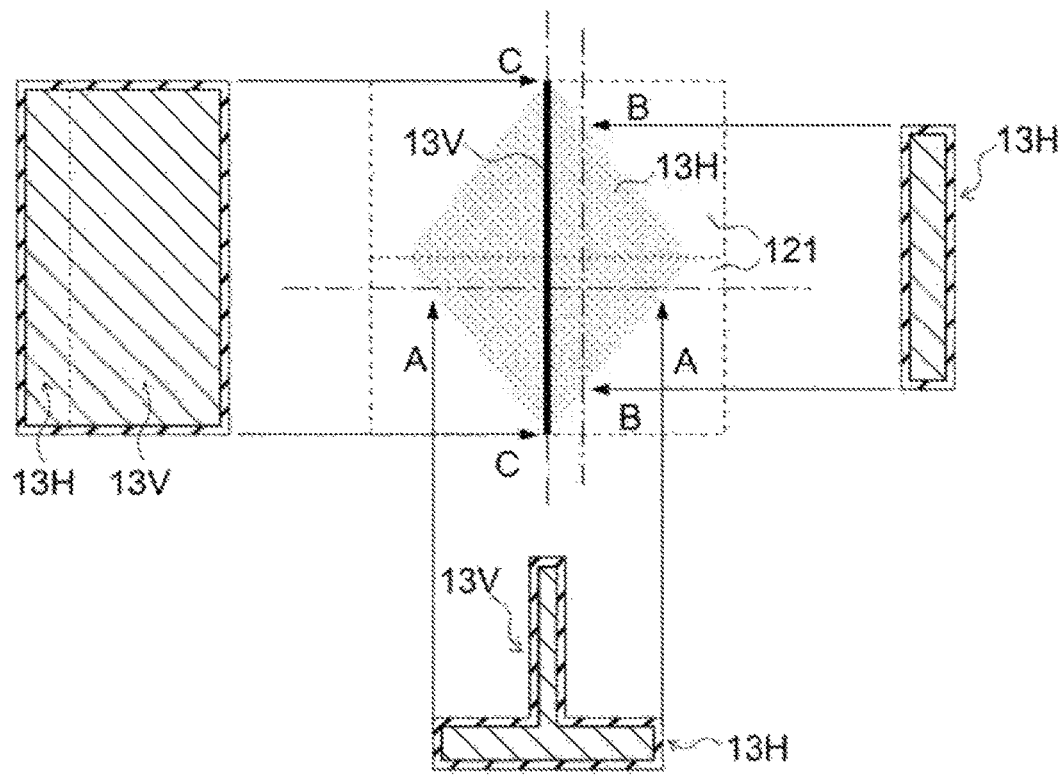
FIG. 9 is a diagram illustrating cross-sectional shapes at three locations of the horizontal light shielding portion constituting the first light shielding portion.

Although FIGS. 4A and 4B illustrate an example in which the cross-sectional shape of the first light shielding portion 13 is a T shape, the cross-sectional shape of the first light shielding portion 13 may change depending on a location from which the cross-section of the first light shielding portion 13 is obtained. FIG. 9 is a diagram illustrating cross-sectional shapes at three locations of the horizontal light shielding portion 13H constituting the first light shielding portion 13. The cross-sectional shape along the line A-A in FIG. 9 is a T shape, the cross-sectional shape along the line B-B is a thin and long rectangular shape corresponding to the thickness of the horizontal light shielding portion 13H, and the cross-sectional shape along the line C-C is a rectangular shape corresponding to a sum of the thickness of the horizontal light shielding portion 13H and the thickness of the vertical light shielding portion 13V.

In this manner, the cross-sectional shape of the first light shielding portion 13 changes in a plurality of ways depending on a position where the cross-section of the first light shielding portion 13 is obtained, and the cross-sectional shape of the first light shielding portion 13 is a T shape in a case where the cross-section is obtained at a specific location of the first light shielding portion 13.

Figure 10A:
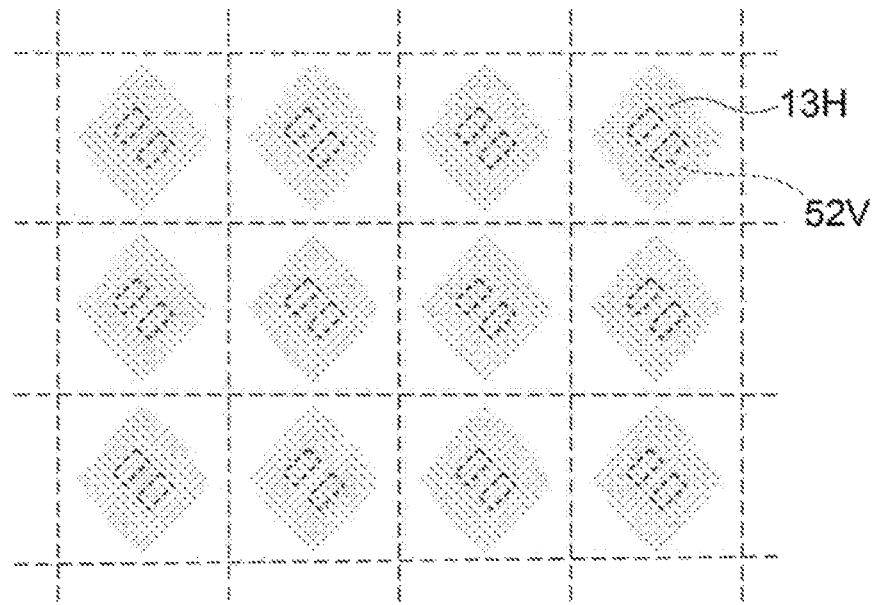
FIG. 10A is a plan view illustrating a positional relationship between the horizontal light shielding portion and the vertical light shielding portion.

FIG. 10A illustrates an example in which the horizontal light shielding portion 13H having a rhombus shape is provided in a pixel region, and the vertical gate electrode 52V is provided to have an orientation and length corresponding to an end face of the horizontal light shielding portion 13H. In FIG. 10A, the vertical gate electrode 52V is disposed such that the direction of an end side of the cross-section of the vertical gate electrode 52V in the horizontal direction is substantially parallel to an end side of the horizontal light shielding portion 13H. Thereby, a distance from the end side of the end face of the vertical gate electrode 52V in the horizontal direction to the end side of the horizontal light shielding portion 13H is substantially fixed at each side, and light shielding performance in each direction can be uniform.

Figure 10B:
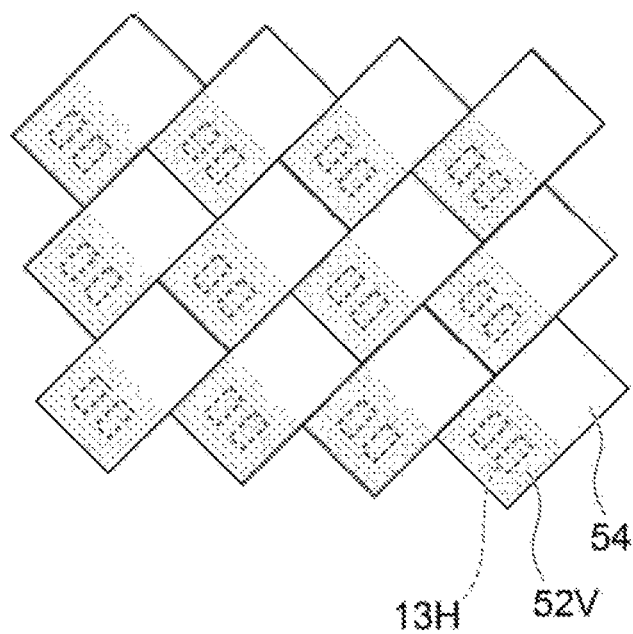
FIG. 10B is a plan view illustrating a positional relationship between a charge holding portion, the horizontal light shielding portion, and the vertical light shielding portion.

FIG. 10B illustrates an example in which the orientation and size of the charge holding unit (MEM) 54 are adjusted in accordance with the orientation and length of the vertical gate electrode 52V in FIG. 10A. In the example of FIG. 10B, the charge holding unit (MEM) 54 is disposed such that an end side of the charge holding unit (MEM) 54 is substantially parallel to each end side of the end face of the vertical gate electrode 52V in the horizontal direction end face. By aligning the orientation of each transfer transistor with the orientation of the vertical gate electrode 52V and aligning the orientation of the charge holding unit (MEM) 54, electrons collected by the vertical gate electrode 52V can be efficiently accumulated in the charge holding unit (MEM) 54.

The second light shielding portion 12 illustrated in FIG. 4A includes the vertical light shielding portion 12V and the horizontal light shielding portion 12H. In the example of FIG. 4A, the vertical light shielding portion 12V extends in the depth direction from the front surface side of the semiconductor substrate 11. The horizontal light shielding portion 12H extends in the horizontal direction from one end portion of the vertical light shielding portion 12V. The horizontal light shielding portion 12H has a function of reflecting light. The horizontal light shielding portions 12H are provided with opening portions 12H1 at some locations. The opening portions 12H1 are provided with etching stoppers 17. Although the horizontal light shielding portion 12H is formed by forming a trench in the depth direction and the horizontal direction by wet-etching processing and filling the trench with a light shielding member, the progress of etching can be stopped by providing the etching stoppers 17, and consequently, the opening portions 12H1 are formed in accordance with the positions of the vertical gate electrodes 52V. In the present embodiment, utilization of the silicon substrate 11 of the plane index (111) is assumed, and the wet-etching processing is performed using, for example, an etching solution with which it is possible to perform etching of the semiconductor substrate 11 in the <110> direction, for example, an alkali aqueous solution. The etching stoppers 17 can be formed using a material that exhibits etching resistance against the alkali aqueous solution, for example, a crystal defect structure obtained by injecting an impurity element such as boron (B) or hydrogen ions, an insulator such as an oxide, or the like.

The horizontal light shielding portions 12H are located between the photoelectric conversion unit 51 and the charge holding unit (MEM) 54 in the depth (Z-axis) direction. The horizontal light shielding portions 12H are provided over the entire XY plane of the pixel array unit 111 except for the opening portions 12H1. Light that has been incident from the rear surface 11B and has been transmitted through the photoelectric conversion unit 51 without being absorbed by the photoelectric conversion unit 51 is reflected by the horizontal light shielding portions 12H of the second light shielding portion 12, is then incident on the photoelectric conversion unit 51 again, and contributes to photoelectric conversion. In other words, the horizontal light shielding portions 12H of the second light shielding portion 12 function as reflectors and function to curb generation of noise due to the light transmitted through the photoelectric conversion unit 51 being incident on the charge holding unit (MEM) 54, improve photoelectric conversion efficiency Qe, and improve sensitivity. In addition, the vertical light shielding portions 12V of the second light shielding portion 12 function to prevent generation of noise such as color mixing due to light leaking from adjacent sensor pixels 121 being incident on the photoelectric conversion unit 51.

Various constituent materials of the first light shielding portion 13, the second light shielding portion 12, and the element separation portion 20 are conceivable. The constituent materials of the first light shielding portion 13, the second light shielding portion 12, and the element separation portion 20 are not necessarily the same, and may be different from each other. In addition, the materials of the first light shielding portion 13, the second light shielding portion 12, or the vertical light shielding portion 20V of the element separation portion 20 and the horizontal light shielding portion 20H may be changed. In addition, the first light shielding portion 13, the second light shielding portion 12, and the element separation portion 20 may be constituted by a plurality of layers. For example, the first light shielding portion 13, the second light shielding portion 12, and the element separation portion 20 may have a double-layered structure constituted by an inner layer portion and an outer layer portion, or may be constituted by three or more layers. Further, in a case where the first light shielding portion 13, the second light shielding portion 12, and the element separation portion 20 are constituted by a plurality of layers, the layers may have different optical characteristics.

The first light shielding portion 13, the second light shielding portion 12, and the element separation portion 20 have at least one of a characteristic of reflecting incident light and a characteristic of absorbing incident light as the optical characteristics thereof. In a case where the first light shielding portion 13, the second light shielding portion 12, and the element separation portion 20 are constituted by a plurality of layers, at least some of the layers may have at least one of a light reflection characteristic and a light absorption characteristic.

The materials of the first light shielding portion 13, the second light shielding portion 12, and the element separation portion 20 include insulators, metals, polysilicon, metal oxides, carbon-containing materials, or electrochromic materials. The insulators are, for example, SiN, SiO2, and the like. The metals are, for example, tungsten, aluminum, and the like. Tungsten has a property of absorbing light, while aluminum has a property of reflecting light. Polysilicon has a property of reflecting light. The metal oxide is, for example, aluminum oxide, aluminum nitride, or the like. The carbon-containing material is, for example, a carbon compound, an organic material, or the like. The electrochromic material is a material capable of switching a light reflectance or absorptivity by applying a voltage or a current thereto (for example, polyaniline, porogen, or the like).

More specifically, the first light shielding portion 13 may also have a double-layered structure constituted by an inner layer portion 13A and an outer layer portion 13B that surrounds the periphery of the inner layer portion 13A. In addition, the second light shielding portion 12 may also have a double-layered structure constituted by an inner layer portion 12A and an outer layer portion 12B that surrounds the periphery of the inner layer portion 12A. The inner layer portions 12A and 13A are formed of a material containing at least one type of a single metal, a metal alloy, a metal nitride, and a metal silicide with a light shielding property, for example. More specifically, examples of the constituent materials of the inner layer portions 12A and 13A include Aluminum (Al), copper (Cu), cobalt (Co), tungsten (W), titanium (Ti), tantalum (Ta), nickel (Ni), molybdenum (Mo), chromium (Cr), iridium (Ir), platinum iridium, titanium nitride (TiN), and a tungsten silicon compound. In particular, Aluminum (Al) is the most preferable constituent material in terms of optics. Note that the inner layer portions 12A and 13A may be formed of graphite or an organic material. The outer layer portions 12B and 13B are formed of an insulating material such as silicon oxide (SiOx), for example. The outer layer portions 12B and 13B secure electrical insulation between the inner layer portions 12A and 13A and the semiconductor substrate 11.

FIGS. 11A, 11B, 11C, and 11D are diagrams illustrating a cross-sectional configuration of the first light shielding portion 13, the second light shielding portion 12, or the element separation portion 20. FIGS. 11A, 11B, 11C, and 11D illustrate an example in which the cross-section of the first light shielding portion 13, the second light shielding portion 12, or the element separation portion 20 in the depth direction has a T shape. In addition, FIGS. 11A, 11B, 11C, and 11D illustrate an example in which the first light shielding portion 13, the second light shielding portion 12, or the element separation portion 20 has a double-layered structure constituted by an inner layer portion and an outer layer portion, and the outer layer portion is formed as an insulating layer.

Figure 11A:
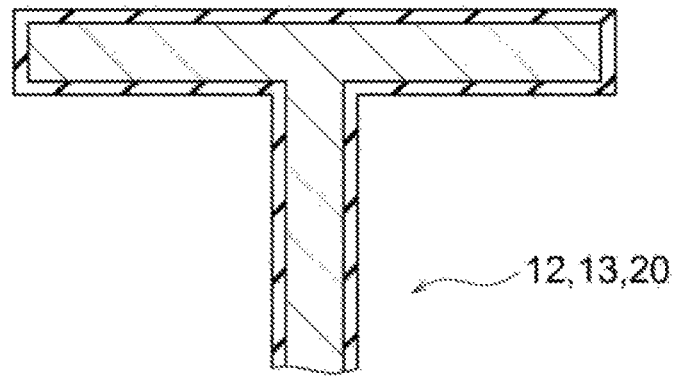
FIG. 11A is a diagram illustrating a cross-sectional configuration of the first light shielding portion, a second light shielding portion, or an element separation portion.
Figure 11B:
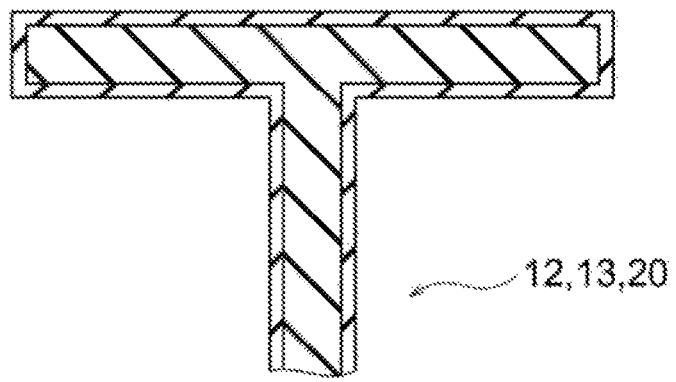
FIG. 11B is a diagram illustrating a cross-sectional configuration of the first light shielding portion, a second light shielding portion, or the element separation portion.
Figure 11C:
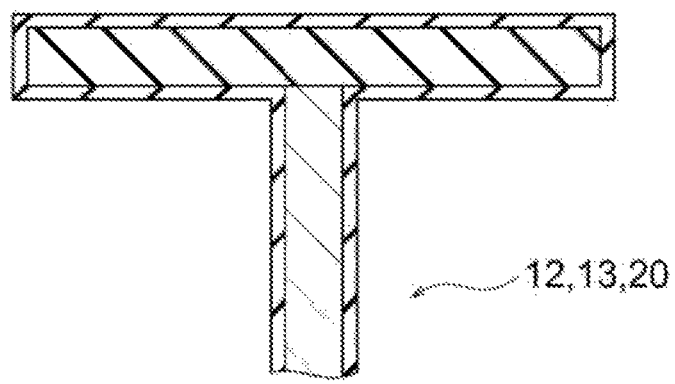
FIG. 11C is a diagram illustrating a cross-sectional configuration of the first light shielding portion, a second light shielding portion, or the element separation portion.
Figure 11D:
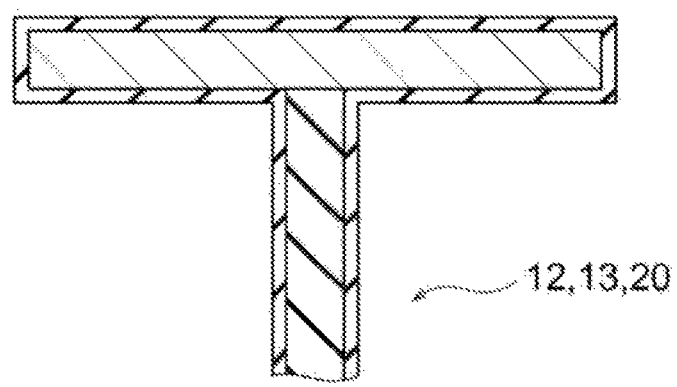
FIG. 11D is a diagram illustrating a cross-sectional configuration of the first light shielding portion, a second light shielding portion, or the element separation portion.

FIG. 11A illustrates an example in which both the vertical light shielding portion and the horizontal light shielding portion of the first light shielding portion 13, the second light shielding portion 12, or the element separation portion 20 are formed of a metal material, polysilicon, or an electrochromic material. Light reflection characteristics or light absorption characteristics can be provided depending on the type of metal, or the like. FIG. 11B illustrates an example in which both the vertical light shielding portion and the horizontal light shielding portion of the first light shielding portion 13, the second light shielding portion 12, or the element separation portion 20 are formed of an insulator, a metal oxide, or a carbon-containing material. Light reflection characteristics or light absorption characteristics can be provided depending on the type of insulator, or the like. FIG. 11C illustrates an example in which the vertical light shielding portion of the first light shielding portion 13, the second light shielding portion 12, or the element separation portion 20 is formed of an insulator, a metal oxide, or a carbon-containing material, and the horizontal light shielding portion thereof is formed of a metal material, polysilicon, or an electrochromic material. FIG. 11D illustrates an example in which the vertical light shielding portion of the first light shielding portion 13, the second light shielding portion 12, or the element separation portion 20 is formed of a metal material, polysilicon, or an electrochromic material, and the horizontal light shielding portion thereof is formed of an insulator, a metal oxide, or a carbon-containing material.

FIGS. 11A, 11B, 11C, and 11D illustrate an example of a layer configuration of the first light shielding portion 13, the second light shielding portion 12, or the element separation portion 20, and other layer configurations may be used.

First Example of Process of Manufacturing Imaging Apparatus 101

Next, a first example of a process of manufacturing the imaging apparatus 101 will be described. FIGS. 12A, 12B, 12C, 12D, 12E, 12F, 12G, 12H, 12I, 12J, 12K, 12L, 12M, 12N, 12O, 12P, 12Q, 12R, 12S, and 12T are process cross-sectional views illustrating the first example of the process of manufacturing the imaging apparatus 101 according to the first embodiment. Note that processes of forming the second light shielding portion 12 and the first light shielding portion 13 will be mainly described below, and a process of forming the reading circuit 120, and the like will be omitted.

Figure 12A:
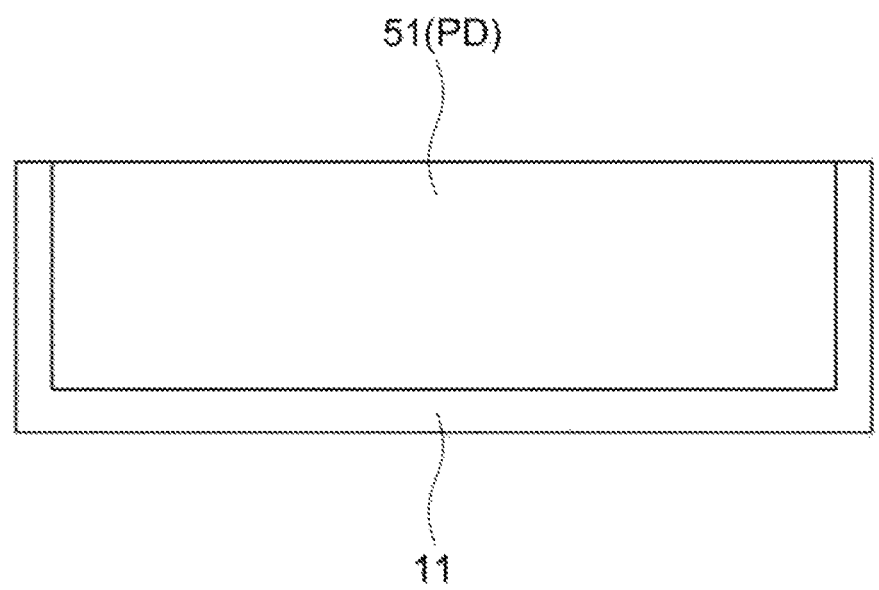
FIG. 12A is a cross-sectional view illustrating a process of manufacturing the imaging apparatus 101 according to the first embodiment.
Figure 12B:
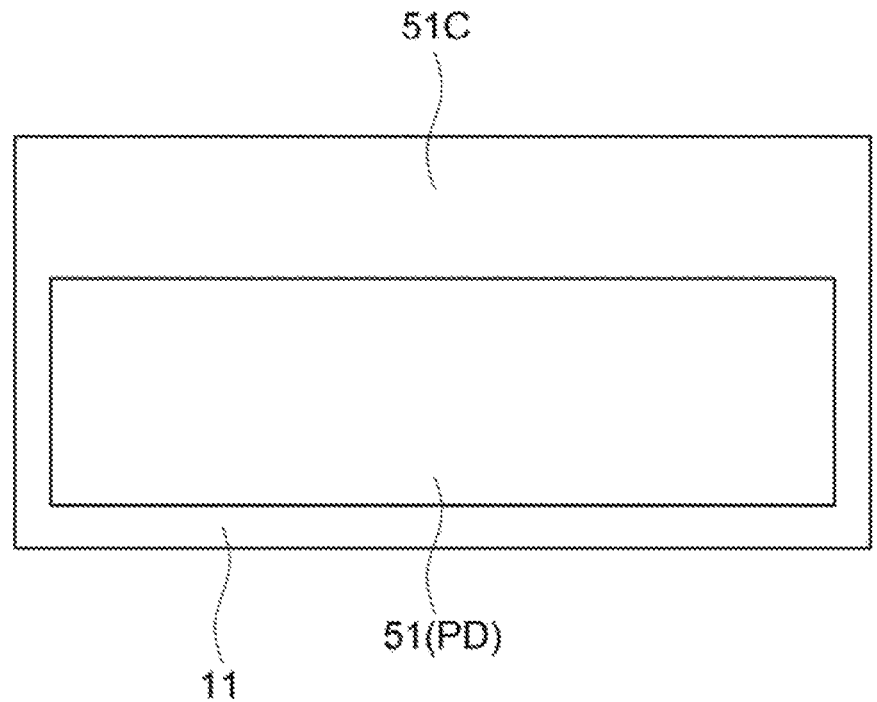
FIG. 12B is a cross-sectional view illustrating a manufacturing process, which continues from FIG. 12A.

First, as illustrated in FIG. 12A, the photoelectric conversion unit 51 constituted by the photodiode PD is formed on the silicon substrate 11 of a plane index (111). The photoelectric conversion unit 51 has a structure in which an N⁻-type semiconductor region 51A, an N-type semiconductor region 51B, and a P-type semiconductor region 51C are laminated as illustrated in FIG. 4A, for example. Next, as illustrated in FIG. 12B, a thick semiconductor layer is formed on the silicon substrate 11 by epitaxial growth. The semiconductor layer is, for example, the P-type semiconductor region 51C.

Figure 12C:
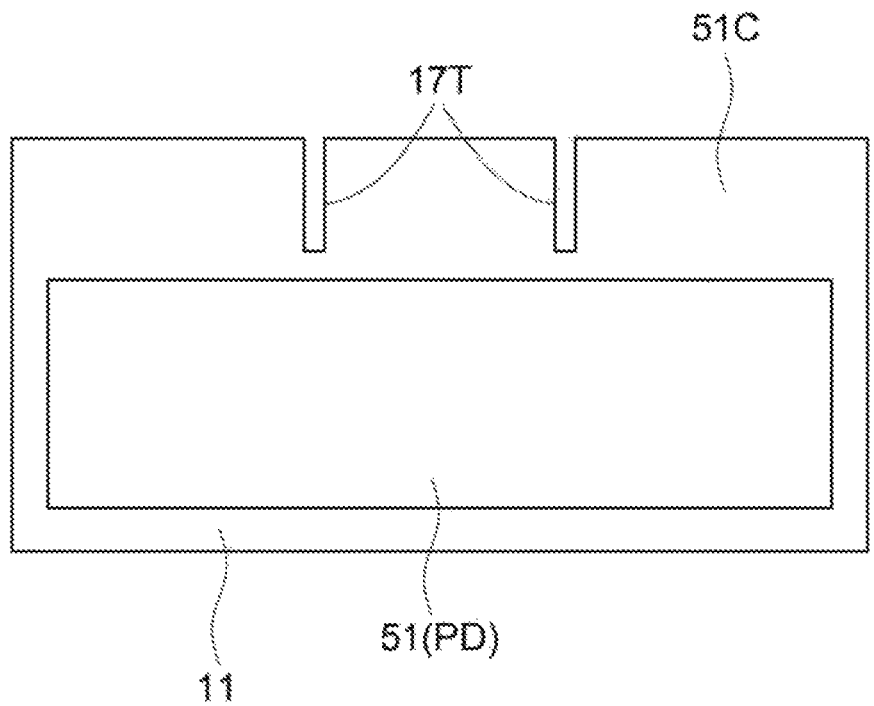
FIG. 12C is a cross-sectional view illustrating a manufacturing process, which continues from FIG. 12B.

Next, as illustrated in FIG. 12C, a trench 17T is formed in accordance with the position of the etching stopper 17 used when the horizontal light shielding portion 12H of the second light shielding portion 12 is formed. The trench 17T is formed by dry etching using a hard mask, for example. The hard mask is formed of an insulating material such as SiN (silicon nitride) or SiO2 (silicon oxide).

Figure 12D:
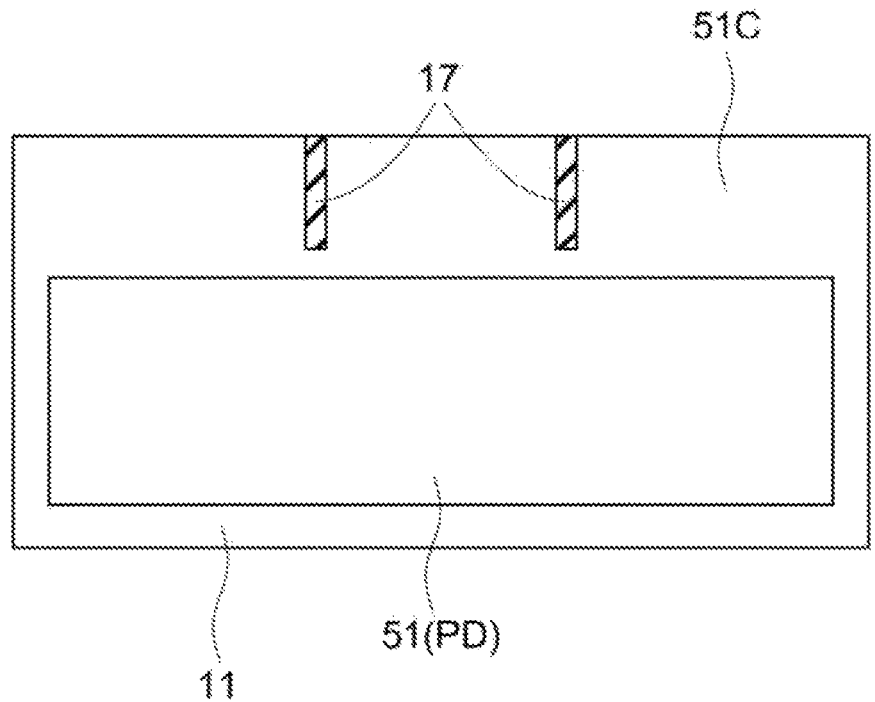
FIG. 12D is a cross-sectional view illustrating a manufacturing process, which continues from FIG. 12C.
Figure 12E:
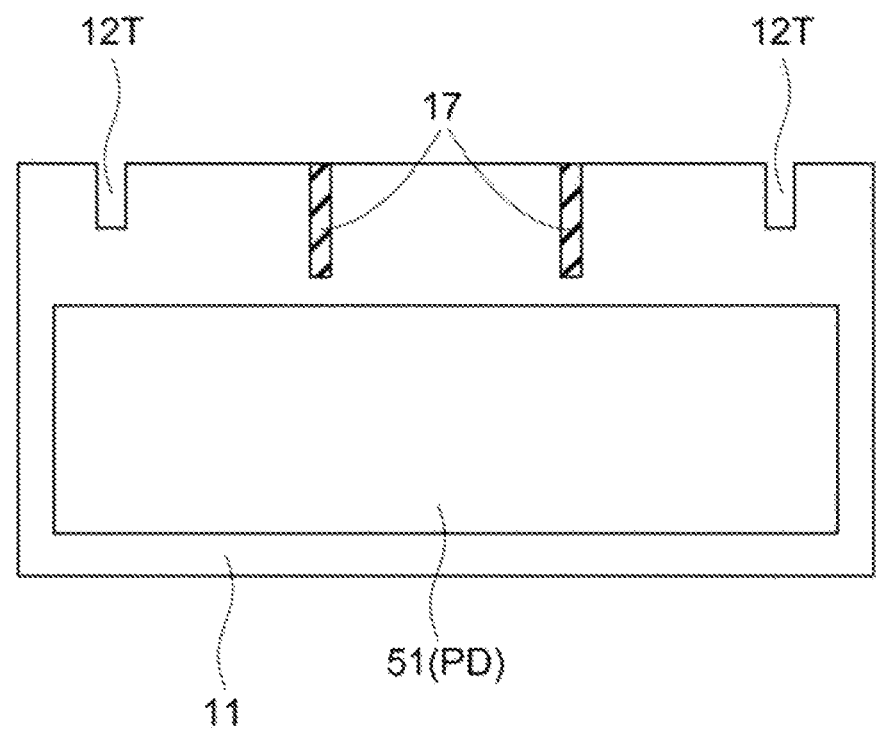
FIG. 12E is a cross-sectional view illustrating a manufacturing process, which continues from FIG. 12D.

Next, as illustrated in FIG. 12D, the etching stopper 17 is formed by filling the trench 17T with an insulator such as an oxide. Next, as illustrated in FIG. 12E, the trench 12T is formed in accordance with the position of the vertical light shielding portion 12V of the second light shielding portion 12 through dry-etching or the like using a hard mask.

Figure 12F:
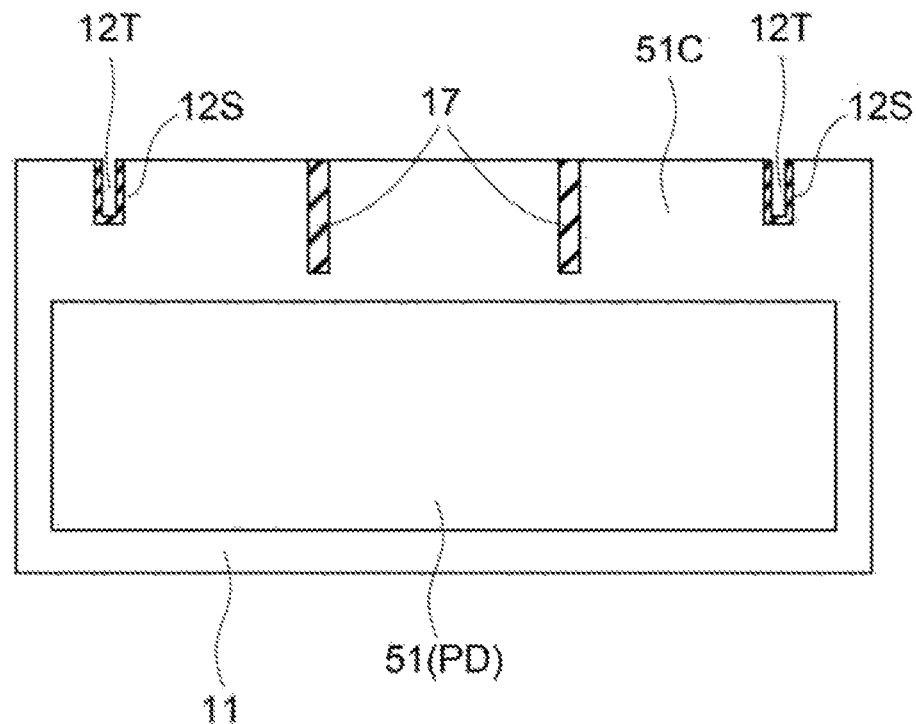
FIG. 12F is a cross-sectional view illustrating a manufacturing process, which continues from FIG. 12E.
Figure 12G:
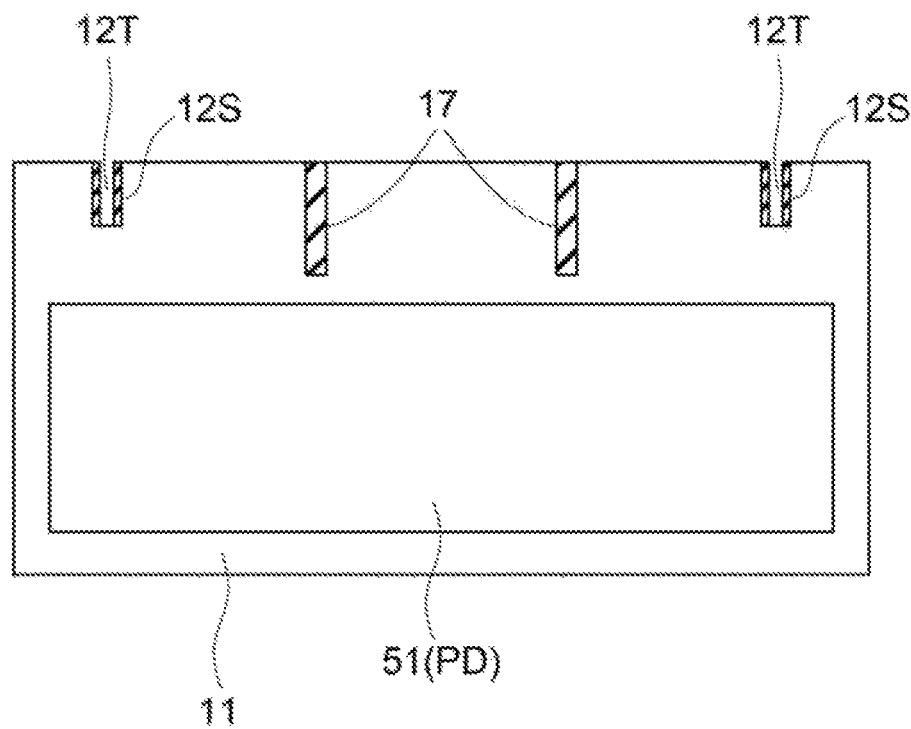
FIG. 12G is a cross-sectional view illustrating a manufacturing process, which continues from FIG. 12F.

Next, as illustrated in FIG. 12F, a side wall 12S is formed to cover the side surface and the bottom surface of the trench 12T. The side wall 12S is formed of an insulating film formed of SiN or SiO2, for example. Next, as illustrated in FIG. 12G, the insulating film at the bottom surface is removed with the insulating film at the side surface portion of the trench 12T left through dry etching, for example. At this time, it is preferable to use a constituent material of the side wall 12S that is different from the constituent material of the hard mask in order to cause the hard mask that selectively covers the front surface 11A of the silicon substrate 11 to be left without being removed through the dry etching.

Figure 12H:
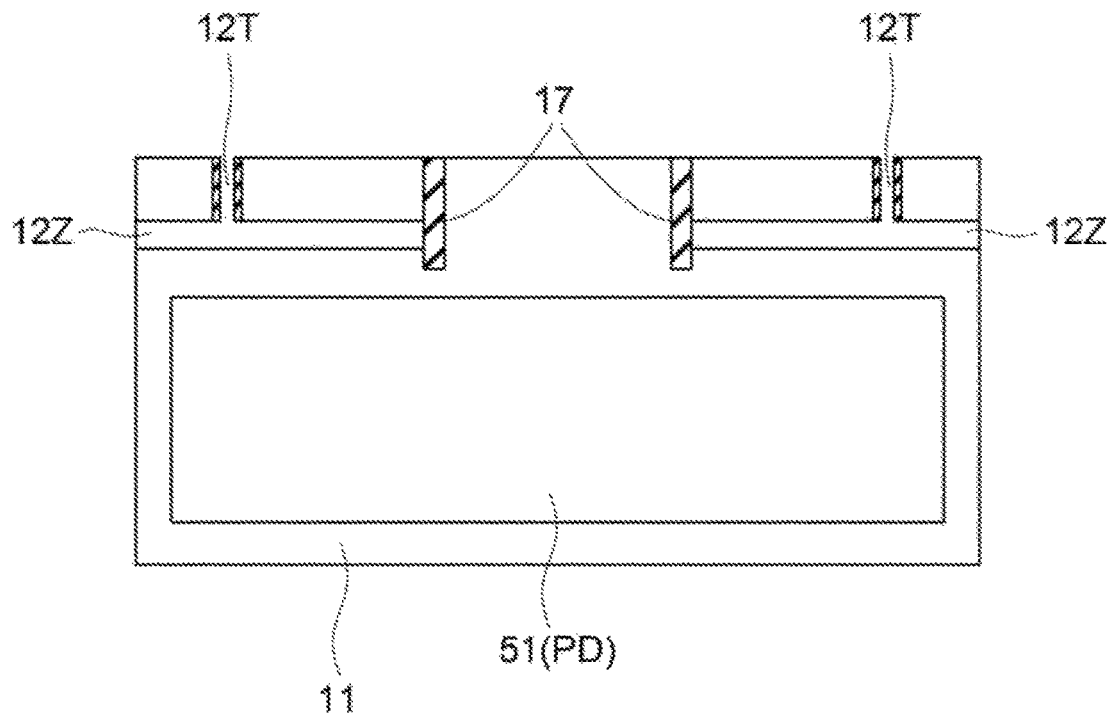
FIG. 12H is a cross-sectional view illustrating a manufacturing process, which continues from FIG. 12G.

Next, as illustrated in FIG. 12H, a predetermined alkali aqueous solution is injected to the trench 12T, and wet etching is performed thereon, thereby partially removing the silicon substrate 11. As the alkali aqueous solution, it is possible to apply KOH, NaOH, CsOH, or the like as an inorganic solution, and it is possible to apply an aqueous solution of ethylene diamine pyrocatechol (EDP), N2H4 (hydrazine), NH4OH (ammonium hydroxide), or tetramethyl ammonium hydroxide (TMAH) or the like as an organic solution.

Here, crystal anisotropy etching using a characteristic that etching rates differ depending on the plane orientation of Si (111) is performed. Specifically, the etching rate in the <110> direction is sufficiently high relative to the etching rate in the <111> direction in the silicon (111) substrate. Therefore, etching advances in the X-axis direction while etching hardly advances in the Y-axis direction and the Z-axis direction in the present embodiment. As a result, a space 12Z that communicates with the trench 12T and is surrounded by the first crystal plane 11S1, the second crystal plane 11S2, and the third crystal plane 11S3 is formed inside the semiconductor substrate 11 that is a silicon (111) substrate.

Note that a distance of progress of the etching in the <110> direction can be adjusted by a processing time of the etching performed on the semiconductor substrate 11 by using the alkali aqueous solution. However, it is possible to easily control the progress of the etching in the <110> direction and to accurately secure a region where Si (111) remains, by providing the etching stoppers 17 at predetermined positions in advance as in the present embodiment. The progress of the etching in the <110> direction is stopped by the etching stoppers 17, and as a result, two third crystal planes 11S3 spreading from one etching stopper 17 as a starting point and represented by the plane index (111) are formed (see FIG. 4A).

Note that, in FIG. 4A, a space 12Z having a rhombus shape when seen in a plan view is formed by two second crystal planes 11S2 and two third crystal planes 11S3 that spread with two etching stoppers 17 as starting points. The rhombus-shaped region surrounded by the two second crystal planes 11S2 and the two third crystal planes 11S3 is an Si-remaining region, which is surrounded by the horizontal light shielding portions 12H of the light shielding portion 12, the Si-remaining region being a region in which Si (111) finally remains.

As illustrated in FIG. 12H, after the space 12Z extending in the horizontal direction is formed, a hard mask HM and a side wall 12S are removed through wet etching, for example. Note that the hard mask HM and the side wall 12S can be removed through isotropic dry etching in some cases. In the wet etching, it is preferable to use a chemical containing hydrofluoric acid (HF) such as dilute hydrofluoric acid (DHF) or buffered hydrofluoric acid (BHF), for example, in a case where the hard mask HM and the like are formed of SiO2. Alternatively, it is preferable to use a chemical containing a hot phosphoric acid or HF in a case where the hard mask HM and the like are formed of SiN. Note that the hard mask HM and the side wall 12S may not be removed.

Figure 12I:
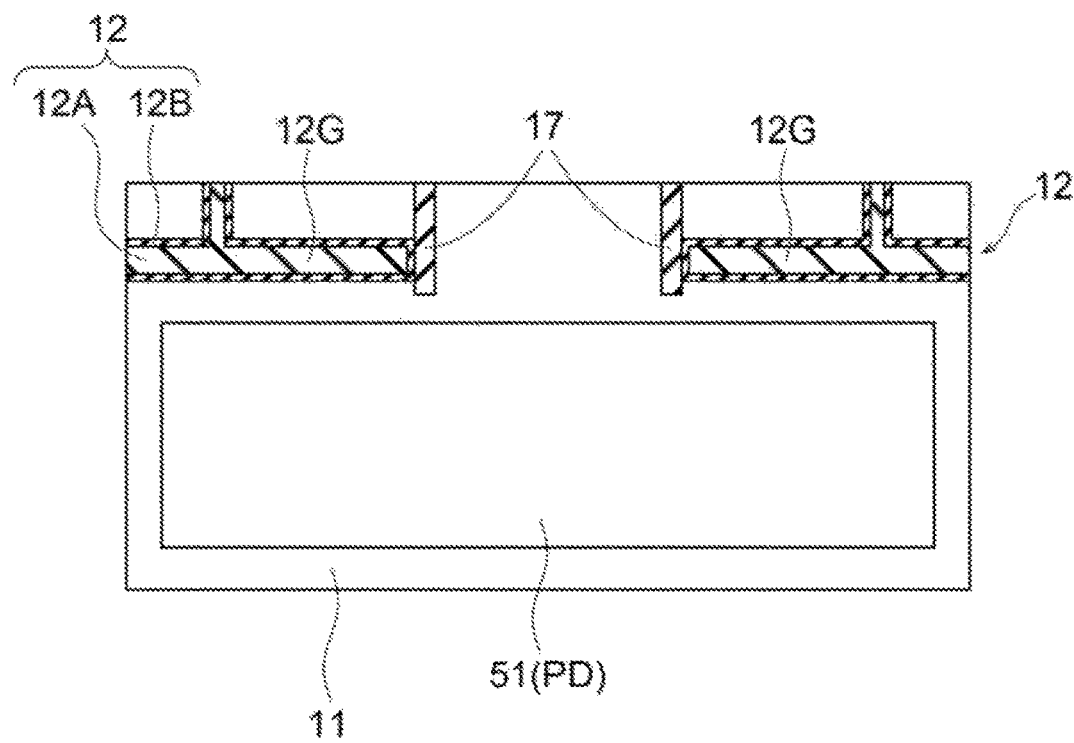
FIG. 12I is a cross-sectional view illustrating a manufacturing process, which continues from FIG. 12H.

Next, as illustrated in FIG. 12I, the outer layer portion 12B is formed using an insulating material or the like to cover the side surface of the trench 12T, the inner surface of the space 12Z, and the front surface 11A of the semiconductor substrate 11, and the inside of the outer layer portion is filled with the inner layer portion 12A to fill the trench 12T and the space 12Z. Thereby, the second light shielding portion 12 including the vertical light shielding portions 12V that occupy the trench 12T and the horizontal light shielding portions 12H that occupy the space 12Z is formed. Note in order to fill the space 12Z without any gaps, it is preferable that the width of the trench 12T (the dimension in the X-axis direction) is wider than the thickness of the space 12Z (the dimension in the Z-axis direction). In addition, in a case where the inner layer portion 12A is filled with the above-described metal material in this stage, it is difficult to perform the following processing at a high temperature. Thus, it is preferable that the trench 12T and the space 12Z be temporarily filled with a temporarily filling material 12G with relatively excellent heat resistance, such as SiO2, SiN, or polysilicon, the following process at a high temperature be terminated, the process of forming, for example, the element separation portions 20 be then terminated, and the replacement with a predetermined metal material be performed. FIG. 12I illustrates an example in which the temporarily filling material 12G such as SiO2 is formed at the inner layer portions of the trench and the space.

Note that the filling of the trench 12T may be performed through solid phase diffusion. More specifically, an insulating layer such as a SiO2 film containing P (phosphorus) that is an N-type impurity element, for example, is formed to cover the inner surface of the trench and the inner surface of the space. Next, P (phosphorus) contained in the insulating layer is solid-phase diffused to the inner surface of the trench and the inner surface of the space in the semiconductor substrate 11 through heat treatment. Thereafter, the insulating layer is removed, the heat treatment is then performed again, and P (phosphorus) is diffused into the semiconductor substrate 11 to thereby form an N-type region. Next, an insulating layer such as a SiO2 film containing B (boron) that is a P-type impurity element is formed to cover the N-type region. Thereafter, B (boron) contained in the insulating layer is solid-phase diffused toward the inner surface of the trench and the inner surface of the space through heat treatment. In this manner, a solid phase diffusion layer in which a P-type region is disposed inside the N-type region is obtained.

Figure 12J:
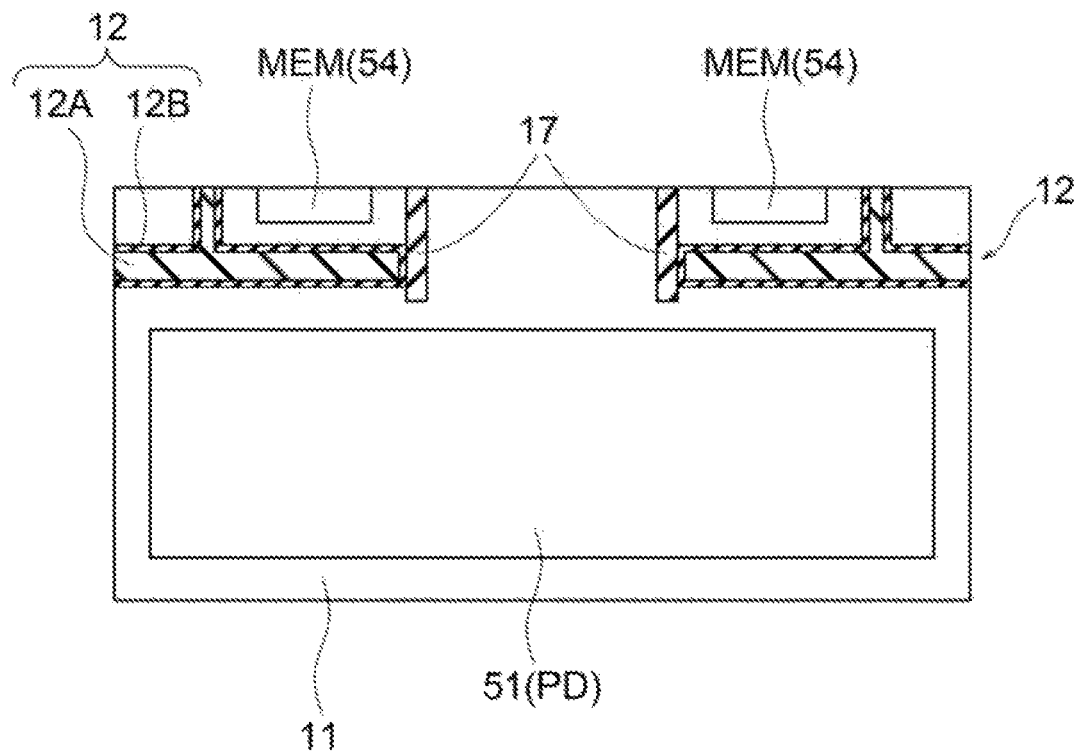
FIG. 12J is a cross-sectional view illustrating a manufacturing process, which continues from FIG. 12I.

Next, as illustrated in FIG. 12J, an N-type semiconductor region 54 that functions as the charge holding unit (MEM) 54 is formed on the front surface 11A side of the semiconductor substrate 11 formed of Si (111). Along with the formation of the charge holding unit (MEM) 54, an N-type semiconductor region 54 that functions as a floating diffusion is also formed.

Figure 12K:
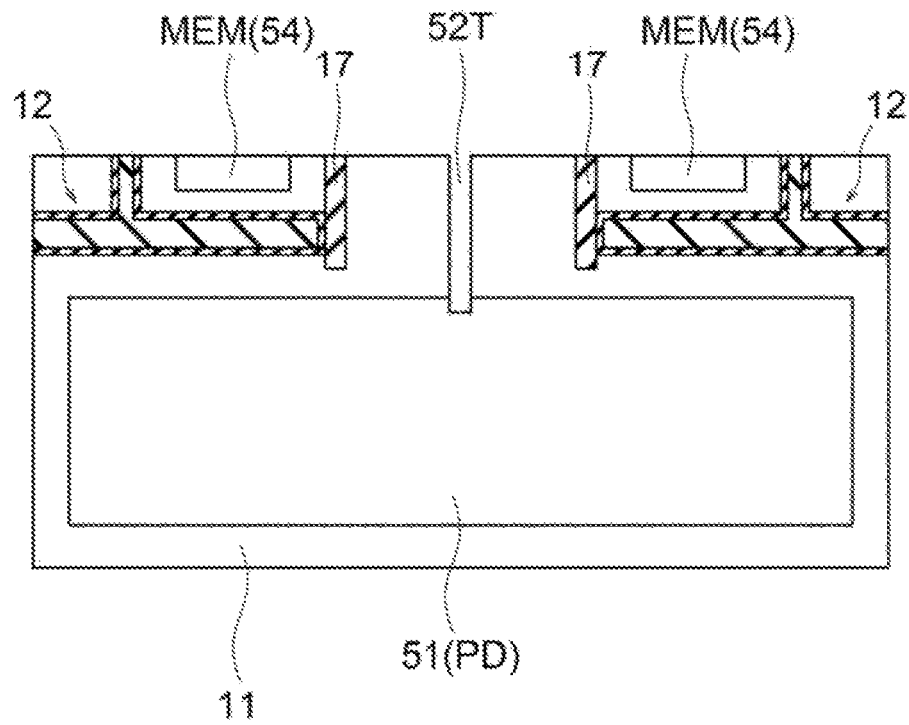
FIG. 12K is a cross-sectional view illustrating a manufacturing process, which continues from FIG. 12J.
Figure 12L:
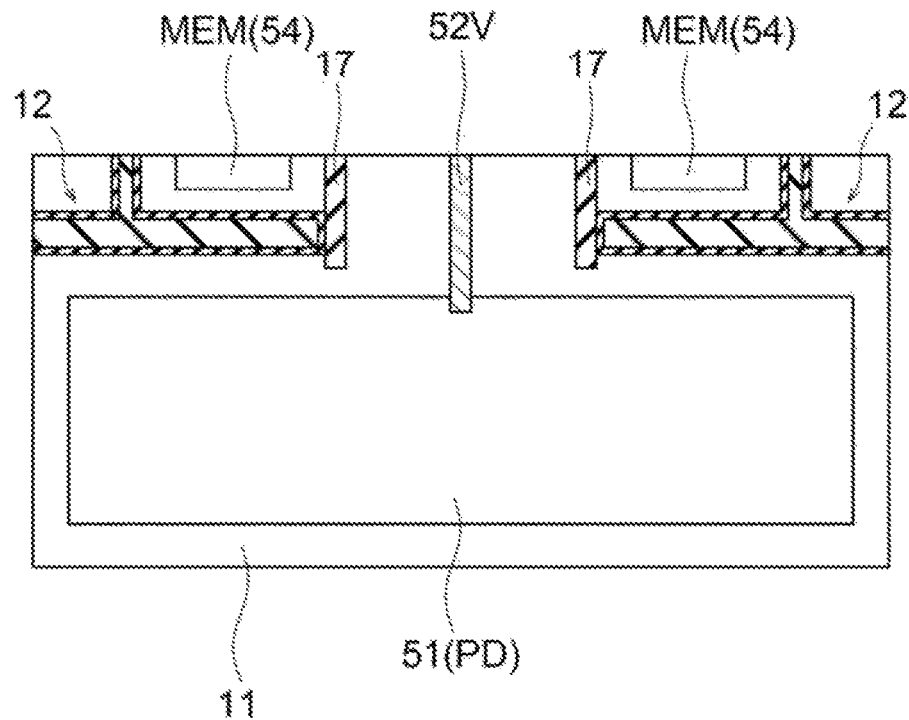
FIG. 12L is a cross-sectional view illustrating a manufacturing process, which continues from FIG. 12K.

Next, as illustrated in FIG. 12K, a trench 52T is formed in accordance with the position of the vertical gate electrode 52V. The method of forming the trench 52T is similar to that of the trench 12T for the second light shielding portion 12 described above. Next, as illustrated in FIG. 12L, the vertical gate electrode 52V is formed by filling the trench 52T with, for example, polysilicon.

Figure 12M:
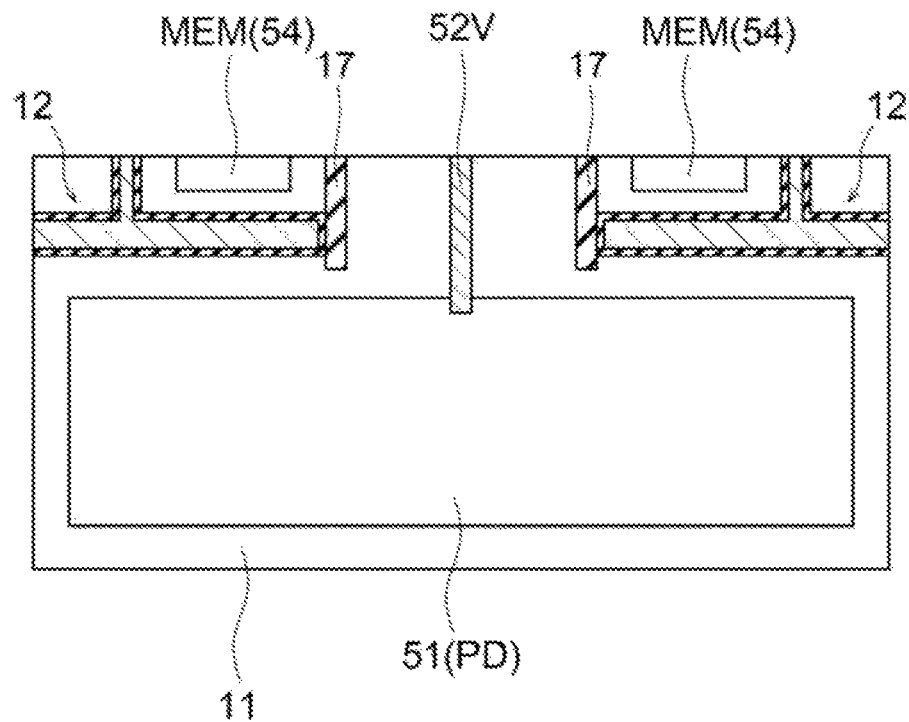
FIG. 12M is a cross-sectional view illustrating a manufacturing process, which continues from FIG. 12L.

Then, as illustrated in FIG. 12M, the insulator or the like that is the inner layer portion 12A of the trench 12T and the space 12Z in the second light shielding portion 12 is replaced with a metal material to form the second light shielding portion 12. The metal material of the inner layer portion includes a material containing at least one type of a single metal, a metal alloy, a metal nitride and metal silicide with a light shielding property.

Figure 12N:
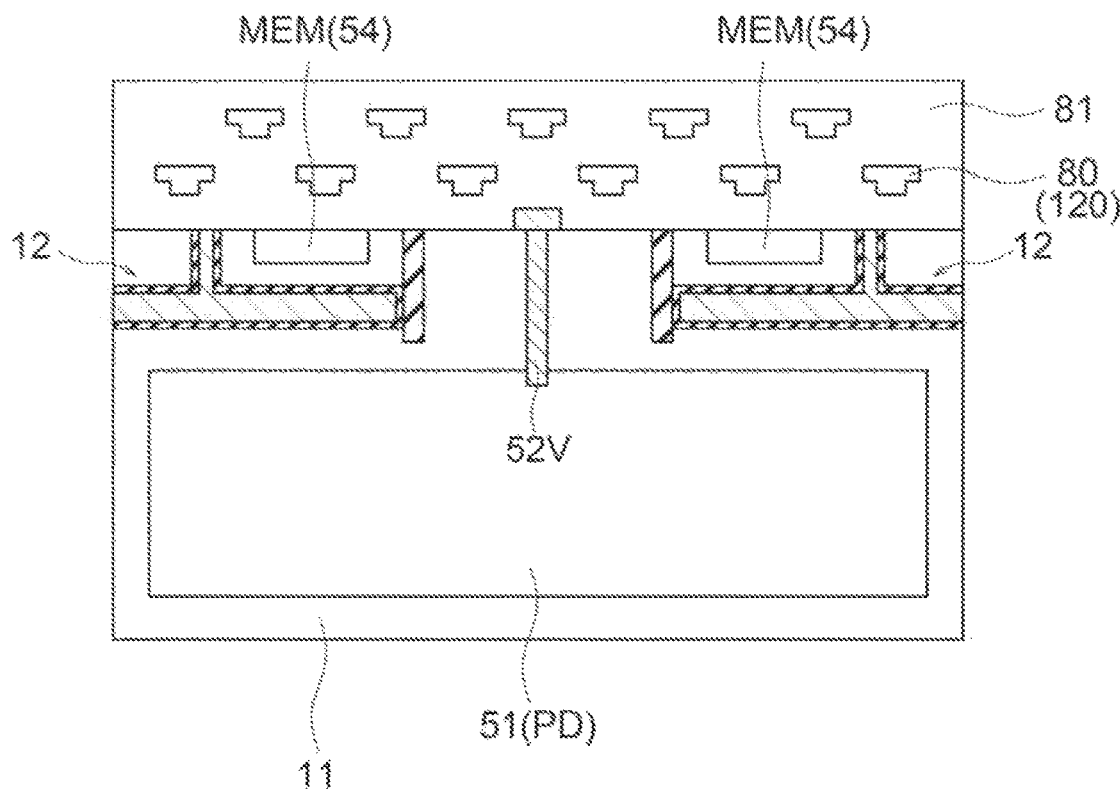
FIG. 12N is a cross-sectional view illustrating a manufacturing process, which continues from FIG. 12M.

Next, as illustrated in FIG. 12N, the reading circuit 120 and the wiring layer 80 are formed on the side of the front surface 11A of the semiconductor substrate 11. The reading circuit 120 may be formed on another semiconductor substrate 11, and the semiconductor substrates 11 may be attached to each other.

Figure 12O:
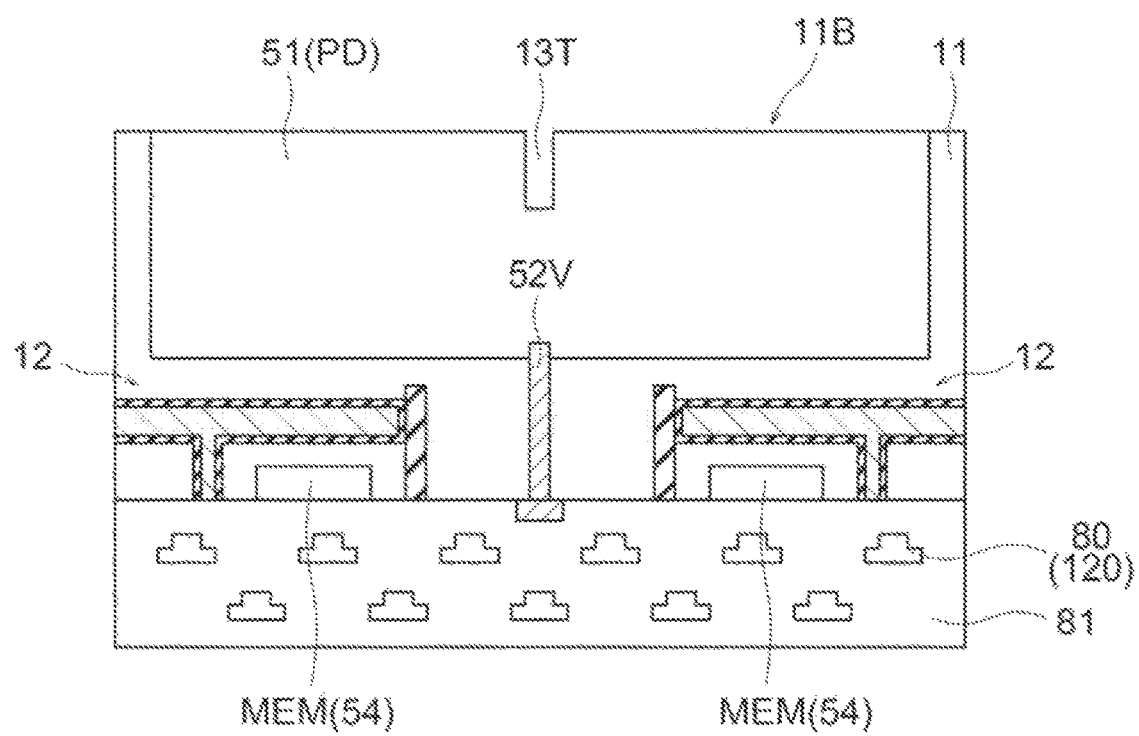
FIG. 12O is a cross-sectional view illustrating a manufacturing process, which continues from FIG. 12N.
Figure 12P:
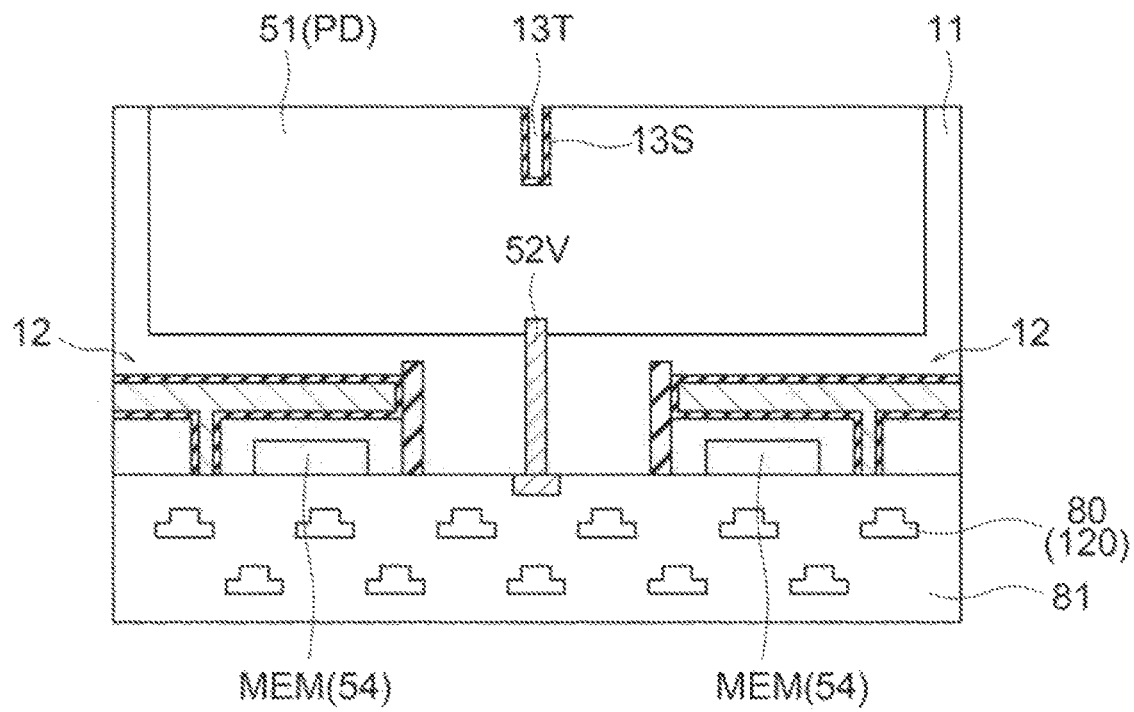
FIG. 12P is a cross-sectional view illustrating a manufacturing process, which continues from FIG. 12O.
Figure 12Q:
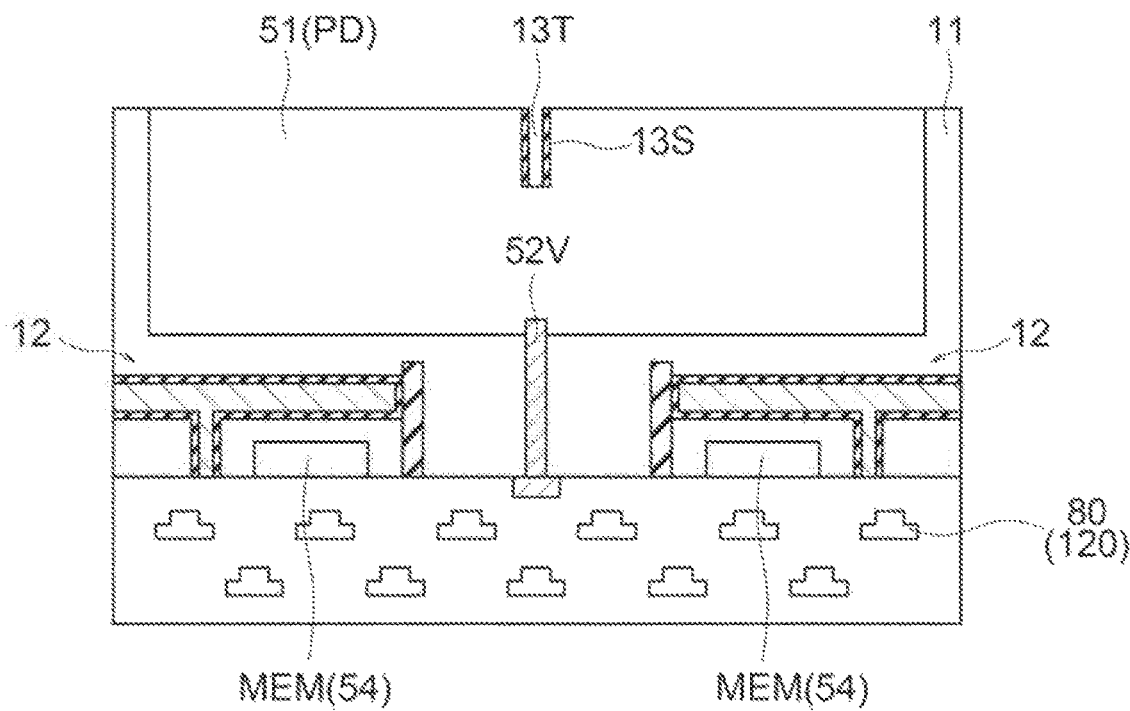
FIG. 12Q is a cross-sectional view illustrating a manufacturing process, which continues from FIG. 12P.

Next, as illustrated in FIG. 12O, the side of the rear surface 11B of the semiconductor substrate 11 may be thinned through chemical mechanical polishing (CMP) or the like to form a trench 13T in accordance with the position of the first light shielding portion 13. The method of forming the trench 13T is similar to that of the trench 12T for the second light shielding portion 12 described above. Next, as illustrated in FIG. 12P, a side wall 13S is formed to cover the side surface and the bottom surface of the trench 13T. The side wall 13S is formed of an insulating film formed of SiN or SiO2, for example. Next, as illustrated in FIG. 12Q, the insulating film at the bottom surface is removed with the insulating film at the side surface portion of the trench 13T left, for example, through dry etching.

Figure 12R:
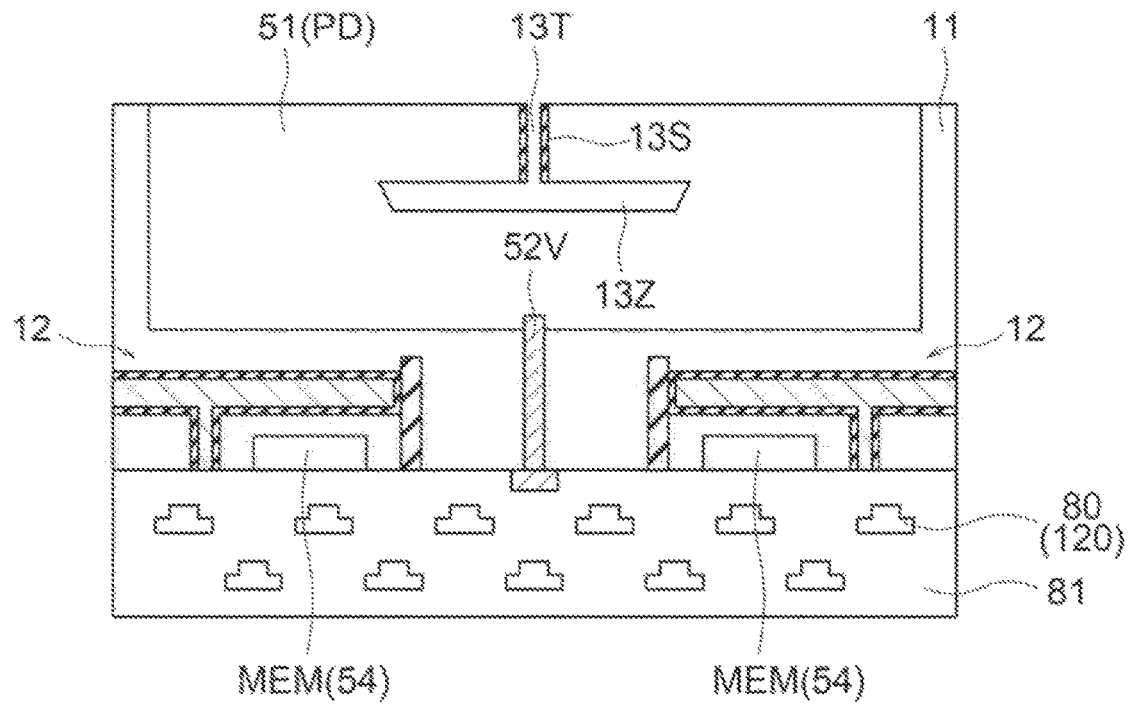
FIG. 12R is a cross-sectional view illustrating a manufacturing process, which continues from FIG. 12Q.

Next, as illustrated in FIG. 12R, a predetermined alkali aqueous solution is injected into the trench 13T, and anisotropic etching is performed thereon, thereby forming a space 13Z spreading in the horizontal direction. The space 13Z includes two third crystal planes 11S3 represented by the plane index (111), similar to the space 12Z formed when the second light shielding portion 12 is formed. As a result, the shape of the space 13Z is a rhombus shape when seen in a plan view, as illustrated in FIG. 6B.

Figure 12S:
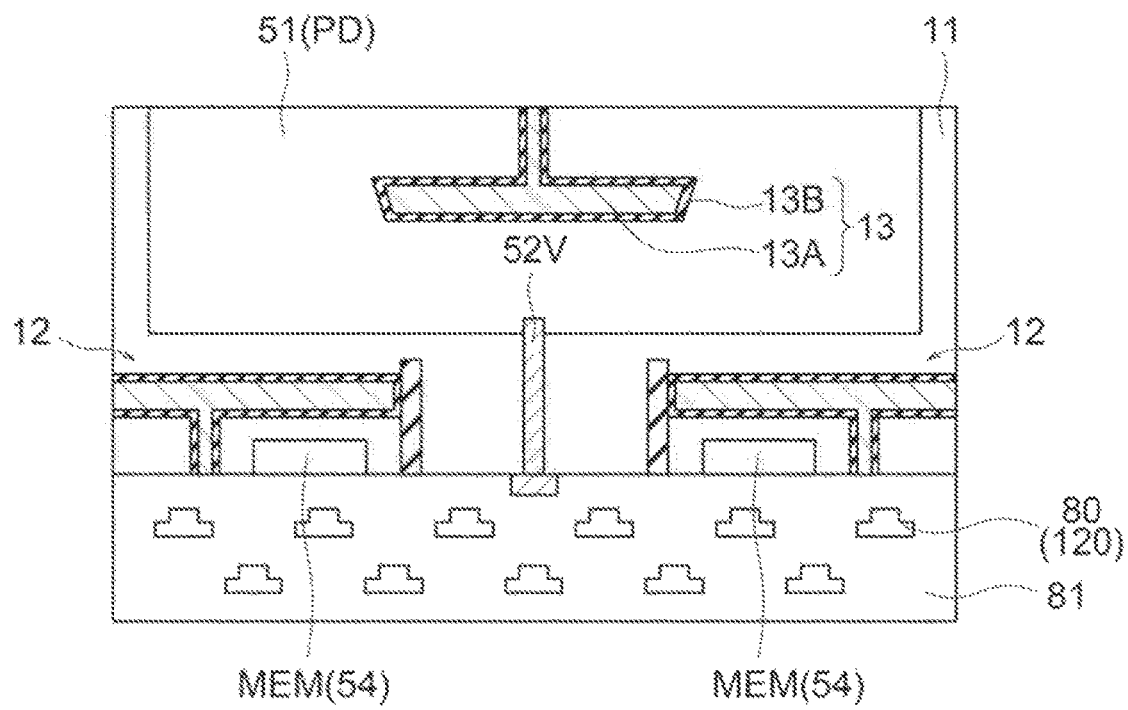
FIG. 12S is a cross-sectional view illustrating a manufacturing process, which continues from FIG. 12R.

Next, as illustrated in FIG. 12S, the hard mask and the side wall used to form the trench 13T are removed, for example, through wet etching, and an outer layer portion 13B formed of an insulating material and an inner layer portion 13A formed of a metal material are then formed on the side surface of the trench 13T and the inner surface of the space. As described above, an insulating material, polysilicon, or the like may be temporarily embedded as the inner layer portion 13A.

Figure 12T:
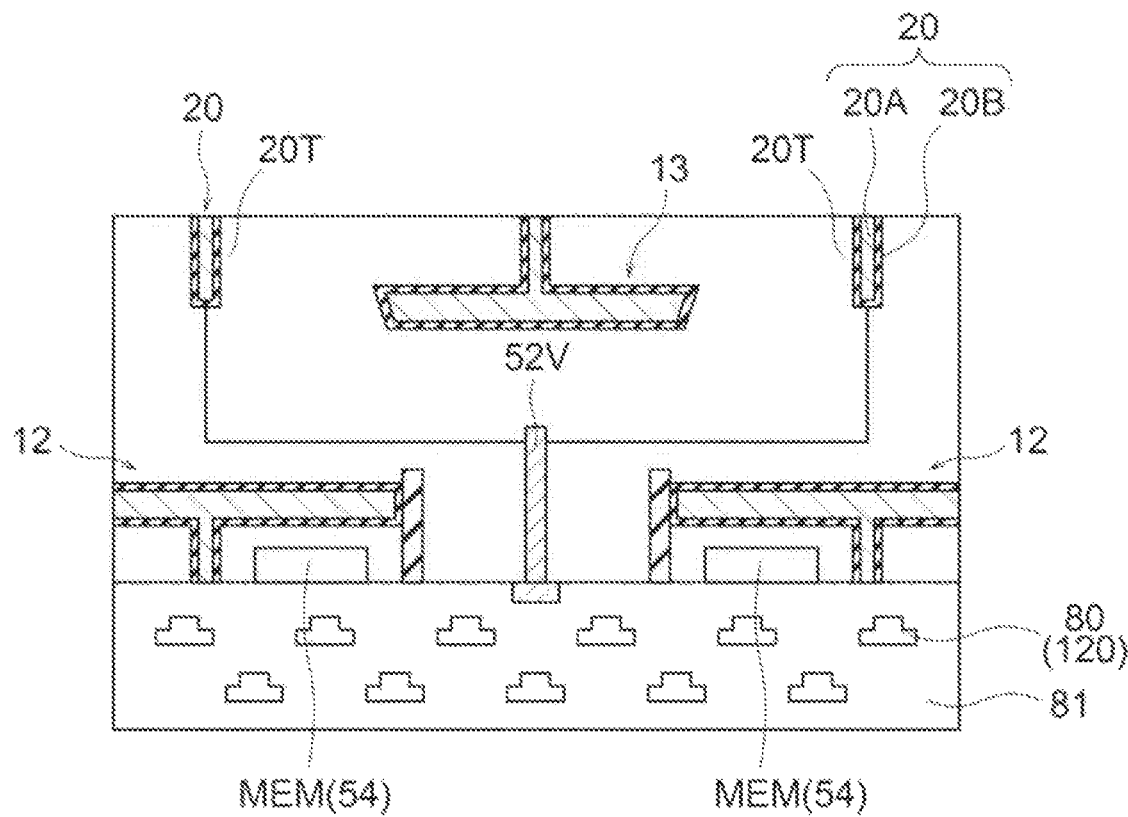
FIG. 12T is a cross-sectional view illustrating a manufacturing process, which continues from FIG. 12S.

Next, as illustrated in FIG. 12T, a trench 20T for element separation is formed along the boundary portion of the pixels, and an outer layer portion 20B formed of an insulating material and an inner layer portion 20A formed of a metal material are formed in the trench 20T. Thereafter, the inner layer portion of the trench 13T in the first light shielding portion 13 may be replaced with a metal material.

Second Example of Process of Manufacturing Imaging Apparatus 101

In the first example of the manufacturing process illustrated in FIGS. 12A, 12B, 12C, 12D, 12E, 12F, 12G, 12H, 12I, 12J, 12K, 12L, 12M, 12N, 12O, 12P, 12Q, 12R, 12S, and 12T described above, the trench is formed in the depth direction of the silicon substrate 11, and the trench is then widened in the horizontal direction through wet etching to form the trench for the horizontal light shielding portion 13H. According to the manufacturing method, the shape of the trench for the horizontal light shielding portion 13H finally obtained depends on the plane orientation since the etching speed at the time of the wet etching changes depending on the plane orientation of the silicon substrate 11. On the other hand, in a case where a manufacturing method of forming a hollow for the horizontal light shielding portion 13H first is adopted, it is possible to form the horizontal light shielding portion 13H with a desired shape without depending on the plane orientation of the silicon substrate 11.

Figure 13A:
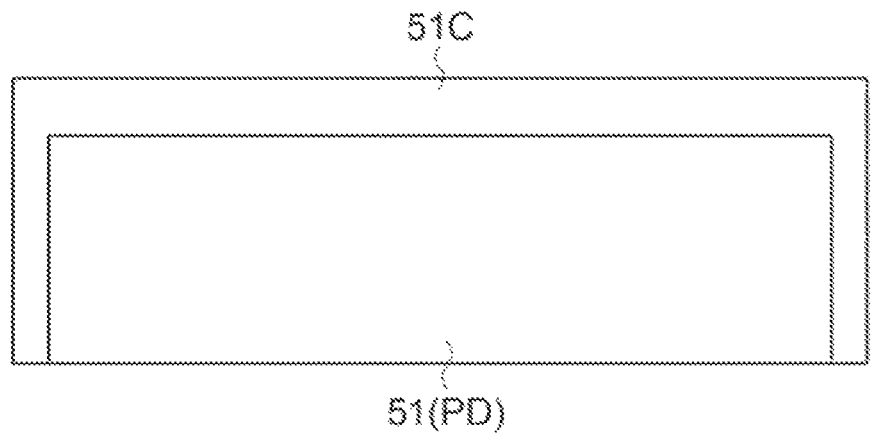
FIG. 13A is a process diagram illustrating a second example of a process of manufacturing the imaging apparatus.

FIGS. 13A, 13B, 13C, 13D, 13E, 13F, 13G, 13H, 13I, 13J, 13K, 13L, 13M, 13N, 13O, and 13P are process cross-sectional views illustrating the second example of the process of manufacturing the imaging apparatus 101. First, as illustrated in FIG. 13A, a P-type semiconductor substrate (a silicon substrate, for example) 51C on which a photodiode 51 (PD) is formed is prepared, and the formation surface of the photodiode 51 (PD) is exposed.

Figure 13B:
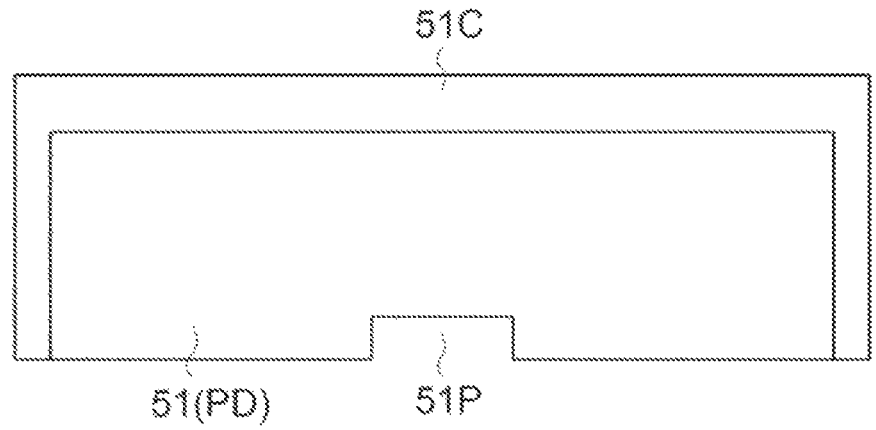
FIG. 13B is a process diagram, which continues from FIG. 13A.
Figure 13C:
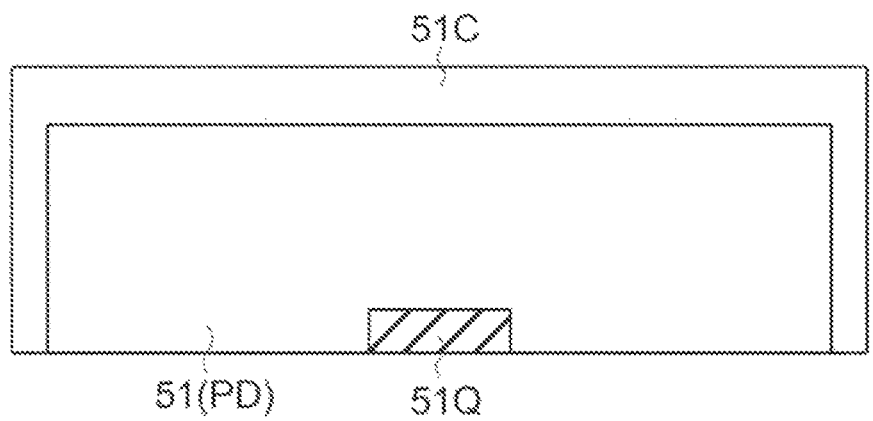
FIG. 13C is a process diagram, which continues from FIG. 13B.
Figure 13D:
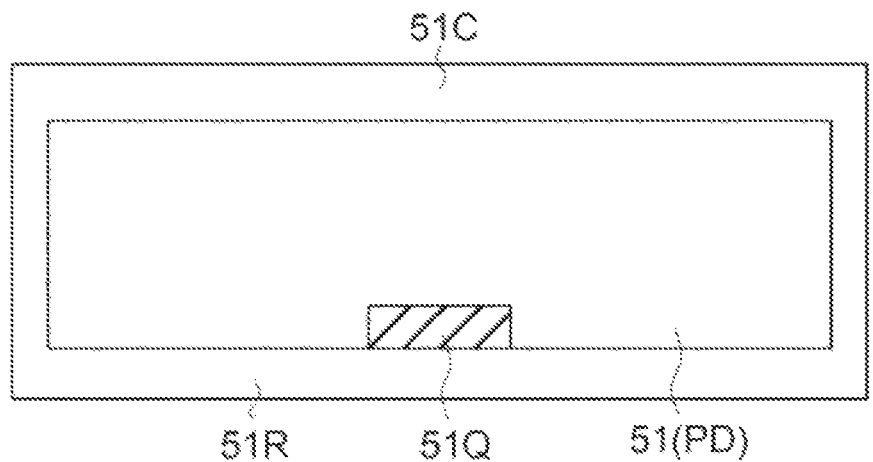
FIG. 13D is a process diagram, which continues from FIG. 13C.

Next, as illustrated in FIG. 13B, a partial region 51P of the photodiode 51 (PD) corresponding to the location where the horizontal light shielding portion 13H is formed is removed, for example, through etching. Next, as illustrated in FIG. 13C, an oxide film 51Q is embedded in the region 51P removed through the etching, and the surface of the semiconductor substrate 51C is flattened. It is possible to arbitrarily control the shape of the region 51P to be removed through the etching from the photodiode 51 (PD) by using a photomask or the like, and it is possible to arbitrarily control the shape of the horizontal light shielding portion 13 finally formed in the region 51P. Next, as illustrated in FIG. 13D, a p-type silicon layer 51R is formed on the semiconductor substrate 51C through epitaxial growth.

Figure 13E:
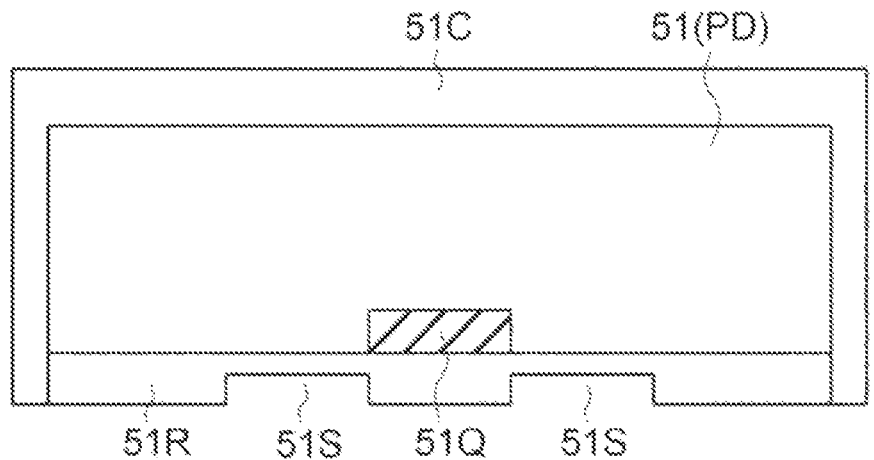
FIG. 13E is a process diagram, which continues from FIG. 13D.
Figure 13F:
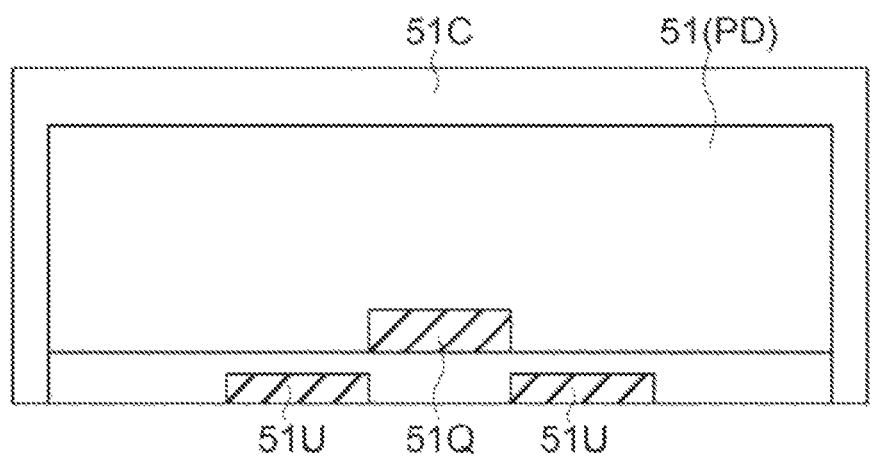
FIG. 13F is a process diagram, which continues from FIG. 13E.
Figure 13G:
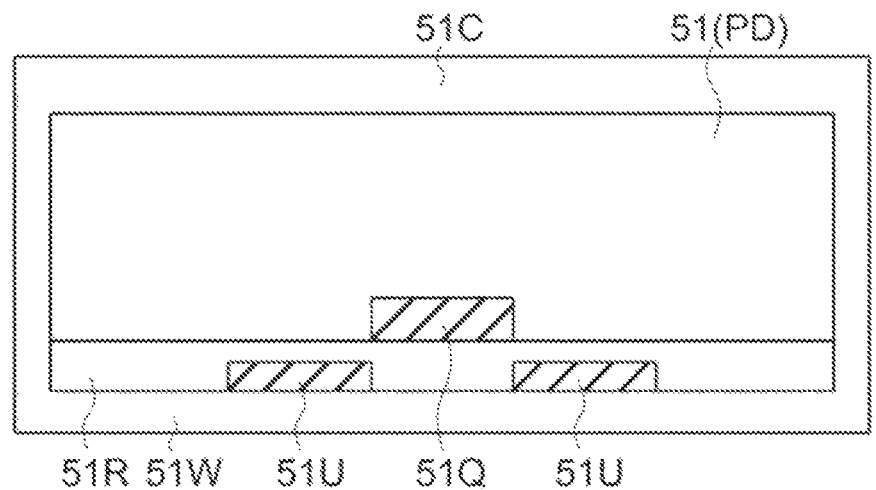
FIG. 13G is a process diagram, which continues from FIG. 13F.

Next, as illustrated in FIG. 13E, a hollow portion 51S for the horizontal light shielding portion 12H is formed. The hollow portion 51S is disposed on a side closer to the front surface (first surface) of the semiconductor substrate 51C than to the oxide film embedded region 51Q formed in FIG. 13C. Next, as illustrated in FIG. 13F, an oxide film 51U is embedded in the hollow portion 51S formed in FIG. 13E to flatten the substrate surface. Next, as illustrated in FIG. 13G, a p-type silicon layer 51W is formed on the semiconductor substrate 51C through epitaxial growth.

Figure 13H:
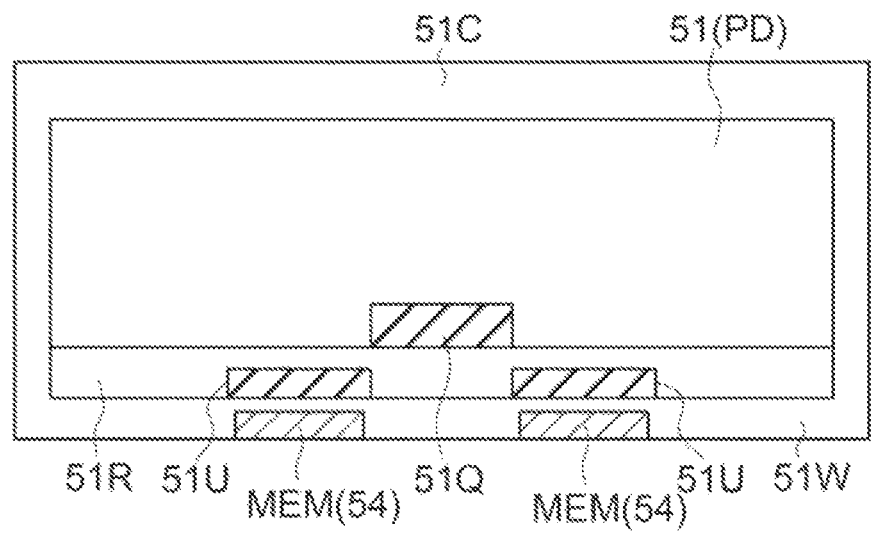
FIG. 13H is a process diagram, which continues from FIG. 13G.

Next, as illustrated in FIG. 13H, the charge holding unit MEM (54) is formed inside the p-type silicon layer 51W on a side closer to the substrate surface than to the oxide film embedded region 51U formed in FIG. 13F. The charge holding unit MEM (54) is formed in, for example, the N-type semiconductor region.

Figure 13I:
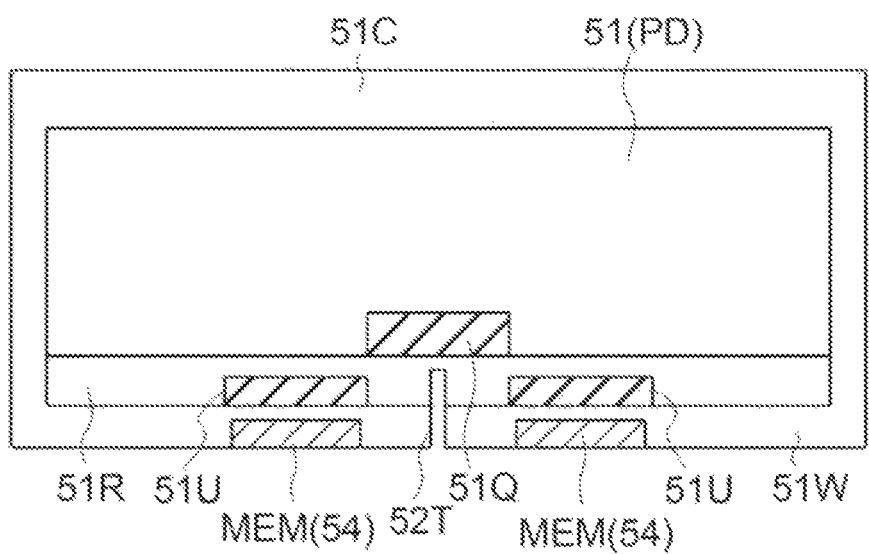
FIG. 13I is a process diagram, which continues from FIG. 13H.
Figure 13J:
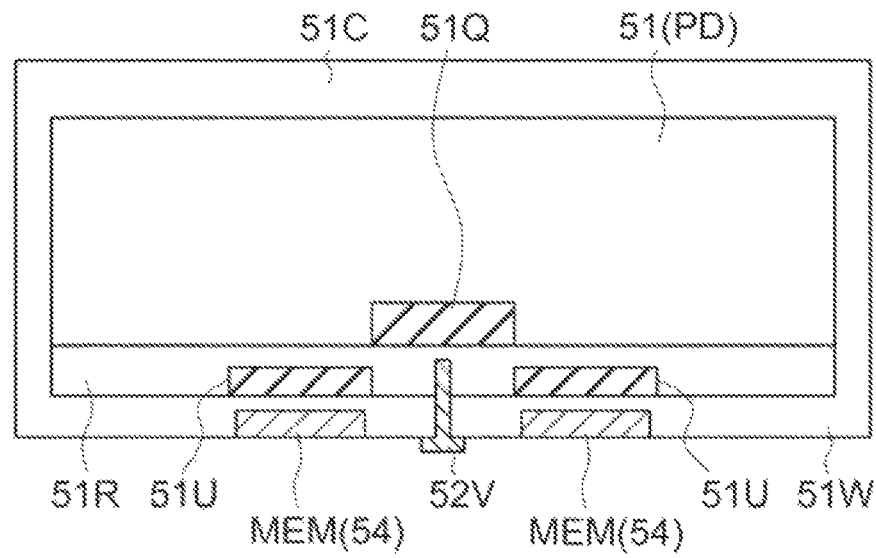
FIG. 13J is a process diagram, which continues from FIG. 13I.

Next, as illustrated in FIG. 13I, the trench 52T for the vertical gate electrode 52V is formed. Next, as illustrated in FIG. 13J, a conductive material is embedded in the trench 52T formed in FIG. 13I to form the vertical gate electrode 52V.

Figure 13K:
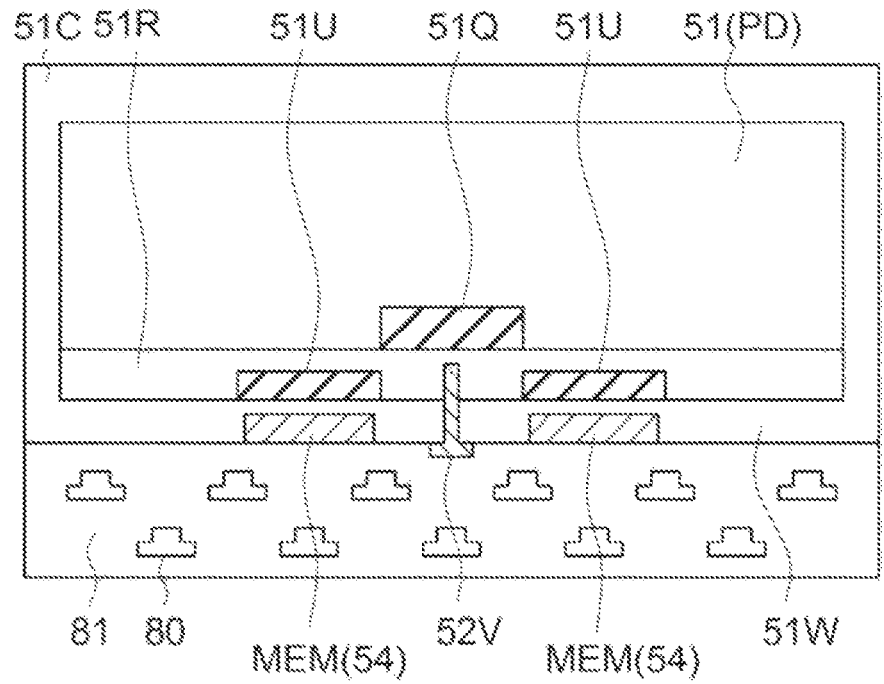
FIG. 13K is a process diagram, which continues from FIG. 13J.
Figure 13L:
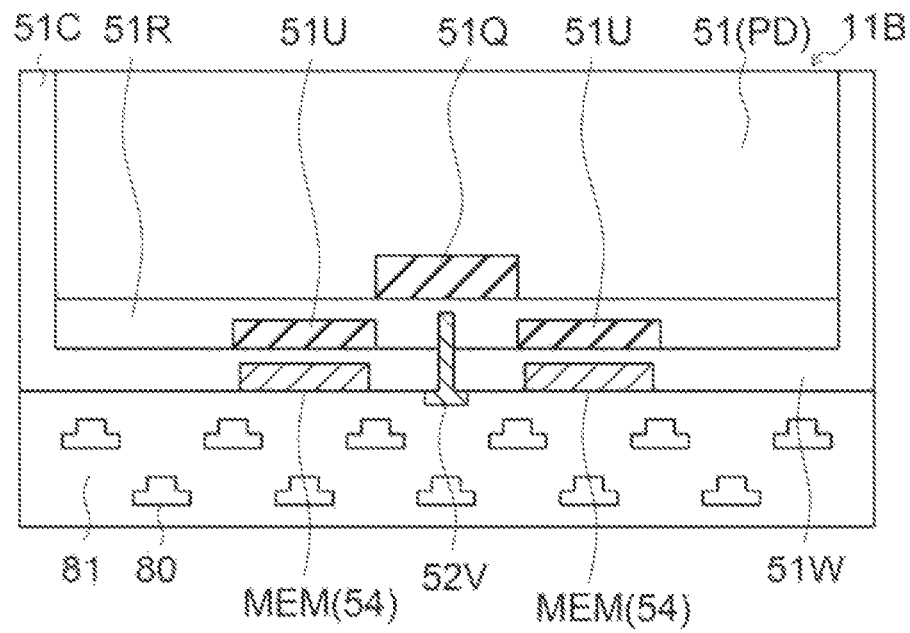
FIG. 13L is a process diagram, which continues from FIG. 13K.

Next, as illustrated in FIG. 13K, the wiring layer 80 and an insulating layer 81 covering the surroundings of the wiring layer 80 are formed on the substrate surface. Next, as illustrated in FIG. 13L, the side of the rear surface 11B of the semiconductor substrate 11 is thinned through CMP or the like, and the formation surface of the photodiode 51 (PD) is exposed. Next, as illustrated in FIG. 13M, trenches 12T and 13T are formed to reach the oxide film embedded region 51U for the horizontal light shielding portion 12H and the oxide film embedded region 51Q for the horizontal light shielding portion 13H in the depth direction from the formation surface of the exposed photodiode 51 (PD).

Figure 13M:
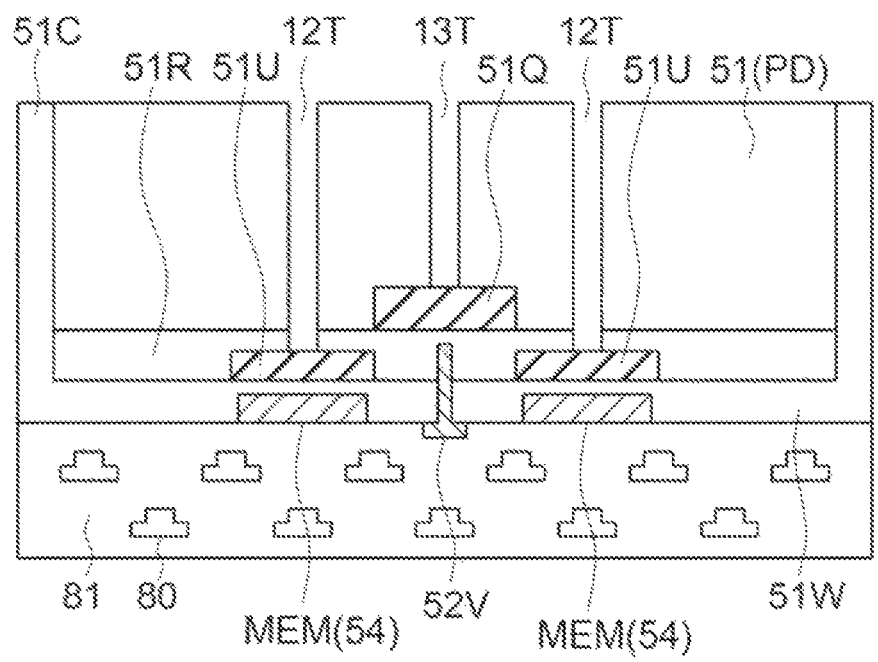
FIG. 13M is a process diagram, which continues from FIG. 13L.
Figure 13N:
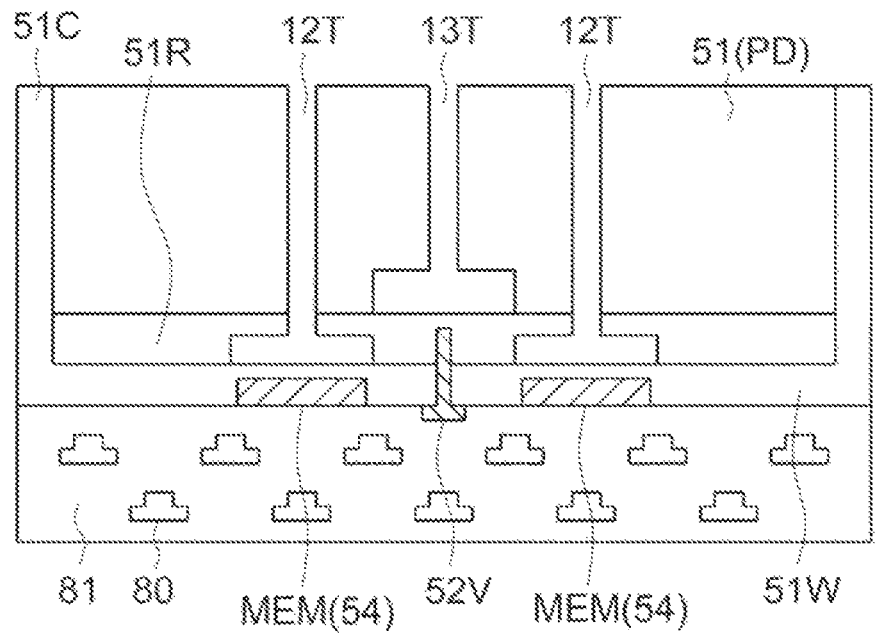
FIG. 13N is a process diagram, which continues from FIG. 13M.
Figure 13O:
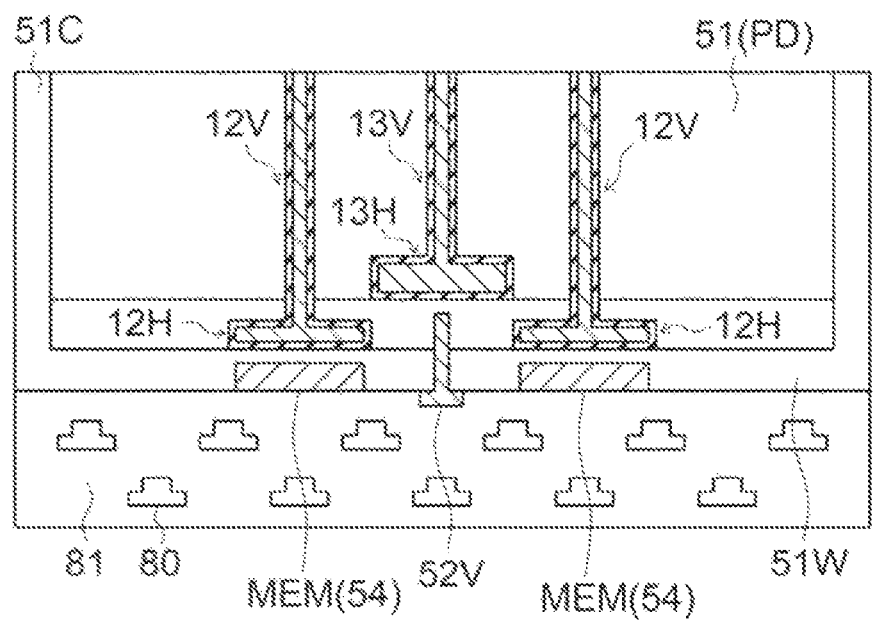
FIG. 13O is a process diagram, which continues from FIG. 13N.
Figure 13P:
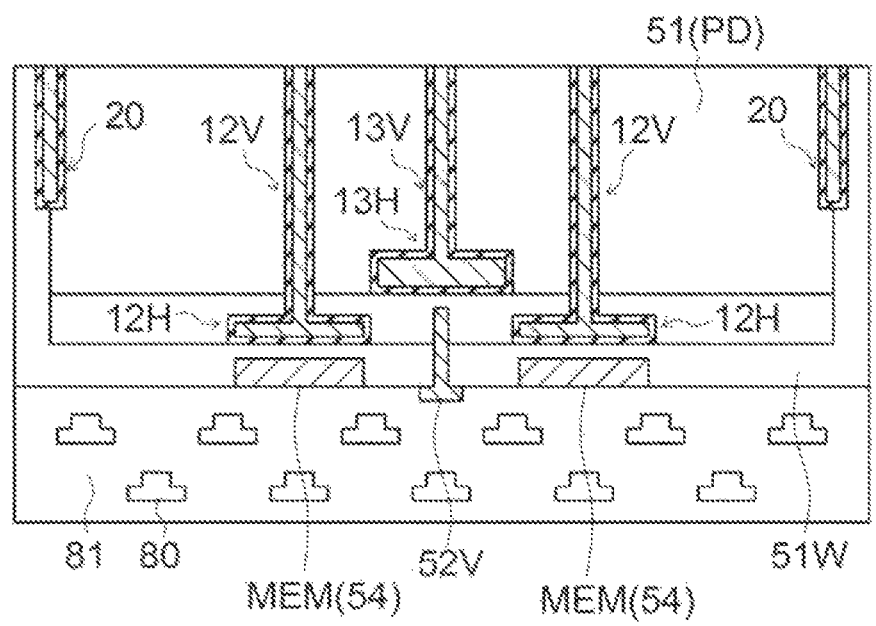
FIG. 13P is a process diagram, which continues from FIG. 13O.

Next, as illustrated in FIG. 13N, the oxide film embedded regions 51U and 51Q are removed to obtain hollows through wet etching via the trenches 12T and 13T formed in FIG. 13M. Then, as illustrated in FIG. 13O, a light shielding material is embedded in the trenches 12T and 13T. FIG. 13O illustrates an example in which the trenches 12T and 13T have double-phase structure therein. A metal material such as W (tungsten) may be embedded in the inner layer portion as described above, or a super critical fluid (SCM) may be embedded therein. The outer layer portion is an insulating layer. Note that the inside of the trench may be formed into a single-layer structure.

Although the horizontal light shielding portions 12H are connected to the vertical light shielding portions 12V extending from the first surface (front surface) side and the horizontal light shielding portions 13H are connected to the vertical light shielding portion 13V extending from the second surface (rear surface) side in the first example of the manufacturing process illustrated in FIGS. 12A, 12B, 12C, 12D, 12E, 12F, 12G, 12H, 12I, 12J, 12K, 12L, 12M, 12N, 12O, 12P, 12Q, 12R, and 12S, all of the horizontal light shielding portions 12H and 13H are connected to the vertical light shielding portions 12V and 13V extending from the rear surface side in the second example of the manufacturing process. After the process in FIG. 13O, a trench for element separation may be formed along the boundary portion of the pixels as in FIG. 13P, and the outer layer portion formed of an insulating material and an inner layer portion formed of a metal material may be formed inside the trench to form the pixel boundary light shielding layer 20.

Since the hollows for the horizontal light shielding portions 12H and 13H are formed before the wet etching or the like, and the vertical light shielding portions 12V and 13V are then formed in the second example of the manufacturing process, it becomes easy to form the horizontal light shielding portions 12H and 13H into arbitrary shapes. More specifically, according to the second example of the manufacturing process, it is possible to form the horizontal light shielding portions 12H and 13H with arbitrary shapes without depending on the plane orientation of the silicon substrate 11. Since, for example, a silicon substrate with a plane index (100) has high mobility and a satisfactory interface state, it is possible to improve electrical characteristics of the solid imaging apparatus and to reduce defects when the horizontal light shielding portions 12H and 13H are formed using the silicon substrate 11. In addition, it is not necessary to form the etching stoppers 17 when the hollows for the horizontal light shielding portions 12H are formed, and it is thus possible to simplify the manufacturing process.

Third Example of Process of Manufacturing Imaging Apparatus 101

Figure 14A:
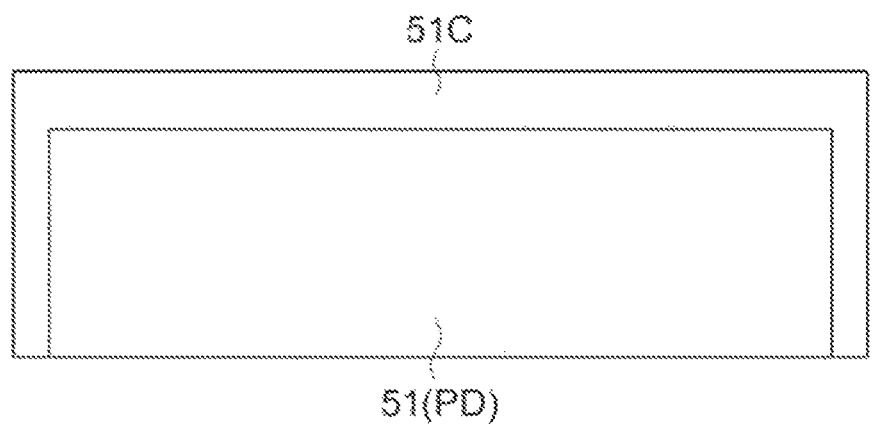
FIG. 14A is a process diagram illustrating a third example of a process of manufacturing the imaging apparatus.
Figure 14B:
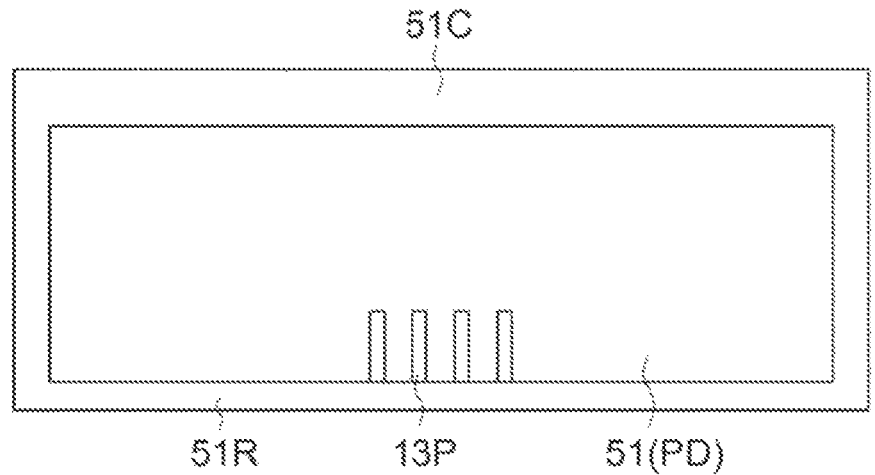
FIG. 14B is a process diagram, which continues from FIG. 14A.
Figure 14C:
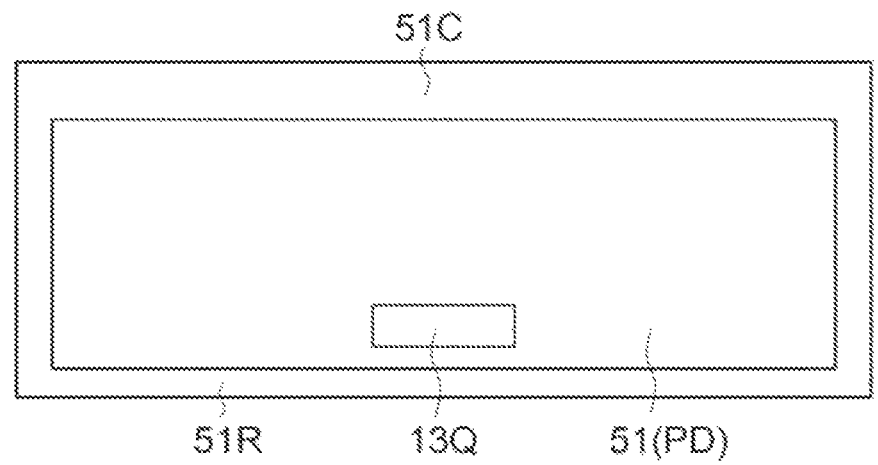
FIG. 14C is a process diagram, which continues from FIG. 14B.

FIGS. 14A, 14B, 14C, 14D, 14E, 14F, 14G, 14H, 14I, 14J, 14K, 14L, and 14M are process cross-sectional views illustrating a third example of the method of manufacturing the imaging apparatus. First, the formation surface of the photodiode 51 (PD) on the semiconductor substrate 51C in FIG. 14A is exposed, a plurality of trenches 13P are then formed to be adjacent in one direction, and a p-type semiconductor layer 51R is then formed thereon through epitaxial growth as illustrated in FIG. 14B. Next, as illustrated in FIG. 14C, heat treatment is performed in a hydrogen atmosphere in which a reducing atmosphere can be formed. In this manner, the plurality of trenches 13P formed to be adjacent to each other are integrated into a spherical shape, and a hollow 13Q is formed inside the photodiode 51 (PD). The hollow 13Q with a volume equivalent to that of the horizontal light shielding portion 13H is formed by repeating the processes in FIGS. 14B and 14C while slightly shifting the formation locations of the plurality of trenches 13P in FIG. 14B.

Figure 14D:
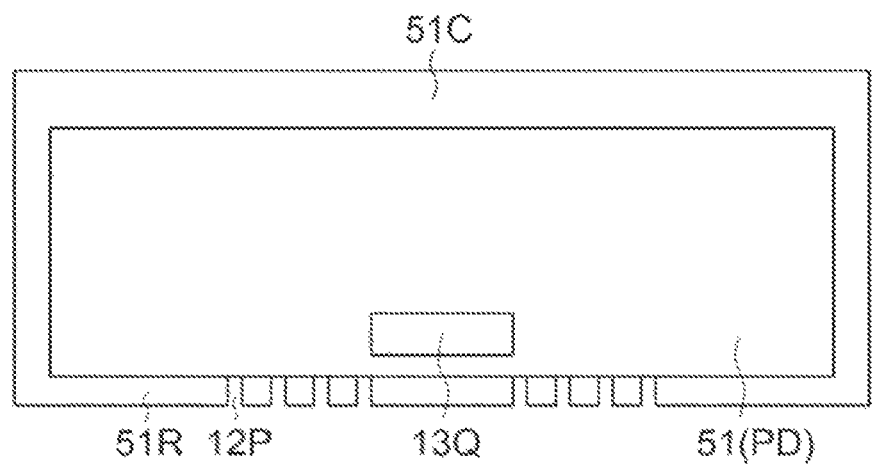
FIG. 14D is a process diagram, which continues from FIG. 14C.
Figure 14E:
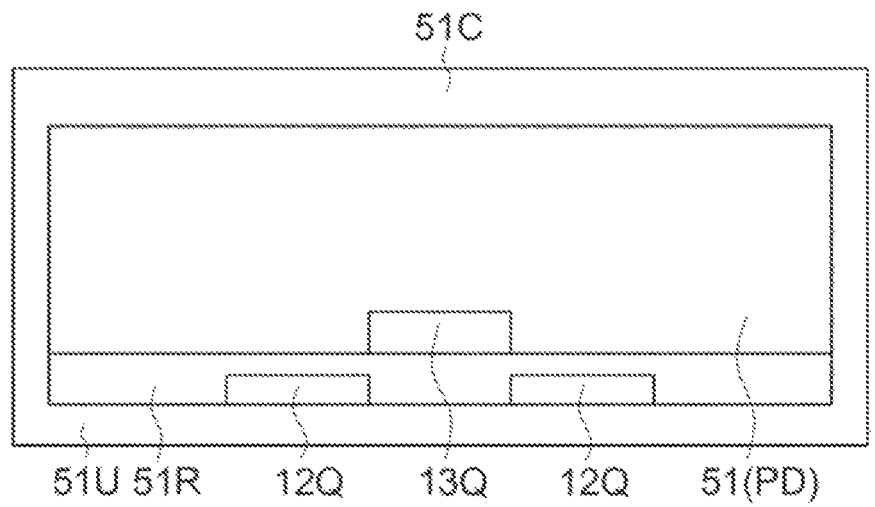
FIG. 14E is a process diagram, which continues from FIG. 14D.

Next, as illustrated in FIG. 14D, a plurality of trenches 12P are formed to be adjacent to each other at locations shallower than the hollow 13Q. Next, as illustrated in FIG. 14E, heat treatment is performed in a hydrogen atmosphere in which a reducing atmosphere can be formed. In this manner, a hollow 12Q for the horizontal light shielding portion 12H is formed at a position shallower than the hollow 13Q formed in FIG. 14C. The hollow 12Q with a volume equivalent to that of the horizontal light shielding portion 12H is formed by repeating the processes in FIGS. 14D and 14E while slightly shifting the formation locations of the plurality of trenches 12P. A p-type silicon layer 51U is formed on the hollow 12Q through epitaxial growth.

Figure 14F:
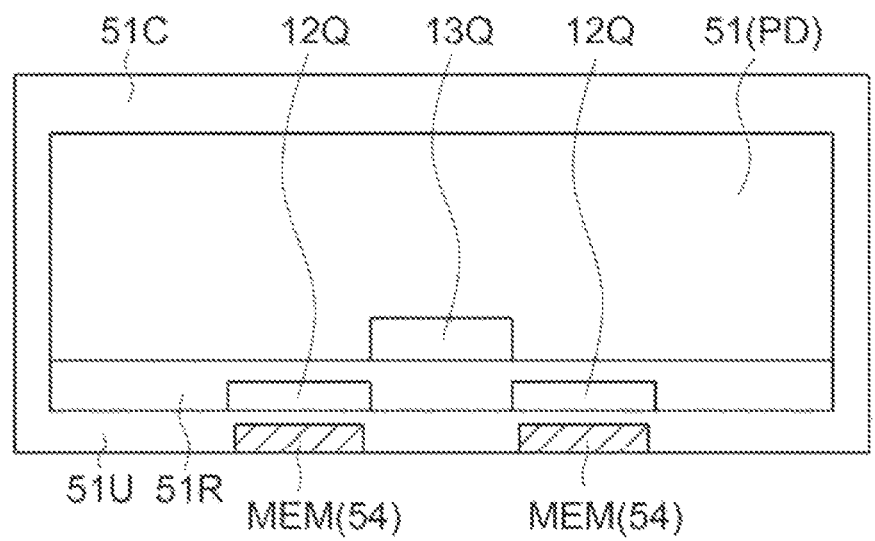
FIG. 14F is a process diagram, which continues from FIG. 14E.

Next, as illustrated in FIG. 14F, a charge holding unit MEM (54) that is an N-type semiconductor region is formed inside the p-type silicon layer 51U on a side closer to the front surface than to the hollow 12Q for the horizontal light shielding portion 12H.

Figure 14G:
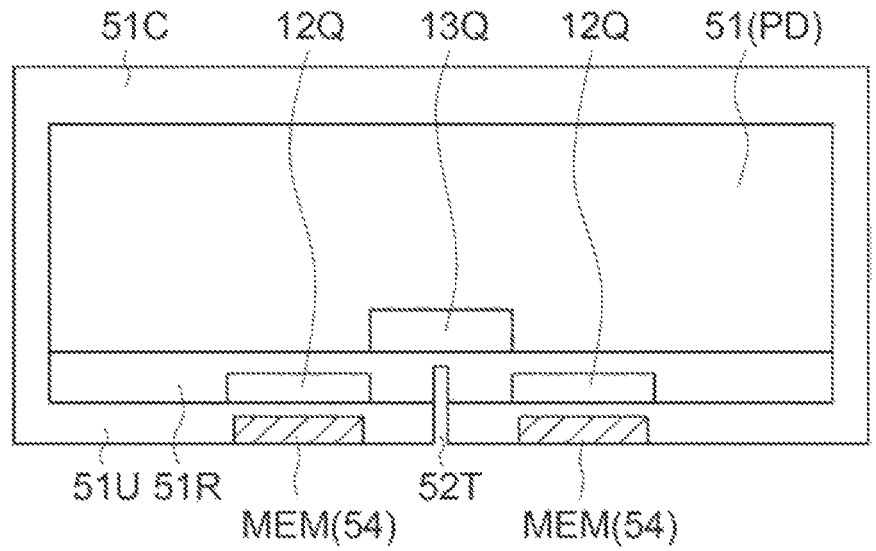
FIG. 14G is a process diagram, which continues from FIG. 14F.
Figure 14H:
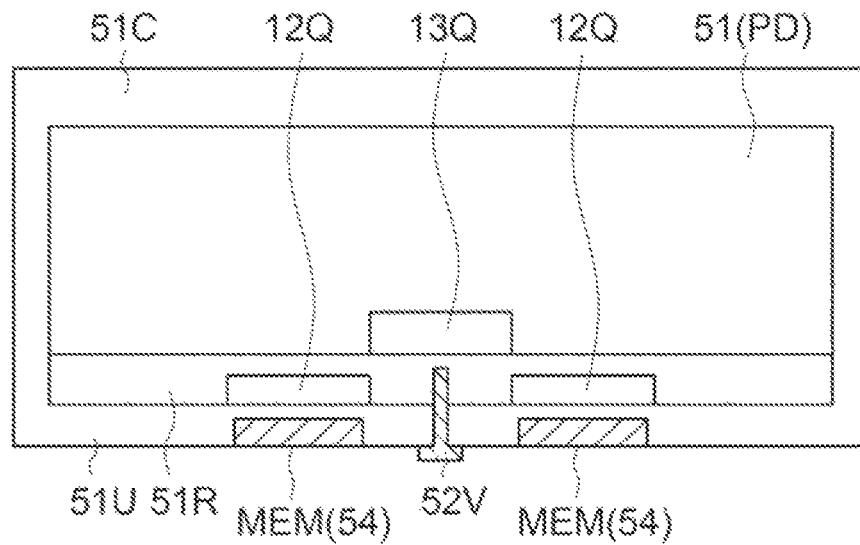
FIG. 14H is a process diagram, which continues from FIG. 14G.

Next, as illustrated in FIG. 14G, the trench 52T for the vertical gate electrode 52V is formed. Next, as illustrated in FIG. 14H, a conductive material is embedded in the trench 52T to form the vertical gate electrode 52V.

Figure 14I:
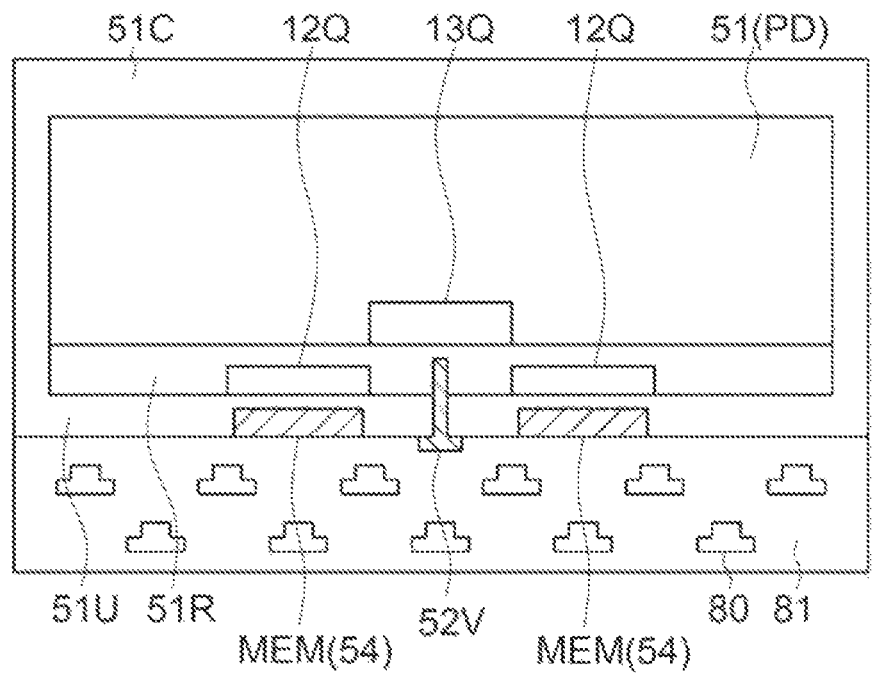
FIG. 14I is a process diagram, which continues from FIG. 14H.
Figure 14J:
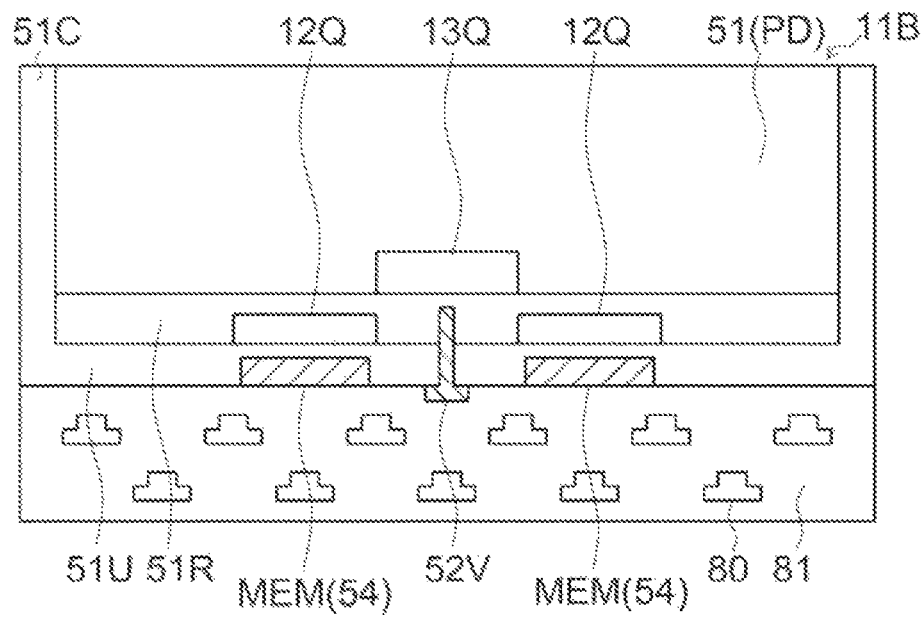
FIG. 14J is a process diagram, which continues from FIG. 14I.
Figure 14K:
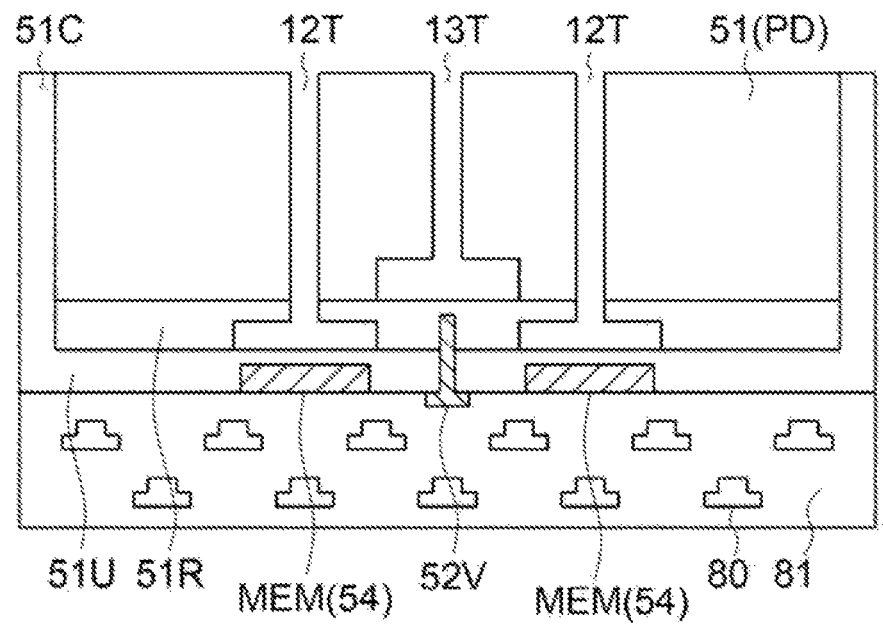
FIG. 14K is a process diagram, which continues from FIG. 14J.
Figure 14L:
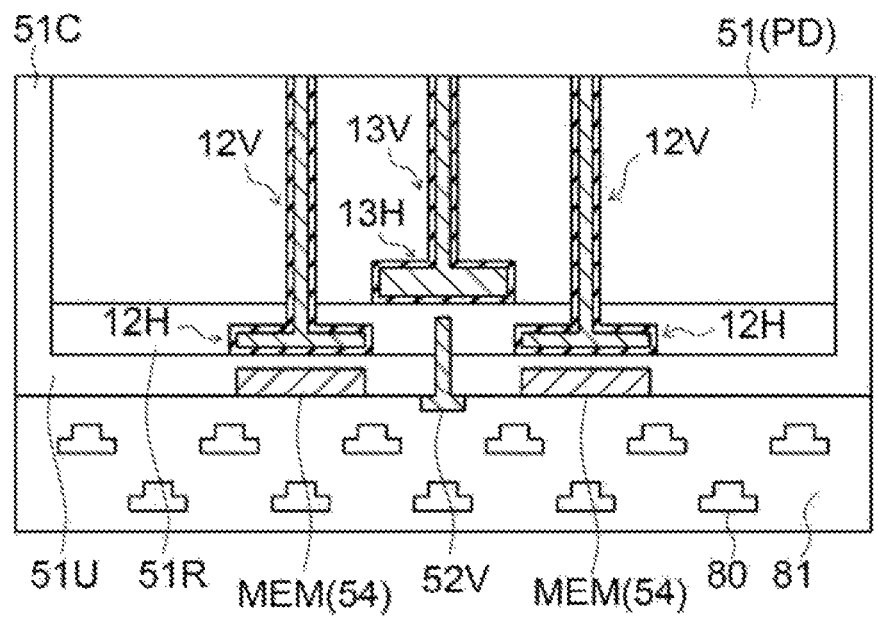
FIG. 14L is a process diagram, which continues from FIG. 14K.
Figure 14M:
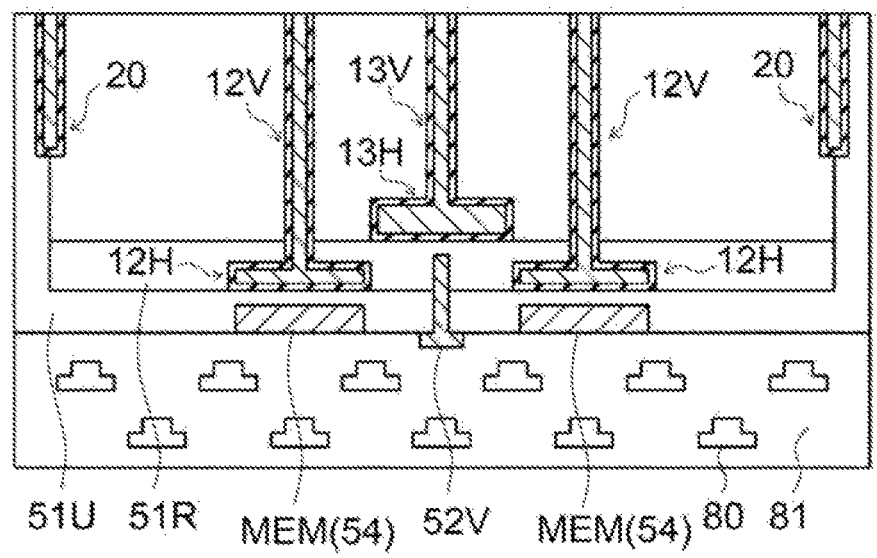
FIG. 14M is a process diagram, which continues from FIG. 14L.

Next, as illustrated in FIG. 14I, the wiring layer 80 and an insulating layer 81 covering the surroundings of the wiring layer 80 are formed on the substrate surface. Next, as illustrated in FIG. 14J, the rear surface 11B side of the semiconductor substrate 11 is thinned through CMP or the like, and the formation surface of the photodiode 51 (PD) is exposed. Next, as illustrated in FIG. 14K, new trenches 12T and 13T that reach the hollow 12Q for the horizontal light shielding portion 12H and the hollow 13Q for the horizontal light shielding portion 13H are formed in the depth direction from the formation surface of the exposed photodiode 51 (PD). Next, the inside of the trenches 12T and 13T is removed through wet etching, and a light shielding material or the like is then embedded in the trenches 12T and 13T as illustrated in FIG. 14L. Thereafter, as illustrated in FIG. 14M, a pixel boundary structure may be formed.

Although the example in which the first light shielding portion 13 includes the vertical light shielding portion 13V connected to the horizontal light shielding portion 13H and the second light shielding portion 12 includes the vertical light shielding portions 12V connected to the horizontal light shielding portions 12H has been described in each of the above-described examples, at least either the vertical light shielding portions 12V or 13V may be a hole member or a contact member with a diameter that is necessary to fill the hollows for the horizontal light shielding portions 12H and 13H with the light shielding material.

FIGS. 15A, 15B, 15C, 15D, and 15E are plan views illustrating an example in which hole members or contact members 12PH or 13PH are used instead of at least either the vertical light shielding portions 12V or 13V. FIGS. 15A, 15B, 15C, and 15D are schematic plan views seen from the side of the second surface (rear surface) of the solid imaging apparatus and illustrate a state in which the horizontal light shielding portion 12H is disposed below the horizontal light shielding portion 13H. FIGS. 15A, 15B, 15C, and 15D illustrate the horizontal light shielding portions 13H having different shapes. Note that the shape of the horizontal light shielding portion 13H is not limited to those illustrated in FIGS. 15A, 15B, 15C, and 15D.

In FIGS. 15A, 15B, 15C, and 15D, hole members 12PH extending from the side of the second surface (rear surface), for example, are formed at four corners of the horizontal light shielding portion 12H with a rectangular shape, and the hollow for the horizontal light shielding portion 12H is filled with a light shielding material or the like through the hole members 12PH to form the horizontal light shielding portion 12H, Similarly, a hole member 13PH extending from the side of the rear surface, for example, is formed at substantially the center portion of the horizontal light shielding portion 13H disposed near the center of the horizontal light shielding portion 12H, and a hollow for the horizontal light shielding portion 13H is filled with a light shielding material or the like through the hole member 13PH to form the horizontal light shielding portion 13H. The light shielding material or the like may be embedded inside the hole members 12PH and 13PH to form contact members after the horizontal light shielding portions 12H and 13H are formed, or the hole members 12PH and 13PH may be left as the hole members.

Although FIGS. 15A, 15B, 15C, and 15D illustrate an example in which the hole members 12PH are provided at the four corners of the horizontal light shielding portion 12H and the hole members 12PH are filled with the light shielding material for the horizontal light shielding portions 12H and 13H, the number and disposition locations of the hole members 12PH are arbitrarily selected, and the hole members 12PH may not necessarily provided at the corner portions of the horizontal light shielding portion 12H. In addition, a plurality of hole members 13PH for the horizontal light shielding portion 13H may be provided.

Figure 15A:
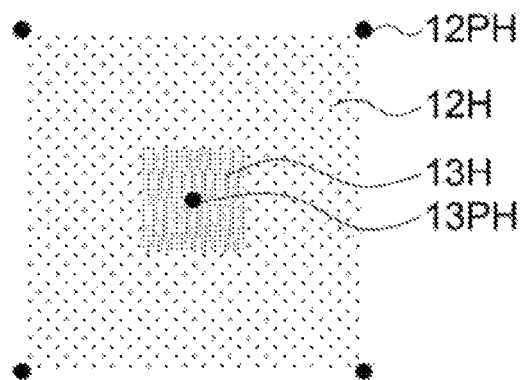
FIG. 15A is a plan view illustrating an example in which a hole member or a contact member is used instead of the vertical light shielding portion.
Figure 15B:
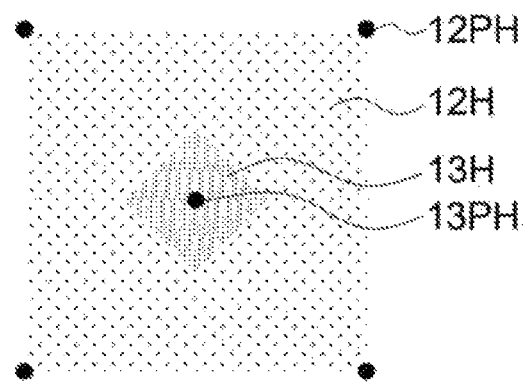
FIG. 15B is a plan view illustrating another modification example of FIG. 15A.
Figure 15C:
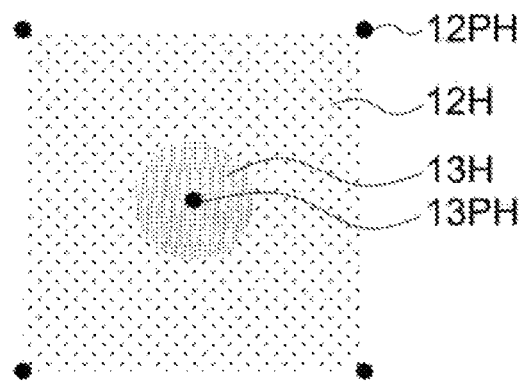
FIG. 15C is a plan view illustrating another modification example of FIG. 15A.
Figure 15D:
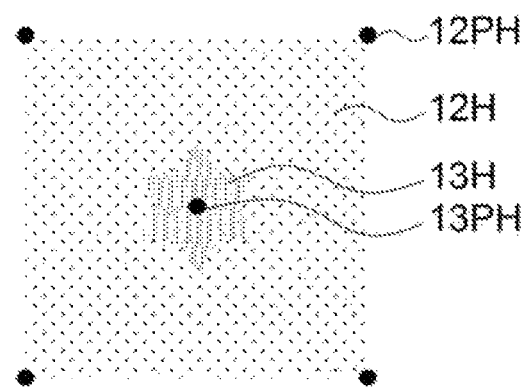
FIG. 15D is a plan view illustrating another modification example of FIG. 15A.
Figure 15E:
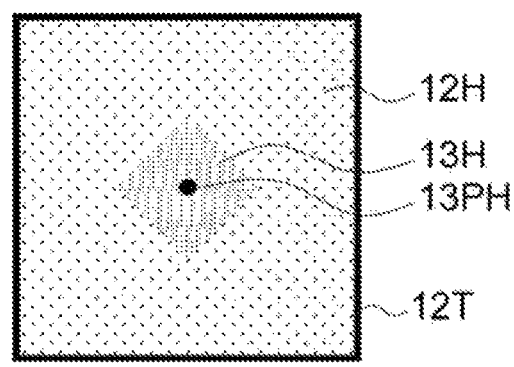
FIG. 15E is a plan view illustrating another modification example of FIG. 15A.

In FIG. 15E, the trench 12T is formed to surround the periphery of the horizontal light shielding portion 12H, a hollow for the horizontal light shielding portion 12H is filled with a light shielding portion or the like from the trench 12T to form the horizontal light shielding portion 12H, and the trench 12T is filled to form the vertical light shielding portion 12V. In addition, a hollow for the horizontal light shielding portion 13H is formed at the center portion of the horizontal light shielding portion 12H, the hole member 13PH is formed at the center portion of the horizontal light shielding portion 13H, and the hole member 13PH is filled with a light shielding material or the like for the horizontal light shielding portion 13H to form the horizontal light shielding portion 13H.

As illustrated in FIG. 15E, one of the horizontal light shielding portions 12H and 13H may have a vertical light shielding portion while the other one may have a hole member or a contact member.

Figure 16:
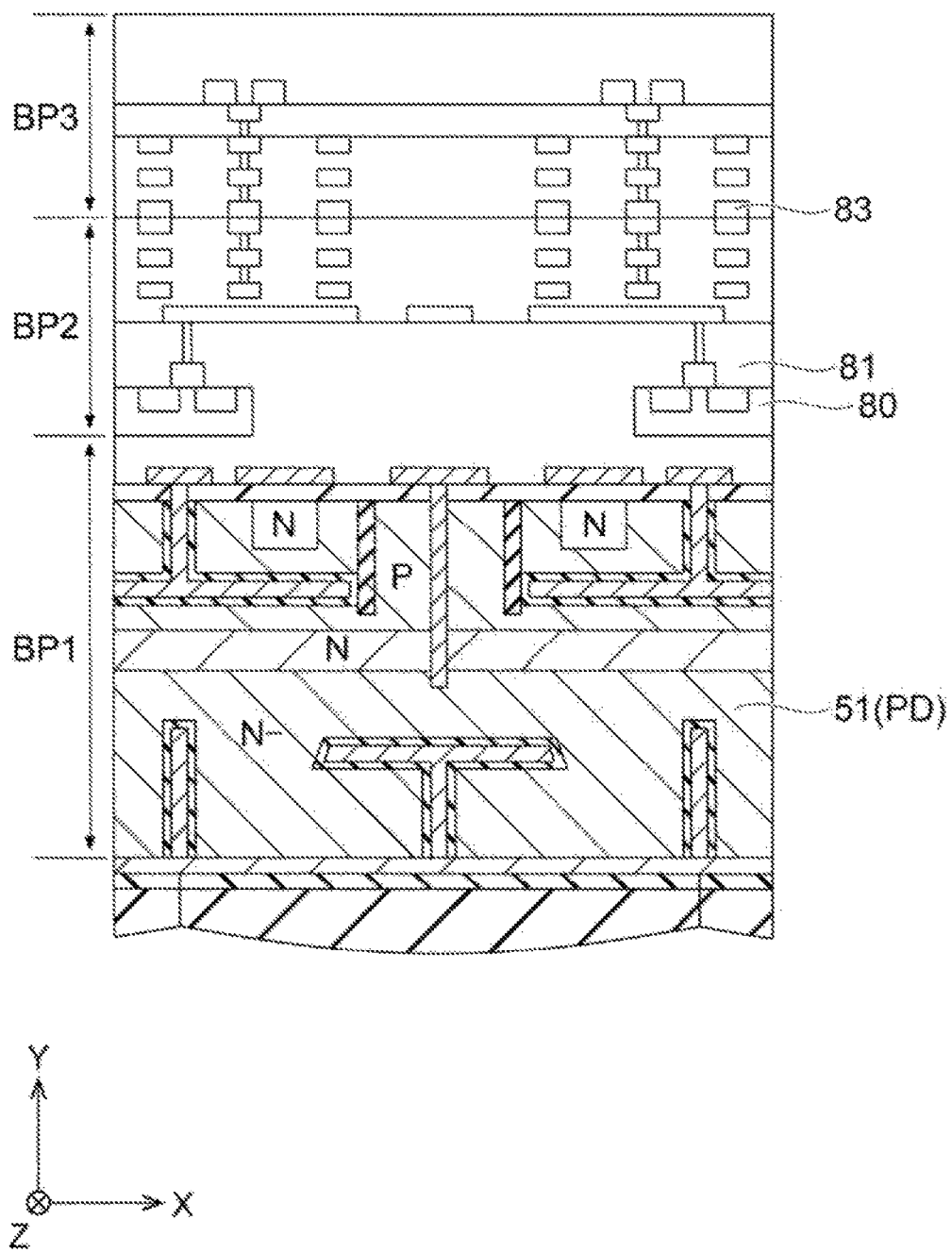
FIG. 16 is a cross-sectional view of the imaging apparatus 101 configured by attaching first to third semiconductor substrates BP1 to BP3.

The imaging apparatus 101 according to the present embodiment is configured by attaching, to the semiconductor substrate 11 on which the pixel array unit 111 is formed, another semiconductor substrate 11 on which the reading circuit 120 and the like are formed. FIG. 16 is a cross-sectional view of the imaging apparatus 101 configured by attaching first to third semiconductor substrates BP1 to BP3. The sensor pixel 121 is formed in the first semiconductor substrate BP1. The reading circuit 120, the wiring layer 80, and the insulating layer 81 are formed in the second semiconductor substrate BP2. Electrical conduction is established between the first semiconductor substrate BP1 and the second semiconductor substrate BP2 through a penetrating wire 82. The reading circuit 120 is a circuit illustrated in FIG. 2 and is a circuit that outputs a pixel signal based on charge output from the sensor pixel 121. A plurality of pixel drive lines 122 and a plurality of vertical signal lines 123 are formed in a wiring layer 83. The surroundings of the reading circuit 120 and the wiring layer 80 are covered with the insulating layer 81. A logic circuit CR3, the wiring layer 63, and the insulating layer 62 are formed in the third semiconductor substrate BP3. The logic circuit CR3 includes, for example, the vertical drive unit 112, the ramp wave module 113, the column signal processing unit 114, the clock module 115, the data storage unit 116, the horizontal drive unit 117, the system control unit 118, the signal processing unit 119, and the like. The surroundings of the logic circuit and the wiring layer are covered with the insulating layer. Electric conduction is established between the second semiconductor substrate BP2 and the third semiconductor substrate BP3, for example, by a Cu—Cu junction 83.

In this manner, in the imaging apparatus 101 according to the first embodiment, the first light shielding portion 13 including the vertical light shielding portion 13V and the horizontal light shielding portion 13H are provided in a pixel region, and thus it is possible to prevent light from being incident on the vertical gate electrode 52V by the horizontal light shielding portion 13H and to achieve a reduction in a noise. The vertical light shielding portion 13V of the first light shielding portion 13 are formed by forming trenches of any direction, length, and number in a pixel region at a location different from a pixel boundary and filling the trenches with an insulator, a metal, or the like. By optimizing the direction, length, and number of the trenches, it is possible to improve photoelectric conversion efficiency Qe as much as possible while reducing noise as much as possible. According to the present embodiment, the first light shielding portion 13 having any shape and size can be formed at any location in a pixel region, and thus restrictions on disposition locations of the vertical gate electrode 52V and the like are reduced. That is, the first light shielding portion 13 can be disposed at an optimal location in order to prevent light from being incident on the vertical gate electrode 52V, and thus it is possible to reduce noise and improve photoelectric conversion efficiency Qe and parasitic light sensitivity (PLS) as compared with a case where the first light shielding portion 13 is formed using the element separation portion 20 provided at a pixel boundary portion.

Second Embodiment

Although an example in which the cross-section of the first light shielding portion 13 has a T shape and the second light shielding portion 12 and the element separation portions 20 are present has been described in the first embodiment, the element separation portions 20 are not necessarily essential. In addition, various modification examples are conceivable for the shapes of the element separation portions 20 and the second light shielding portion 12.

FIGS. 17A, 17B, 17C, 17D, 17E, 17F, 17G, 17H, 17I, 17J, 17K, 17L, 17M, 17N, and 17O are cross-sectional views illustrating various modification examples of the second light shielding portion 12, the first light shielding portion 13, and the element separation portions 20. FIGS. 17A, 17B, 17C, 17D, 17E, 17F, 17G, 17H, 17I, 17J, 17K, 17L, 17M, 17N, and 17O schematically illustrate cross-sectional structures of surroundings of the second light shielding portion 12, the first light shielding unit 13, and the element separation portions 20 of the imaging apparatus 101 according to the first embodiment. FIGS. 17A, 17B, 17C, 17D, 17E, 17F, 17G, 17H, 17I, 17J, 17K, 17L, 17M, 17N, and 17O illustrate an example in which the transfer transistor TRZ includes one vertical gate electrode 52V, but the transfer transistor TRZ may include a plurality of vertical gate electrodes 52V.

Figure 17A:
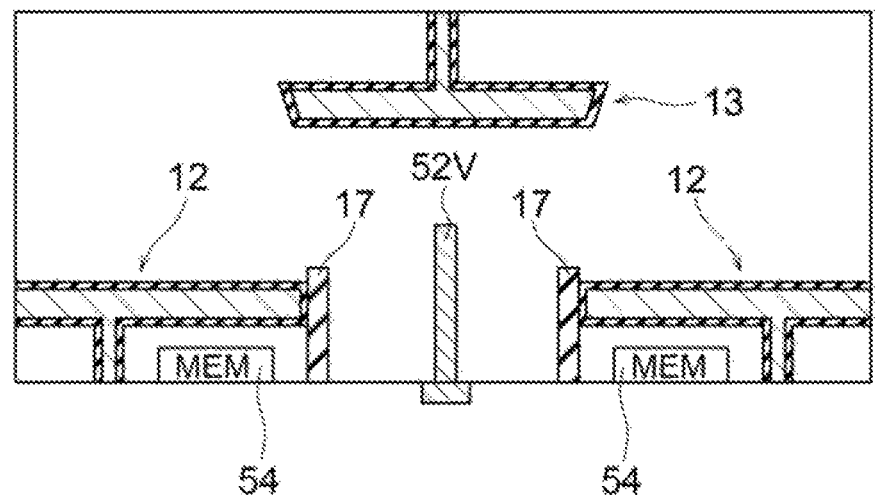
FIG. 17A is a cross-sectional view illustrating various modification examples of the second light shielding portion, the first light shielding portion, and the element separation portion.

FIG. 17A is a cross-sectional view of the imaging apparatus 101 from which the element separation portions 20 are omitted. Although leakage of light to the adjacent sensor pixels 121 increases due to omission of the element separation portions 20, light that is incident on the adjacent sensor pixels 121 does not lead to degradation of image quality in a case where the imaging apparatus 101 performs monochrome imaging, and it is thus possible to omit the element separation portions 20. It becomes easier for the electrons generated by the photoelectric conversion unit 51 to move due to the omission of the element separation portions 20, and it is possible to achieve an improvement in sensitivity.

Figure 17B:
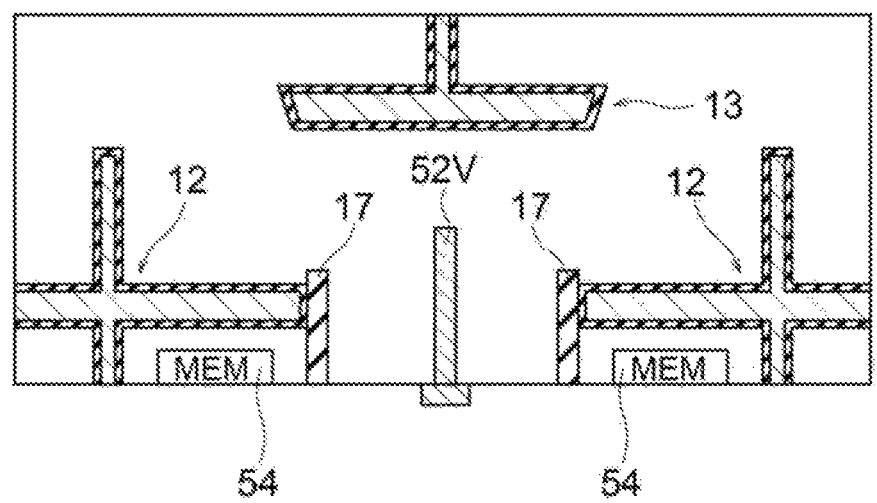
FIG. 17B is a cross-sectional view illustrating various modification examples of the second light shielding portion, the first light shielding portion, and the element separation portion.

FIG. 17B is a cross-sectional view of the imaging apparatus 101 in which the cross-section of the second light shielding portion 12 has a cross shape. It is possible to curb leakage of light to the adjacent sensor pixels 121 at the vertical light shielding portions 12V by causing the vertical light shielding portions 12V of the second light shielding portion 12 to extend to be long in the depth direction of the semiconductor substrate 11. In other words, since the vertical light shielding portions 12V of the second light shielding portion 12 functions to separate pixels, there is no need to provide the element separation portions 20. In addition, the horizontal light shielding portions 12H of the second light shielding portion 12 can be provided at arbitrary positions in the extending direction of the vertical light shielding portions 12V.

Figure 17C:
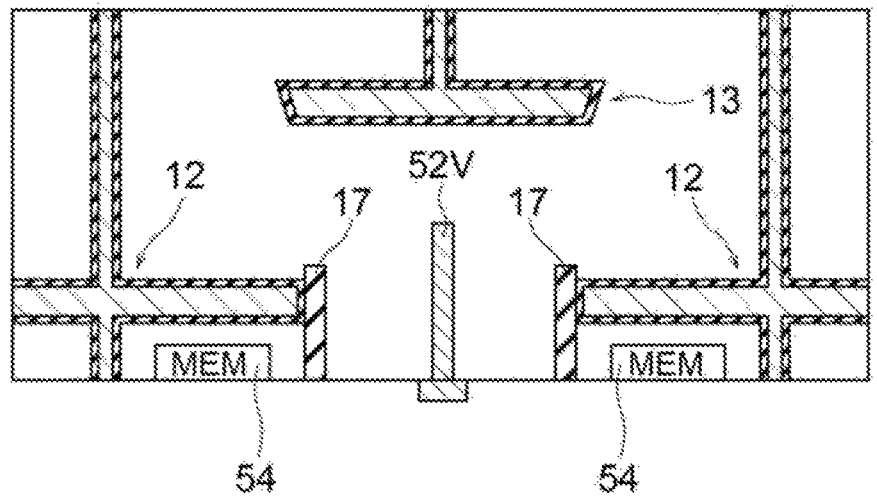
FIG. 17C is a cross-sectional view illustrating various modification examples of the second light shielding portion, the first light shielding portion, and the element separation portion.

FIG. 17C is a cross-sectional view of the imaging apparatus 101 according to a modification example of FIG. 17B. In FIG. 17C, the vertical light shielding portions 12V of the second light shielding portion 12 penetrates from the front surface 11A to the rear surface 11B of the semiconductor substrate 11. In this manner, the vertical light shielding portions 12V of the second light shielding portion 12 also function as the element separation portions 20. In the imaging apparatus 101 in FIG. 17C, effects similar to the effects of the element separation portions 20 can be obtained without forming the element separation portions 20, and it is thus possible to omit time and efforts to separately form the element separation portions 20. In addition, the horizontal light shielding portions 12H of the second light shielding portion 12 can be provided at arbitrary depth positions in the semiconductor substrate 11 in FIG. 17C as well.

Figure 17D:
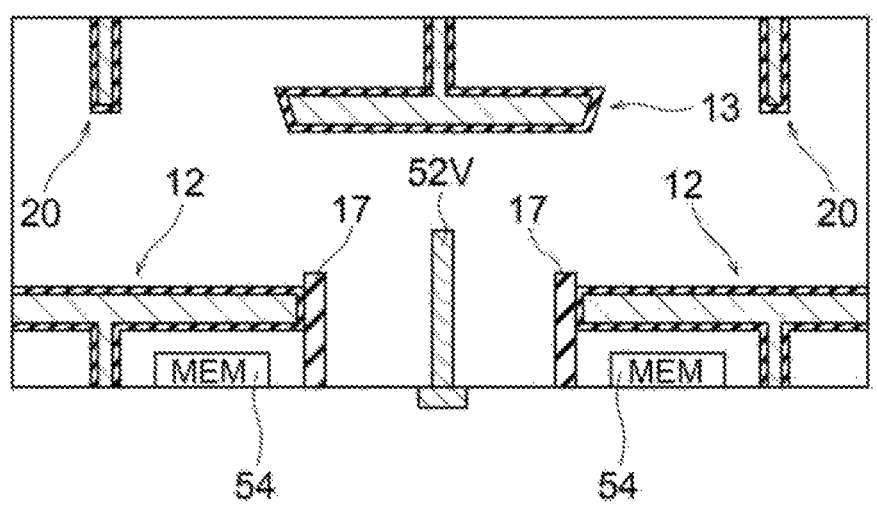
FIG. 17D is a cross-sectional view illustrating various modification examples of the second light shielding portion, the first light shielding portion, and the element separation portion.

FIG. 17D has a structure similar to that of the imaging apparatus 101 according to the first embodiment, and includes the second light shielding portion 12 and the element separation portions 20, in addition to the first light shielding portion 13 having a T-shaped cross-section. Although the number of manufacturing processes increases since it is necessary for the second light shielding portion 12, the first light shielding portion 13, and the element separation portions 20 to be separately formed for the imaging apparatus 101 in FIG. 17D, both the effects of curbing color mixing and noise reduction can be obtained.

Figure 17E:
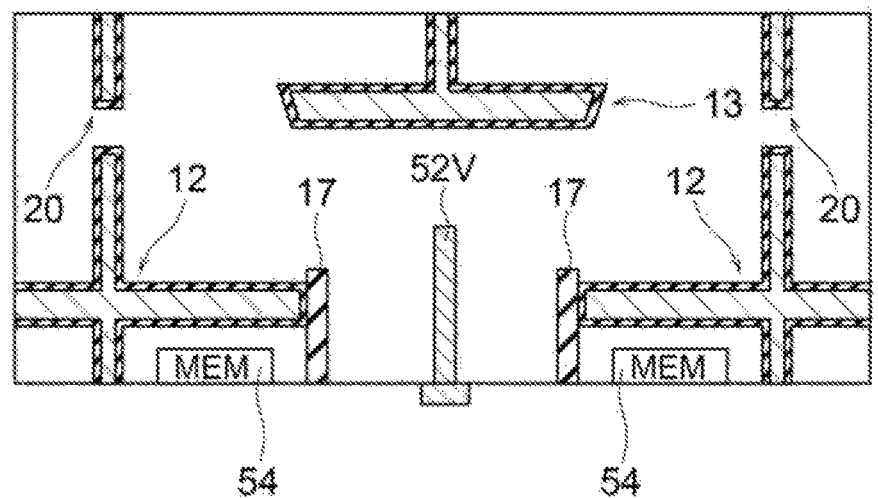
FIG. 17E is a cross-sectional view illustrating various modification examples of the second light shielding portion, the first light shielding portion, and the element separation portion.

FIG. 17E is different from FIG. 17D in that the cross-section of the second light shielding portion 12 has a cross shape instead of a T shape. In FIG. 17E, since the vertical light shielding portions 12V of the second light shielding portion 12 and the element separation portions 20 are disposed to face each other, and the region therebetween is narrowed, light is less likely to be incident on other adjacent sensor pixels 121, and it is possible to reduce crosstalk between the pixels.

Figure 17F:
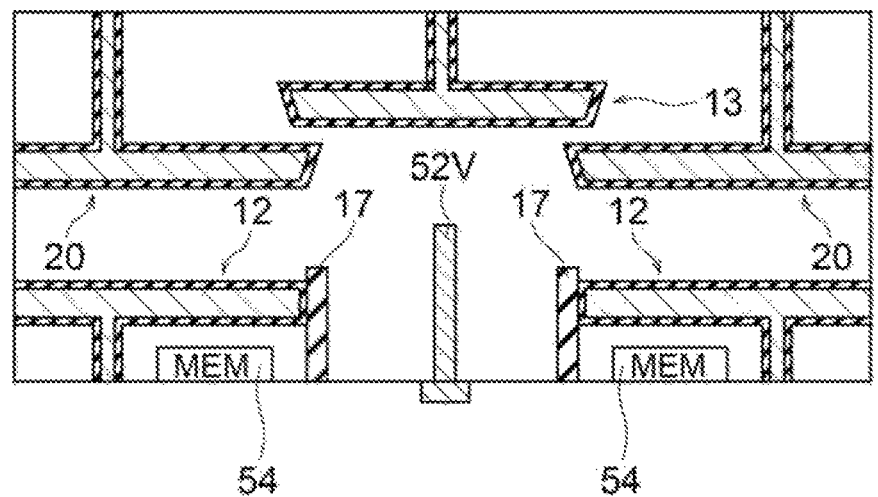
FIG. 17F is a cross-sectional view illustrating various modification examples of the second light shielding portion, the first light shielding portion, and the element separation portion.

FIG. 17F is a cross-sectional view of the imaging apparatus 101 in which both the cross-sections of the first light shielding portion 13 and the element separation portions 20 have a T shape. In the example in FIG. 17F, the height of the horizontal light shielding portion 13H of the first light shielding portion 13 is lower than the height of the horizontal light shielding portions of the element separation portions 20. Therefore, the light that is incident from the rear surface 11B is less likely to enter the adjacent sensor pixels 121. It is preferable that the height of the vertical light shielding portion 13V of the first light shielding portion 13 be set to be different from the height of the vertical light shielding portions of the element separation portions 20 and a distance between the horizontal light shielding portion 13H of the first light shielding portion 13 and the horizontal light shielding portions of the element separation portions 20 in the depth direction be maximized to prevent movement of electrons generated by the photoelectric conversion unit 51 from being hindered by the horizontal light shielding portion 13H of the first light shielding portion 13 and the horizontal light shielding portions of the element separation portions 20.

Figure 17G:
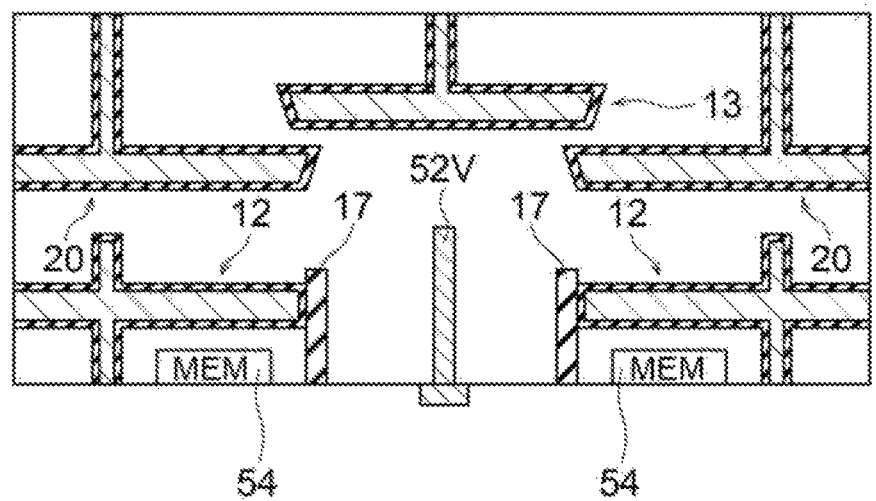
FIG. 17G is a cross-sectional view illustrating various modification examples of the second light shielding portion, the first light shielding portion, and the element separation portion.

FIG. 17G is a cross-sectional view of an imaging apparatus 101 according to a first modification example of FIG. 17F. The imaging apparatus 101 in FIG. 17G is different from the imaging apparatus 101 in FIG. 17F in that the cross-section of the second light shielding portion 12 has a cross shape instead of a T shape. Since the distance between the vertical light shielding portions 12V of the second light shielding portion 12 and the horizontal light shielding portions 20H of the element separation portions 20 is shortened in the case of FIG. 17G, it is possible to reduce leakage of light to the adjacent sensor pixels 121 and to reduce crosstalk between the pixels.

Figure 17H:
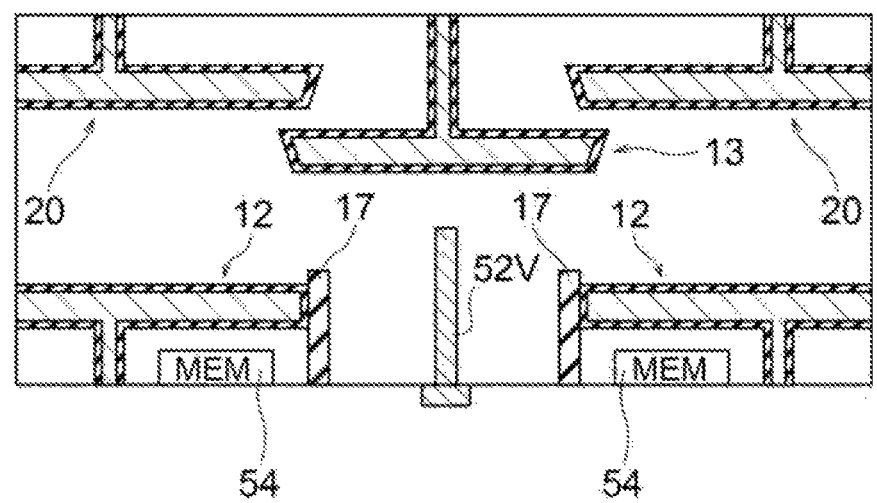
FIG. 17H is a cross-sectional view illustrating various modification examples of the second light shielding portion, the first light shielding portion, and the element separation portion.

FIG. 17H is a cross-sectional view of an imaging apparatus 101 according to a second modification example of FIG. 17F. The imaging apparatus 101 in FIG. 17H is different from that in FIG. 17F in that the height of the horizontal light shielding portion 13H of the first light shielding portion 13 from the rear surface 11B is higher than the height of the horizontal light shielding portions of the element separation portions 20 from the rear surface 11B. Since the horizontal light shielding portion 13H of the first light shielding portion 13 is disposed to be closer to the vertical gate electrode 52V, it is possible to further prevent light from being incident on the vertical gate electrode 52V, and noise has less influences.

Figure 17I:
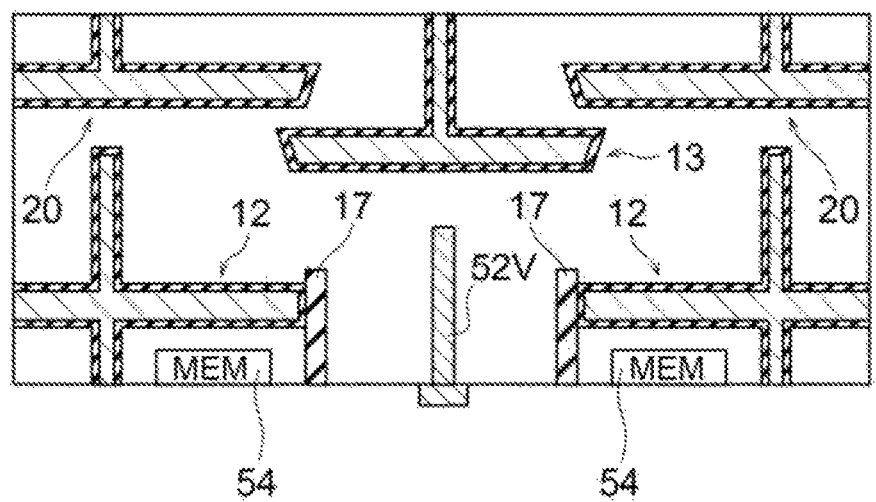
FIG. 17I is a cross-sectional view illustrating various modification examples of the second light shielding portion, the first light shielding portion, and the element separation portion.
Figure 17J:
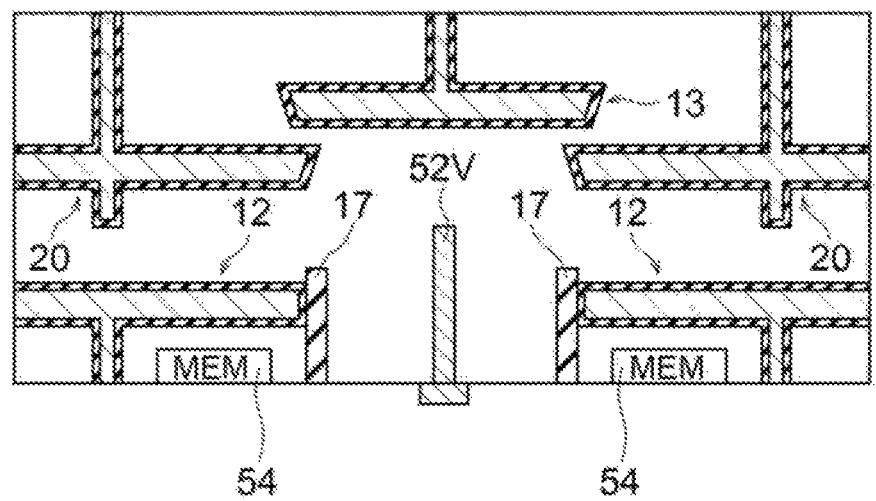
FIG. 17J is a cross-sectional view illustrating various modification examples of the second light shielding portion, the first light shielding portion, and the element separation portion.

FIG. 17I is a cross-sectional view of an imaging apparatus 101 according to a first modification example of FIG. 17H. The imaging apparatus 101 in FIG. 17I is different from that in FIG. 17H in that the cross-section of the second light shielding portion 12 has a cross shape instead of a T shape. On the other hand, FIG. 17J is a cross-sectional view of an imaging apparatus 101 according to a second modification example of FIG. 17H. The imaging apparatus 101 in FIG. 17J is different from that in FIG. 17H in that the cross-section of the element separation portions 20 has a cross shape instead of a T shape. Both the imaging apparatuses 101 in FIGS. 17I and 17J can reduce a probability of light being incident on the adjacent sensor pixels 121.

Figure 17K:
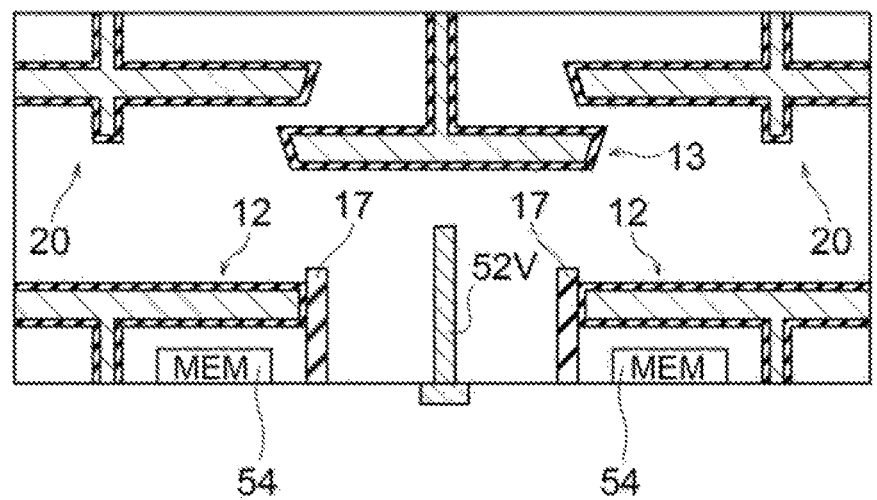
FIG. 17K is a cross-sectional view illustrating various modification examples of the second light shielding portion, the first light shielding portion, and the element separation portion.

FIG. 17K is a cross-sectional view of the imaging apparatus 101 according to a modification example of FIG. 17J. In the imaging apparatus 101 in FIG. 17K, the horizontal light shielding portion 13H of the first light shielding portion 13 is disposed on a side closer to the front surface 11A than the horizontal light shielding portions 20H of the element separation portions 20. Therefore, the distance between the horizontal light shielding portions 12H of the second light shielding portion 12 and the vertical light shielding portions 20V of the element separation portions 20 in the imaging apparatus 101 in FIG. 17K is longer than that in the imaging apparatus 101 in FIG. J, and it is possible to further curb leakage of light in FIG. 17J than in FIG. 17K in terms of leakage of light to the adjacent sensor pixels 121.

Figure 17L:
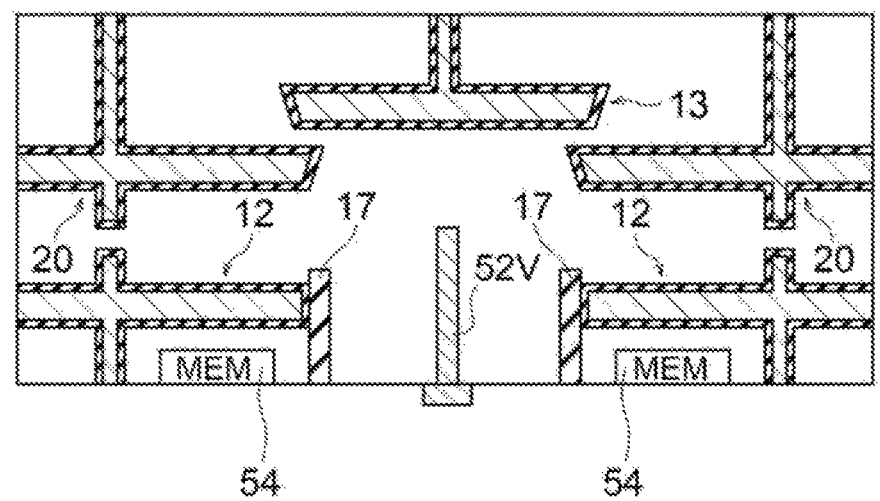
FIG. 17L is a cross-sectional view illustrating various modification examples of the second light shielding portion, the first light shielding portion, and the element separation portion.
Figure 17M:
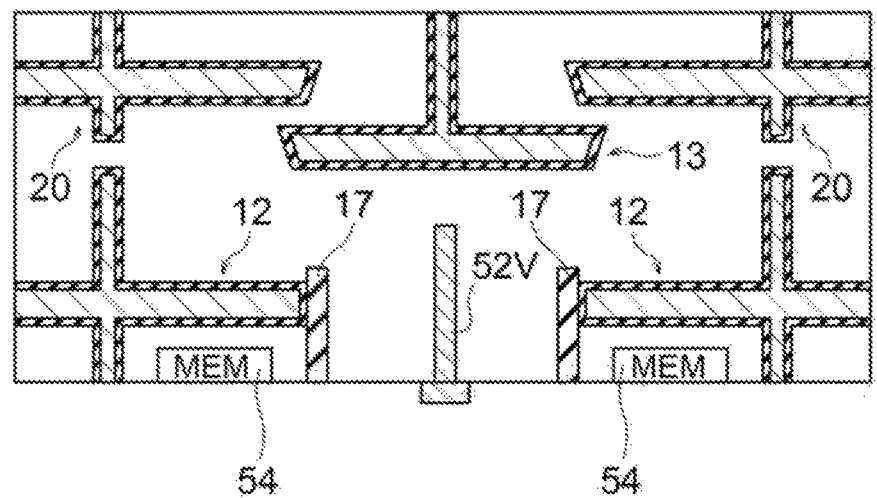
FIG. 17M is a cross-sectional view illustrating various modification examples of the second light shielding portion, the first light shielding portion, and the element separation portion.

FIGS. 17L and 17M are cross-sectional views of an imaging apparatus 101 in which both the cross-sections of the second light shielding portion 12 and the element separation portions 20 have cross shapes. In FIGS. 17L and 17M, the heights of the horizontal light shielding portion 13H of the first light shielding portion 13 and the horizontal light shielding portions 20H of the element separation portions 20 are the opposite.

Figure 17N:
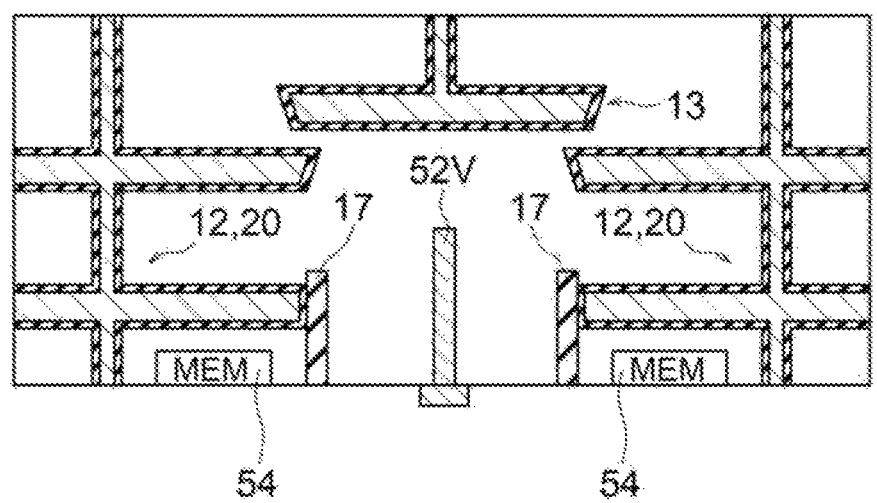
FIG. 17N is a cross-sectional view illustrating various modification examples of the second light shielding portion, the first light shielding portion, and the element separation portion.
Figure 17O:
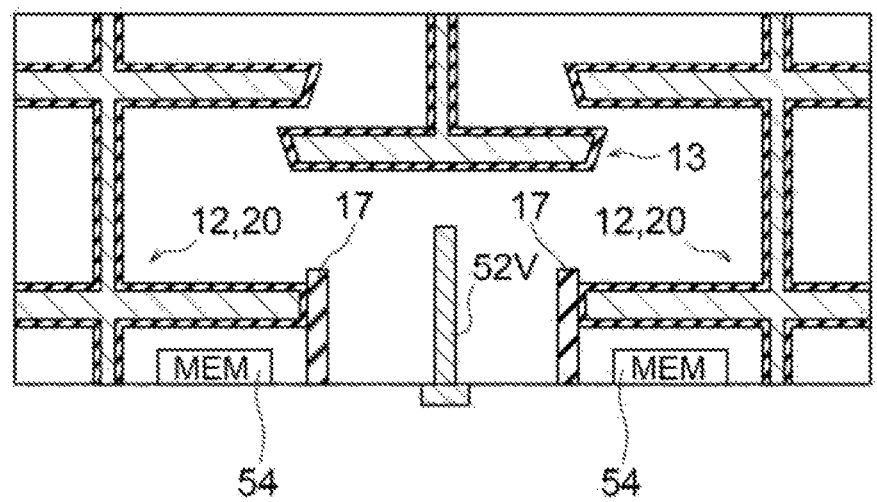
FIG. 17O is a cross-sectional view illustrating various modification examples of the second light shielding portion, the first light shielding portion, and the element separation portion.

FIGS. 17N and 17O are cross-sectional views of an imaging apparatus 101 in which vertical light shielding portions penetrating from the front surface 11A to the rear surface 11B of the semiconductor substrate 11 are provided with the second light shielding portion 12 and the element separation portions 20 formed as an integrated structure. In FIGS. 17N and 17O, the heights of the horizontal light shielding portion 13H of the first light shielding portion 13 and the horizontal light shielding portions 20H of the element separation portions 20 are the opposite. Both in FIGS. 17N and 17O, the boundaries between the adjacent sensor pixels 121 are closed with the vertical light shielding portions penetrating from the front surface 11A to the rear surface 11B of the semiconductor substrate 11, and it is thus possible to reliably prevent light leakage due to color mixing.

Note that only some representative examples of combinations of the first light shielding portion 13 with a T-shaped cross-section, the second light shielding portion 12 with various cross-sectional shapes, and the element separation portions 20 with various cross-sectional shapes have been illustrated in FIGS. 17A and 17O and combinations of cross-sectional shapes, which are not illustrated in the drawing, may be adopted.

Figure 17P:
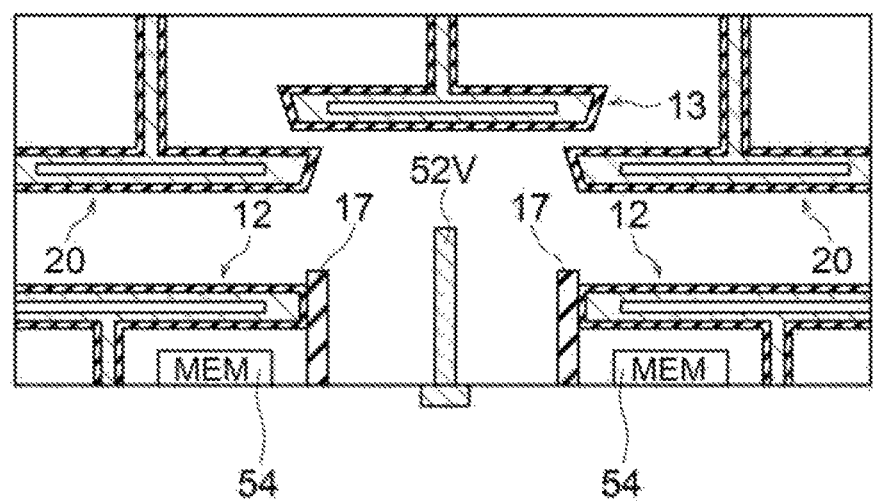
FIG. 17P is a cross-sectional view illustrating various modification examples of the second light shielding portion, the first light shielding portion, and the element separation portion.
Figure 17Q:
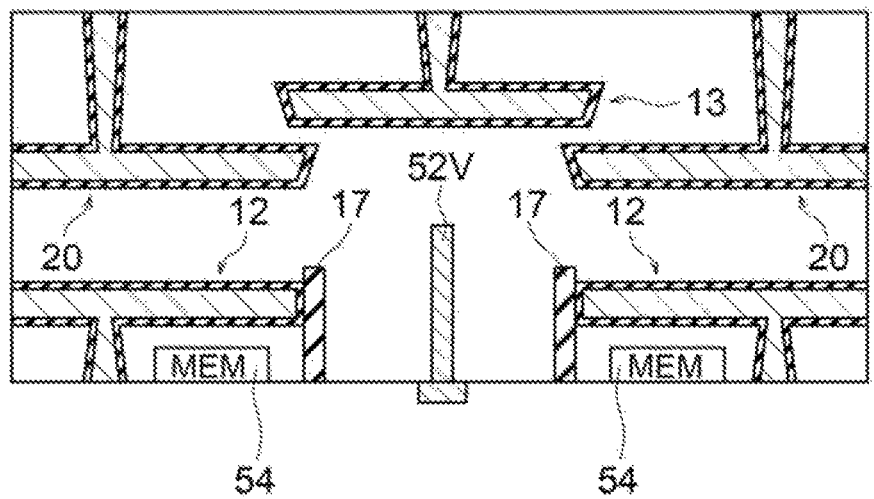
FIG. 17Q is a cross-sectional view illustrating various modification examples of the second light shielding portion, the first light shielding portion, and the element separation portion.

In a case where volumes of the space 13Z and the space 12Z of the horizontal light shielding portion 13H of the first light shielding portion 13 and the horizontal light shielding portions 12H of the second light shielding portion 12 manufactured in the manufacturing process in FIGS. 17A, 17B, 17C, 17D, 17E, 17F, 17G, 17H, 17I, 17J, 17K, 17L, 17M, 17N, and 17O are large, a gap (void) may occur even when the inner layer portion is filled as in FIG. 17P, but there are no problems in performance, in particular. In addition, the vertical light shielding portions 13V and 12V may be tapered as in FIG. 17Q in practice. In the specification, a case where the vertical light shielding portions have a shape that does not completely perpendicularly intersect the horizontal plane of the semiconductor substrate 11 and intersects the horizontal plane is also included in the concept of the vertical light shielding portions.

FIGS. 17A, 17B, 17C, 17D, 17E, 17F, 17G, 17H, 17I, 17J, 17K, 17L, 17M, 17N, 17O, and 17P illustrate an example in which the cross-section of the first light shielding portion 13 in the depth direction is a T shape, but the cross-section of the first light shielding portion 13 in the depth direction may be a cross shape. In this case, the vertical light shielding portion 13V of the first light shielding portion 13 may extend from the rear surface 11B side to the inside of the semiconductor substrate 11, or may penetrate the semiconductor substrate 11 from the rear surface 11B side to the front surface 11A side.

In this manner, according to the second embodiment, light that is incident on the vertical gate electrode 52V and the charge holding unit (MEM) 54 is curbed, and leakage of light to adjacent sensor pixels 121 is also prevented while keeping movement of the charge generated by the photoelectric conversion unit 51 not prevented as much as possible, by changing the cross-sectional shapes of the second light shielding portion 12 in various manners in addition to the first light shielding portion 13 with a T-shaped cross-section. In addition, it is possible to reliably prevent leakage of light to the adjacent sensor pixels 121 by providing the element separation portions 20 with various shapes in addition to the first light shielding portion 13 with a T-shaped cross-section and the second light shielding portion 12 with various cross-sectional shapes.

Third Embodiment

In the first embodiment, an example in which the first light shielding portion 13 is formed from the rear surface side of the semiconductor substrate 11 has been described, but the first light shielding portion 13 may be formed from the front surface side of the semiconductor substrate 11.

Figure 18A:
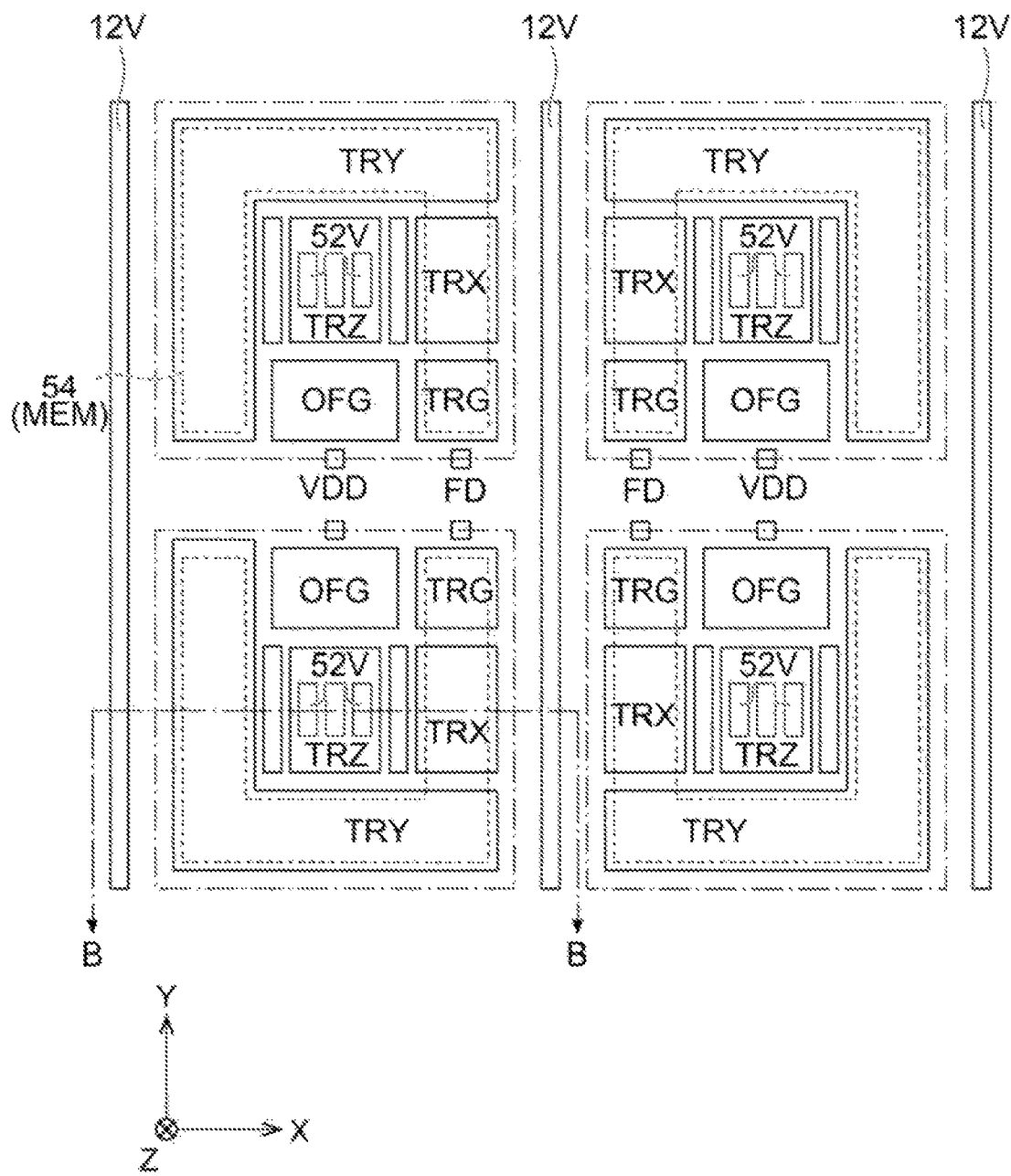
FIG. 18A is a plan layout view of an imaging apparatus according to a third embodiment.

FIG. 18A is a planar layout of an imaging apparatus 101 according to a third embodiment. FIG. 18A illustrates a planar layout corresponding to two pixels in an X direction and a Y direction similar to FIG. 3, but differs from FIG. 3 in the arrangement of transfer transistors in a pixel.

FIG. 18A is an example of a planar layout of the imaging apparatus 101, and various modification examples other than the example illustrated in the drawing are conceivable. FIG. 18A illustrates an example in which a transfer transistor TRZ includes two vertical gate electrodes 52V. A vertical light shielding portion 13V of a first light shielding portion 13 is disposed in the depth direction from between the vertical gate electrodes 52V. The number of vertical gate electrodes 52V of the transfer transistor TRZ may be one, but in this case, the vertical light shielding portion 13V is disposed in an empty region near the vertical gate electrode 52V. By disposing the vertical light shielding portion 13V in the vicinity of the vertical gate electrode 52V, the first light shielding portion 13 can be disposed near the center of a pixel region, similar to the first and second embodiments.

Figure 18B:
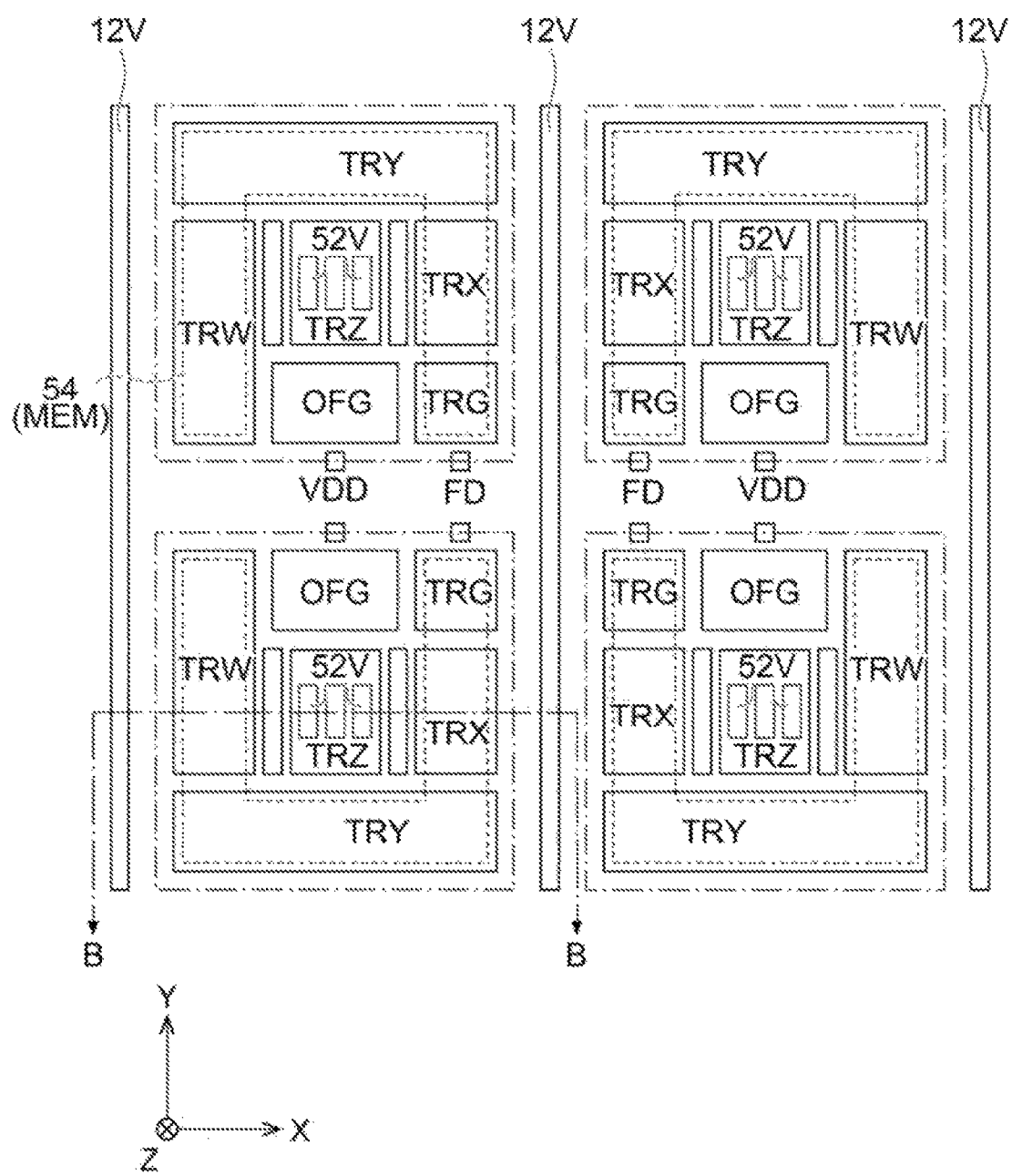
FIG. 18B is a plan layout view illustrating a modification example of FIG. 18A.

Note that where the vertical light shielding portion 13V of the first light shielding portion 13 is to be provided in a semiconductor substrate 11 is arbitrary. A plurality of transfer transistors and the like are disposed on the front surface side of the semiconductor substrate 11, and an empty region is limited. However, the first light shielding portion 13 can be formed by forming a trench for the vertical light shielding portion 13V in the depth direction from any empty region and forming a space in the horizontal direction. In FIG. 18A, a transfer transistor TRY is formed in an L shape, but a transfer transistor TRW separate from the transfer transistor TRY may be provided as illustrated in FIG. 18B.

Figure 19:
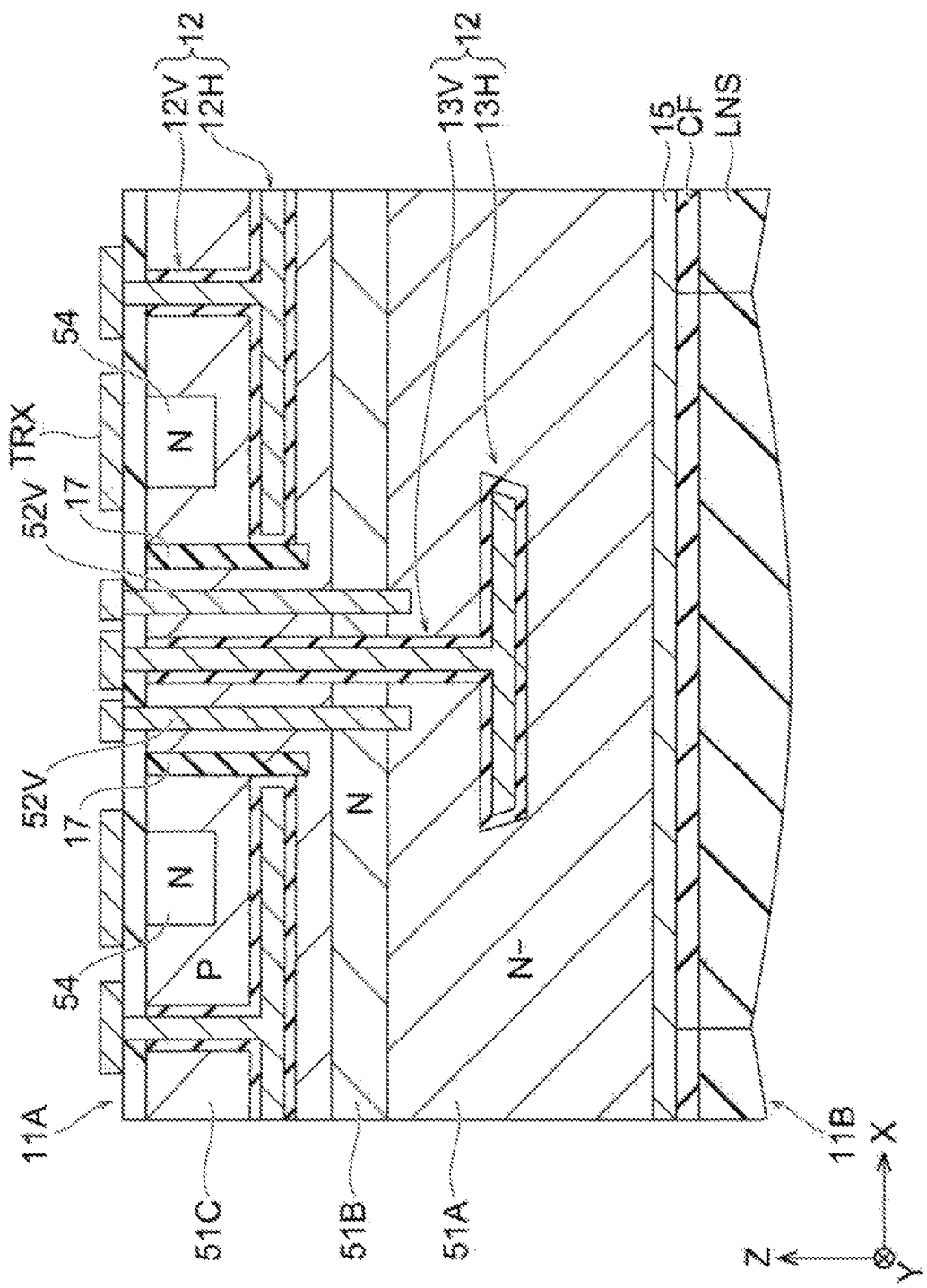
FIG. 19 is a cross-sectional view in a direction of a line B-B in FIG. 18A.

FIG. 19 is a cross-sectional view in a direction of a line B-B in FIG. 18A. FIG. 19 is different from the cross-sectional structure in FIG. 4A in that the vertical light shielding portion 13V of the first light shielding portion 13 extends in the depth direction from the front surface side of the semiconductor substrate 11, but other cross-sectional structures are similar to those in FIG. 4A.

In the cross-sectional view of FIG. 19, only main portions of the imaging apparatus 101 according to the third embodiment are illustrated, an element separation portion 20 may be provided as in FIG. 5, and a vertical light shielding portion may also be provided on the vertical gate electrode 52V side of a second light shielding portion 12 to more reliably prevent light from being incident on a charge holding unit (MEM) 54.

In this manner, in the third embodiment, the first light shielding portion 13 can be formed by forming a trench for the vertical light shielding portion 13V of the first light shielding portion 13 from any empty region on the front surface side of the semiconductor substrate 11, and thus the first light shielding portion 13 can be disposed at a position that does not overlap a pixel boundary, similar to the first and second embodiments. In addition, it is possible to achieve a reduction in noise and an improvement in sensitivity by optimizing the direction, length, and number of trenches for the vertical light shielding portion 13V.

In each of the above-described embodiments, the configuration in which the space 12Z as illustrated in FIG. 12H for forming the first light shielding portion 12 is formed through crystal anisotropic etching using a characteristic that etching rates differ in accordance with plane orientations of Si {111} has been described. Here, the Si {111} substrate in the present disclosure is a substrate or a wafer with a crystal plane formed of a silicon monocrystal and represented as (111) in the description of a mirror index. The Si {111} substrate in the present disclosure includes a substrate or a wafer in which a crystal orientation deviates by several degrees, for example, a substrate or a wafer in which the crystal orientation deviates by several degrees in the closest [110] direction from the {111} plane. Moreover, the Si (111) substrate includes a substrate or a wafer on a part or entire surface of which a silicon monocrystal is caused to grow through epitaxial method or the like.

In addition, the {111} plane in the notion in the present disclosure is a collective term of a (111) plane, a (−111) plane, a (1−11) plane, a (11−1) plane, a (−1−11) plane, a (−11−1) plane, a (1−1−1) plane, and a (−1−1−1) plane that are crystal planes equivalent to each other in terms of symmetry. Therefore, the description of the Si {111} substrate in the specification or the like of the present disclosure may be read as a Si (1−11) substrate instead, for example. Here, a minus symbol is used instead as the bar symbol for the notion of the mirror index in the negative direction.

In addition, the <110> direction in the description of the present disclosure is a collective term of a [110] direction, a [101] direction, a [011] direction, a [−110] direction, a [1−10] direction, a [−101] direction, a [10−1] direction, a [0−11] direction, a [01−1] direction, a [−1−10] direction, a

[−10−1] direction, and a [0−1−1] direction that are crystal plane directions equivalent to each other in terms of symmetry and may be read as any of these instead. However, etching is performed in a direction that perpendicularly intersects the element formation plane and a direction that further perpendicularly intersects the direction that perpendicularly intersects the element formation plane (that is, a direction parallel to the element formation plane) according to the present disclosure.

FIG. 20 illustrates specific combinations of planes and orientations with which etching in the <110> direction is established in the (111) plane that is the crystal plane of the Si {111} substrate in the present disclosure.

As illustrated in FIG. 20, 96 (=8×12) combinations between the {111} plane and the <110> direction are present. However, the <110> direction in the present disclosure is limited to the direction that perpendicularly intersects the {111} plane that is the element formation plane and the direction that is parallel to the element formation plane. In other words, a combination between the element formation plane in the Si {111} substrate and the orientation in which etching is performed on the Si {111} substrate in the present disclosure is selected from any of the combinations indicated with circles in FIG. 20.

In addition, the above-described first embodiment illustrates, as an example, the case where the etching advances in the X-axis direction while the etching does not advance in the Y-axis direction and the Z-axis direction, using the Si {111} substrate. However, the present disclosure is not limited thereto, and it is only necessary for the etching advancing orientation to be present in both the X-axis direction and the Y-axis direction or either the X-axis direction or the Y-axis direction.

It is known that if etching using an alkali solution, for example, is performed when crystal anisotropic etching using an etching solution is performed on an Si substrate, an Si etching reaction caused by the alkali solution advances due to a reaction between a combined hand of Si and an OH ion, the etching is thus more likely to advance as the number of uncombined hands exposed to the front surface side increases, and the etching is less likely to advance as the number of back bonds extending on the bulk side increases.

In other words, one or two or at least less than three Si back bonds are included in the horizontal light shielding portions in substantially the horizontal direction with respect to the substrate surface while three Si back bonds are included in substantially the vertical direction with respect to the substrate surface. If the back bonds are described by exemplifying FIG. 24, for example, the back bonds represent combined hands extending in a negative direction on the side opposite to the Si uncombined hand with respect to a normal line of the Si {111} plane on the assumption that the side of the Si uncombined hand is a positive side.

Figure 21:
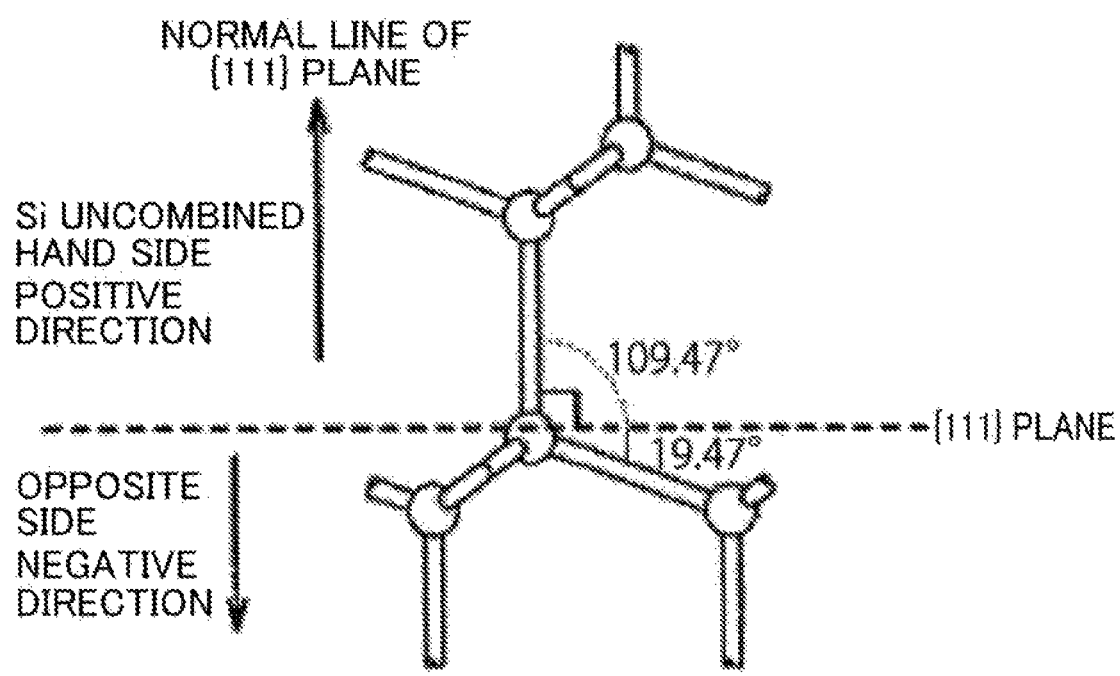
FIG. 21 is a schematic view illustrating a back bond in a crystal plane of a Si substrate according to the present disclosure.

FIG. 21 illustrates an example of three back bonds at −19.47° to +19.47° with respect to the {111} plane. Specifically, in a case where the photoelectric conversion unit, the horizontal light shielding portion, and the charge holding unit are provided in the Si {111} substrate, the horizontal light shielding portion includes a first surface along a first crystal plane of the Si {111} substrate that perpendicularly intersects the first direction and is represented by a plane index {111} and a second surface along the second crystal plane of the Si {111} substrate that is inclined with respect to the first direction and is represented by the plane index {111}. In addition, electronic equipment according to an embodiment of the present disclosure includes the above-described imaging apparatus.

Figure 22:
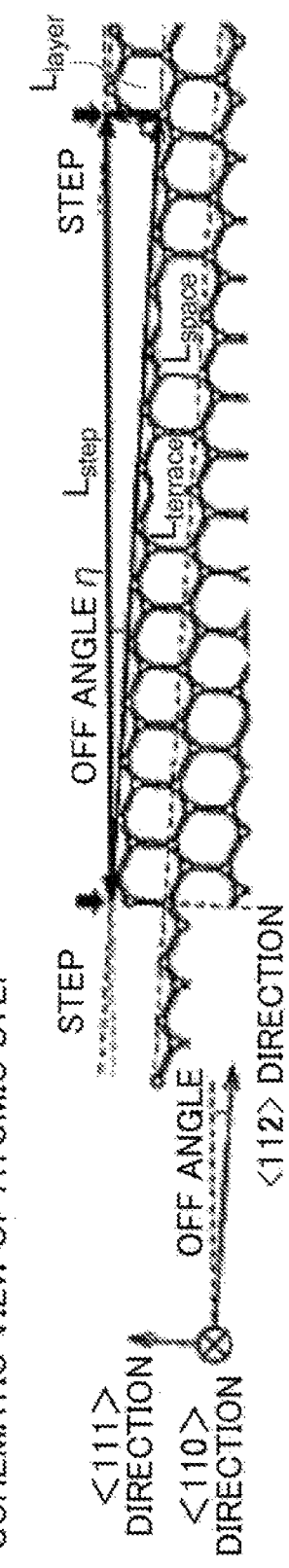
FIG. 22 is a schematic view illustrating an off angle in the surface of the Si substrate according to the present disclosure.

The Si {111} substrate according to each of the above-described embodiments includes a substrate worked such that the substrate surface has an off angle with respect to the <112> direction as illustrated in FIG. 22, for example. The relationship that the etching rate in the <110> direction, that is, the direction in which one Si back bond is included is sufficiently higher relative to the etching rate in the <111> direction, that is, the direction in which three Si back bonds are included is maintained even in a case of the substrate with the off angle in a case where the off angle is equal to or less than 19.47 degrees. Since the number of steps increases and density of micro step differences increases as the off angle increases, the off angle is preferably equal to or less than 5 degrees. Note that although the case where the substrate surface has an off angle in the <112> direction has been exemplified in the example in FIG. 22, the substrate surface may have an off angle in the <110> direction, and the direction of the off angle does not matter. Additionally, the Si plane orientation can be analyzed using an X-ray diffraction method, an electron beam diffraction method, an electron beam backscatter diffraction method, or the like. Since the number of Si back bonds is determined by the crystal structure of Si, it is also possible to analyze the number of back bonds through the analysis of the Si plane orientation.

Example of Application to Electronic Equipment

Figure 23:
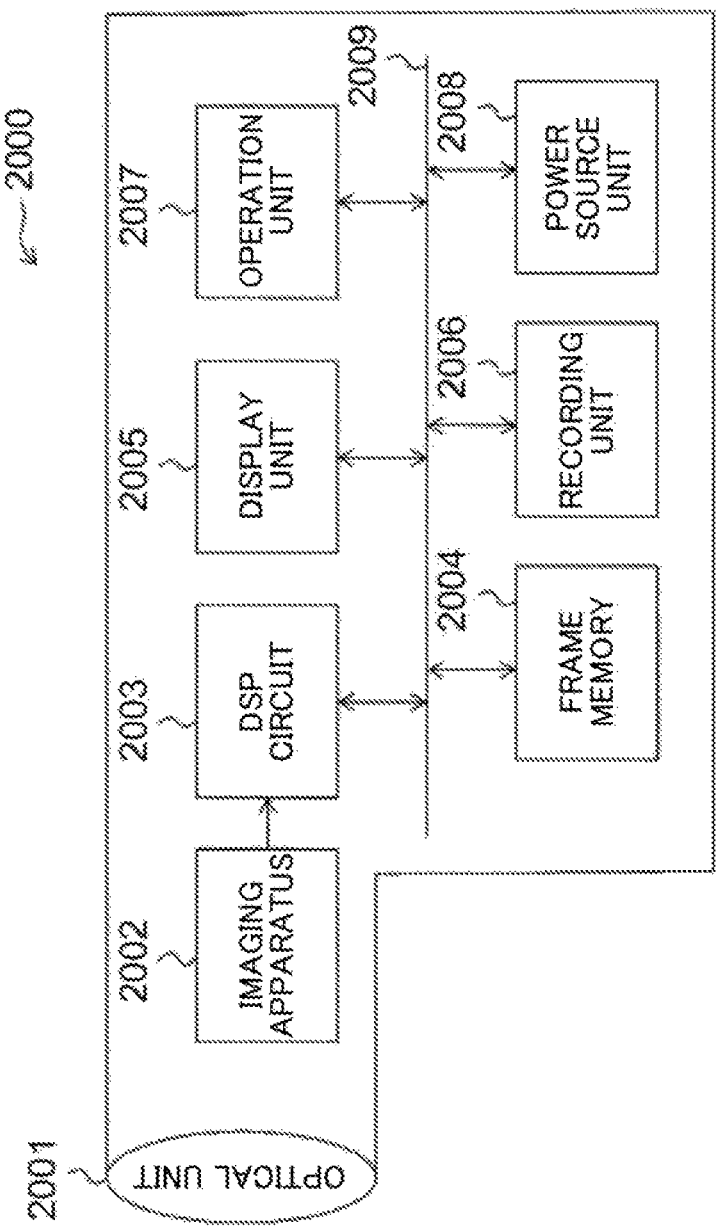
FIG. 23 is a block diagram illustrating a configuration example of a camera as electronic equipment to which the present technology is applied.

FIG. 23 is a block diagram illustrating a configuration example of a camera 2000 as electronic equipment to which the present technology is applied.

The camera 2000 includes an optical unit 2001 including a lens group and the like, an imaging apparatus (imaging device) 2002 to which the aforementioned imaging apparatus 101 or the like (hereinafter, referred to as an imaging apparatus 101 or the like) is applied, and a digital signal processor (DSP) circuit 2003 that is a camera signal processing circuit. Additionally, the camera 2000 also includes a frame memory 2004, a display unit 2005, a recording unit 2006, an operation unit 2007, and a power source unit 2008. The DSP circuit 2003, the frame memory 2004, the display unit 2005, the recording unit 2006, the operation unit 2007, and the power source unit 2008 are connected to each other via a bus line 2009.

The optical unit 2001 captures incident light (image light) from a subject and forms an image on an imaging surface of the imaging apparatus 2002. The imaging apparatus 2002 converts the amount of incident light formed on the imaging surface by the optical unit 2001 into an electric signal in units of pixels and outputs the electric signal as a pixel signal.

The display unit 2005 is constituted by a panel-type display device such as a liquid crystal panel or an organic EL panel, for example, and displays a video or a stationary image captured by the imaging apparatus 2002. The recording unit 2006 records the video or the stationary image captured by the imaging apparatus 2002 in a recording medium such as a hard disk or a semiconductor memory.

The operation unit 2007 issues operation commands for various functions that the camera 2000 has in response to user operations. The power source unit 2008 appropriately supplies various power supplies serving as operation power supplies for the DSP circuit 2003, the frame memory 2004, the display unit 2005, the recording unit 2006, and the operation unit 2007 to these supply targets.

As described above, acquisition of a satisfactory image can be expected by using the above-described imaging apparatus 101 or the like as the imaging apparatus 2002.

Example of Application to Moving Body

The technology according to the present disclosure (the present technology) can be applied to various products. For example, the technology according to the present disclosure may be realized as an apparatus mounted on any type of moving body such as an automobile, an electric vehicle, a hybrid electric vehicle, a motorcycle, a bicycle, a personal mobility, an airplane, a drone, a ship, and a robot.

Figure 24:
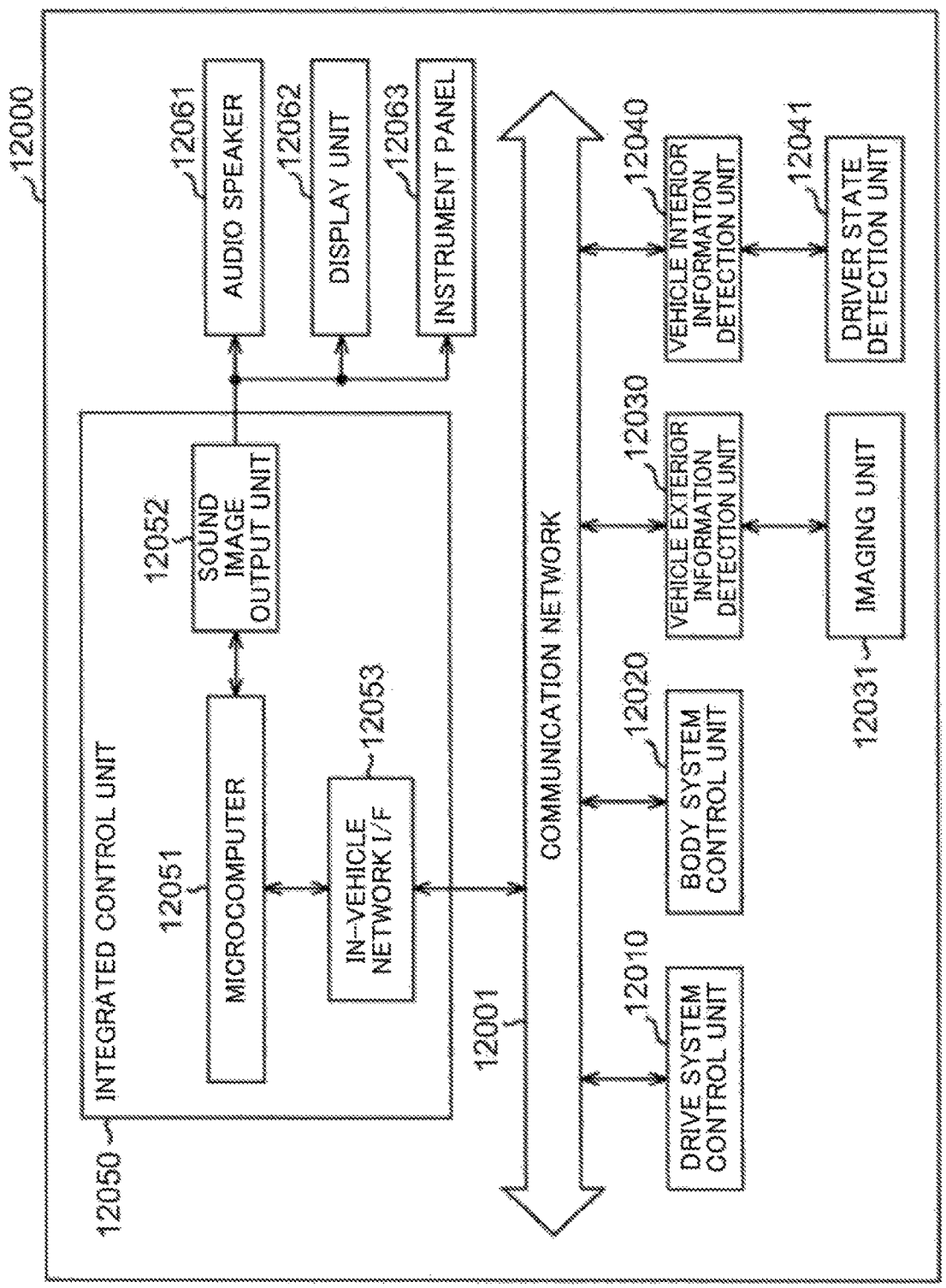
FIG. 24 is a block diagram illustrating a schematic configuration example of a vehicle control system that is an example of a moving body control system.

FIG. 24 is a block diagram illustrating a schematic configuration example of a vehicle control system that is an example of a moving body control system to which the technology according to the present disclosure can be applied.

The vehicle control system 12000 includes a plurality of electronic control units connected via a communication network 12001. In the example illustrated in FIG. 24, the vehicle control system 12000 includes a drive system control unit 12010, a body system control unit 12020, a vehicle exterior information detection unit 12030, a vehicle interior information detection unit 12040, and an integrated control unit 12050. In addition, as a functional configuration of the integrated control unit 12050, a microcomputer 12051, a sound image output unit 12052, and an in-vehicle network interface (I/F) 12053 are illustrated.

The drive system control unit 12010 controls operations of devices related to a drive system of a vehicle according to various programs. For example, the drive system control unit 12010 functions as a driving force generation device for generating a driving force of a vehicle such as an internal combustion engine or a driving motor, a driving force transmission mechanism for transmitting a driving force to wheels, a steering mechanism for adjusting a turning angle of a vehicle, and a control device such as a braking device that generates a braking force of a vehicle.

The body system control unit 12020 controls operations of various devices mounted in the vehicle body according to various programs. For example, the body system control unit 12020 serves as a control device of a keyless entry system, a smart key system, a power window device, or various lamps such as a head lamp, a back lamp, a brake lamp, a turn signal, and a fog lamp. In this case, radio waves transmitted from a portable device that substitutes for a key or signals of various switches can be input to the body system control unit 12020. The body system control unit 12020 receives inputs of these radio waves or signals and controls a door lock device, a power window device, a lamp, and the like of the vehicle.

The vehicle exterior information detection unit 12030 detects information outside the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for peoples, cars, obstacles, signs, and letters on the road based on the received image.

The imaging unit 12031 is an optical sensor that receives light and outputs an electrical signal according to the intensity of the light received. The imaging unit 12031 can output an electrical signal as an image or output it as a distance measurement information. In addition, the light received by the imaging unit 12031 may be visible light or invisible light such as infrared rays.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generator, the steering mechanism, or the braking device on the basis of the information on the inside and the outside of the vehicle acquired by the vehicle exterior information detection unit 12030 or the vehicle interior information detection unit 12040, and output a control command to the drive system control unit 12010. For example, the microcomputer 12051 can perform coordinated control for the purpose of realizing a function of an advanced driver assistance system (ADAS) including vehicle collision avoidance, shock alleviation, following travel based on an inter-vehicle distance, cruise control, vehicle collision warning, vehicle lane departure warning, or the like.

Further, the microcomputer 12051 can perform cooperative control for the purpose of automated driving or the like in which autonomous travel is performed without depending on operations of the driver by controlling the driving force generator, the steering mechanism, the braking device, and the like on the basis of information regarding the surroundings of the vehicle acquired by the vehicle exterior information detection unit 12030 or the vehicle interior information detection unit 12040.

In addition, the microcomputer 12051 can output a control command to the body system control unit 12020 based on the information outside the vehicle acquired by the vehicle exterior information detection unit 12030. For example, the microcomputer 12051 can perform cooperative control for antiglare such as switching a high beam to a low beam by controlling a headlamp according to a position of a preceding vehicle or an oncoming vehicle detected by the vehicle exterior information detection unit 12030.

The sound image output unit 12052 transmits an output signal of at least one of audio and an image to an output device capable of visually or audibly notifying an occupant of a vehicle or the outside of the vehicle of information. In the example illustrated in FIG. 24, an audio speaker 12061, a display unit 12062, and an instrument panel 12063 are illustrated as output devices. The display unit 12062 may include, for example, at least one of an onboard display and a head-up display.

Figure 25:
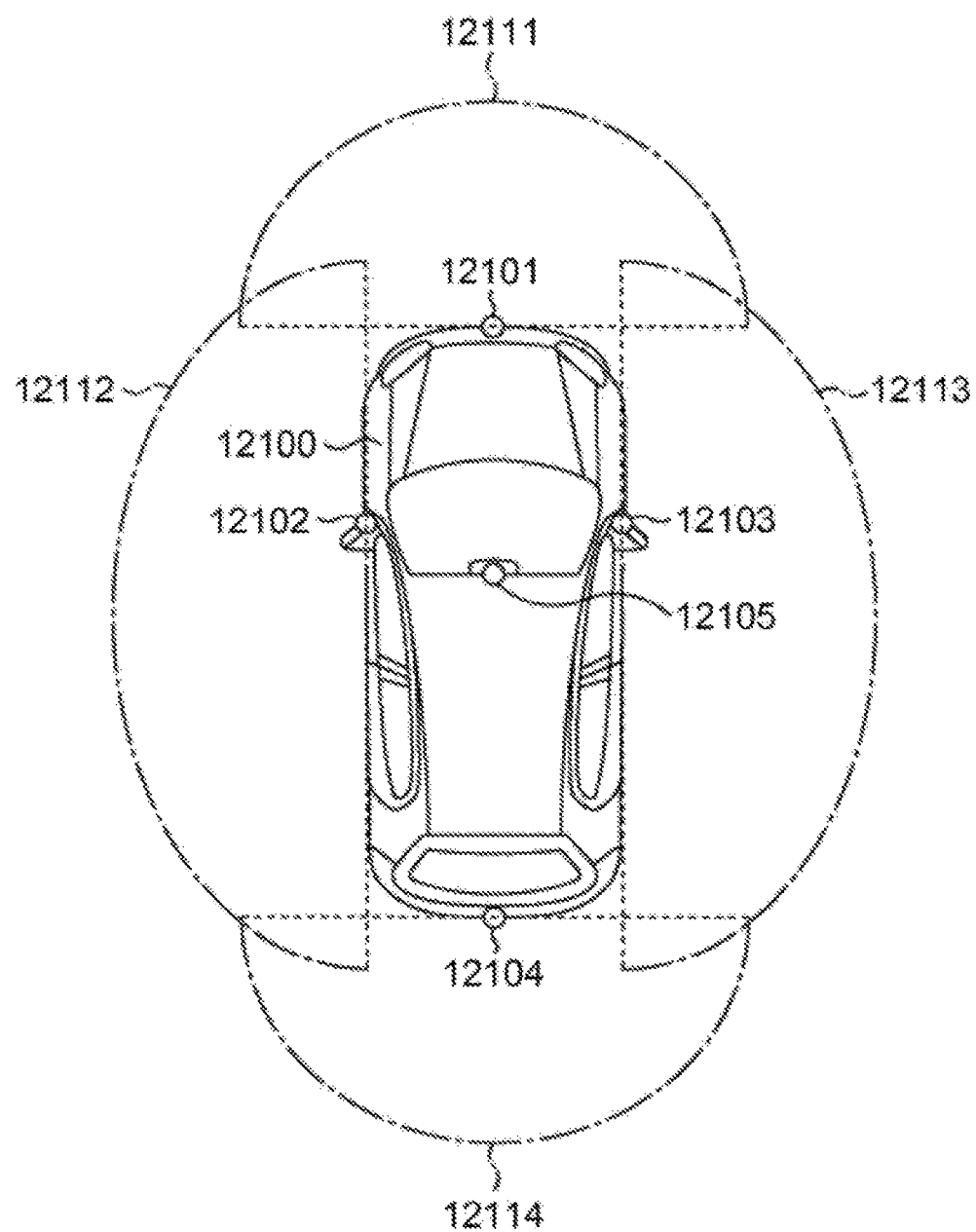
FIG. 25 is a diagram illustrating an example of an installation position of an imaging unit.

FIG. 25 is a diagram illustrating an example of positions at which the imaging unit 12031 is installed.

In FIG. 25, imaging units 12101, 12102, 12103, 12104, and 12105 are included as the imaging unit 12031.

The imaging units 12101, 12102, 12103, 12104, and 12105 are provided at positions such as a front nose, side-view mirrors, a rear bumper, a back door, and an upper part of a windshield in a vehicle interior of the vehicle 12100, for example. The imaging unit 12101 provided in the front nose and the imaging unit 12105 provided in the upper portion of the front glass inside the vehicle mainly acquire images on the front side of the vehicle 12100. The imaging units 12102 and 12103 provided in the side mirrors mainly acquire images on the lateral sides of the vehicle 12100. The imaging unit 12104 provided in the rear bumper or the backdoor mainly acquires images on the rear side of the vehicle 12100. The imaging unit 12105 included in the upper portion of the front glass inside the vehicle is mainly used to detect front vehicles or pedestrians, obstacles, traffic signals, traffic signs, lanes, and the like.

FIG. 25 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposition of image data captured by the imaging units 12101 to 12104.

At least one of the imaging units 12101 to 12104 may have a function of acquiring distance information. For example, at least one of the imaging units 12101 to 12104 may be a stereo camera constituted by a plurality of imaging elements or may be an imaging element having pixels for phase difference detection.

For example, the microcomputer 12051 can extract a three-dimensional object traveling at a predetermined speed (for example, 0 km/h or more) in substantially the same direction as that of the vehicle 12100 which is particularly a closest three-dimensional object on a travel road of the vehicle 12100 as a front vehicle by obtaining a distance from each three-dimensional object within the imaging ranges 12111 to 12114 and a temporal change of the distance (a relative speed to the vehicle 12100) based on the distance information obtained from the imaging units 12101 to 12104. Further, the microcomputer 12051 can set an inter-vehicle distance which is guaranteed in advance before a front vehicle and perform automated brake control (also including following stop control) or automated acceleration control (also including following start control). In this manner, it is possible to perform cooperative control for the purpose of, for example, autonomous driving in which the vehicle autonomously travels without requiring the driver to perform operations.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of distance information obtained from the imaging units 12101 to 12104 and use the three-dimensional object data for automatic avoidance of obstacles. For example, the microcomputer 12051 identifies obstacles in the vicinity of the vehicle 12100 into obstacles that can be visually recognized by the driver of the vehicle 12100 and obstacles that are difficult to visually recognize. Then, the microcomputer 12051 can determine a risk of collision indicating the degree of risk of collision with each obstacle, and can perform driving assistance for collision avoidance by outputting a warning to a driver through the audio speaker 12061 or the display unit 12062 and performing forced deceleration or avoidance steering through the drive system control unit 12010 when the risk of collision has a value equal to or greater than a set value and there is a possibility of collision.

At least one of the imaging units 12101 to 12104 may be an infrared camera that detects infrared light. For example, the microcomputer 12051 can recognize a pedestrian by determining whether or not a pedestrian is present in images captured by the imaging units 12101 to 12104. Such recognition of a pedestrian is performed by, for example, a procedure of extracting a feature point in captured images of the imaging units 12101 to 12104 serving as infrared cameras, and a procedure of performing pattern matching processing on a series of feature points indicating the contour of a subject to determine whether or not the subject is a pedestrian. When the microcomputer 12051 determines that a pedestrian is present in the captured images of the imaging units 12101 to 12104 and recognizes the pedestrian, the sound image output unit 12052 controls the display unit 12062 such that a square contour line for emphasis is superimposed on the recognized pedestrian and is displayed. In addition, the sound image output unit 12052 may control the display unit 12062 so that an icon or the like indicating a pedestrian is displayed at a desired position.

An example of the vehicle control system to which the technology according to the present disclosure can be applied has been described above. The technology of the present disclosure can be applied to the imaging unit 12031 and the like in the above-described configuration. Specifically, the imaging apparatus 101 and the like illustrated in FIG. 1 and the like can be applied to the imaging unit 12031. It is possible to expect excellent operations of the vehicle control system by applying the technology according to the present disclosure to the imaging unit 12031.

Other Modification Examples

Although the present disclosure has been described by exemplifying some embodiments and modification examples hitherto, the present disclosure is not limited to the above-described embodiments and the like, and various modifications can be made. Although the imaging apparatus 101 including the columnar-shaped etching stoppers 17 has been described in the above-described first embodiment, for example, the shape of the etching stoppers is not limited thereto. For example, wall-shaped etching stoppers extending along the Y axis may be provided. In this case, the opening portions 12H1 have substantially a hexagonal shape. In a case where it is desired to sufficiently secure an area of a region for forming the vertical gate electrode 52V, it is only necessary to provide etching stoppers extending in the Y-axis direction in parallel with the vertical light shielding portions 12V of the light shielding portion 12 as in the imaging apparatus 106. On the other hand, in order to further reduce the area of the region of the opening portions 12H1, it is only necessary to provide etching stoppers 17 with shapes with a small occupying area in the XY plane as in the imaging apparatus 101 according to the above-described first embodiment.

Moreover, a solid phase diffusion layer 19 including pn junction may be formed in the surroundings of the first light shielding portion 13 and the element separation portions 20 in the imaging apparatus 101 according to the above-described first to fourth embodiments. This leads to an increase in PN junction surface, and it is possible to increase the amount Qs of saturation signals.

Additionally, although FIG. 16 illustrates, as an example, the imaging apparatus 101 having a three-dimensional structure in which three substrates are laminated, the type and the number of laminated substrates are not limited thereto.

Note that the present technology can also adopt the following configurations.

(1) An imaging apparatus including:
a semiconductor substrate;
a photoelectric conversion unit which is provided in the semiconductor substrate and generates charge corresponding to the amount of received light by photoelectric conversion;
a charge holding unit which is disposed on a side closer to a first surface of the semiconductor substrate than to the photoelectric conversion unit, and holds the charge transferred from the photoelectric conversion unit;
a charge transfer unit which transfers the charge from the photoelectric conversion unit to the charge holding unit;
a vertical electrode which is disposed in a depth direction of the semiconductor substrate, the vertical electrode transmitting the charge generated by the photoelectric conversion unit to the charge transfer unit; and
a first light control member which is disposed at a position overlapping the vertical electrode when the semiconductor substrate is seen in a plan view from a normal direction of the first surface, and is provided in a pixel region without straddling a boundary between pixels.

(2) The imaging apparatus according to (1),
wherein the first light control member includes
a first light control portion which is disposed along the second surface on a side closer to a second surface of the semiconductor substrate on a side opposite to the first surface than to the vertical electrode, and
a second light control portion which is connected to the first light control portion and extends in the depth direction of the semiconductor substrate.

(3) The imaging apparatus according to (2),
wherein the second light control portion is provided inside the photoelectric conversion unit in the pixel region, and
the first light control portion is separately provided for each pixel.

(4) The imaging apparatus according to (2) or (3), further including:
an element separation portion which extends in the depth direction of the semiconductor substrate along the boundary between the pixels,
wherein the first light control portion and the second light control portion are disposed in the pixel region surrounded by the element separation portion.

(5) The imaging apparatus according to any one of (2) to (4),
wherein the semiconductor substrate has a crystal plane of silicon represented by a plane index {111}, and
the first light control portion includes
a first light control surface which is disposed in a first direction different from the depth direction of the semiconductor substrate, and is disposed along a first crystal plane represented by a plane index {111}, and
a second light control surface which is disposed in a second direction different from the depth direction of the semiconductor substrate, and is disposed along a second crystal plane represented by a plane index {111}.

(6) The imaging apparatus according to any one of (2) to (5),
wherein a plurality of the vertical electrodes are provided for each pixel, and
the first light control portion is disposed at a position overlapping the plurality of vertical electrodes when the semiconductor substrate is seen in a plan view from the normal direction of the first surface.

(7) The imaging apparatus according to (6),
wherein an end side of the first light control portion is disposed substantially in parallel with an end side of the second light control portion when the semiconductor substrate is seen in a plan view from the normal direction of the first surface.

(8) The imaging apparatus according to (6) or (7),
wherein an end side of the charge holding unit is disposed substantially in parallel with a least one of the end side of the first light control portion and the end side of the second light control portion when the semiconductor substrate is seen in a plan view from the normal direction of the first surface.

(9) The imaging apparatus according to any one of (2) to (8),
wherein the second light control portion is disposed in the depth direction of the semiconductor substrate toward the first light control portion from the second surface side.

(10) The imaging apparatus according to any one of (2) to (8),
wherein the second light control portion is disposed in the depth direction of the semiconductor substrate toward the first light control portion from the first surface side.

(11) The imaging apparatus according to any one of (2) to (10),
wherein the first light control portion has a shape corresponding to an extension direction, extension length, and number of the second light control portion.

(12) The imaging apparatus according to any one of (2) to (11),
wherein one end portion of the second light control portion is connected to the first light control portion.

(13) The imaging apparatus according to any one of (2) to (11),
wherein the second light control portion is disposed in the depth direction of the semiconductor substrate so as to penetrate the first light control portion.

(14) The imaging apparatus according to any one of (2) to (13),
wherein at least one of the first light control portion and the second light control portion has a property of absorbing or reflecting incident light.

(15) The imaging apparatus according to (14),
wherein at least one of the first light control portion and the second light control portion includes an insulator, a metal, polysilicon, a metal oxide, a carbon-containing material, or an electrochromic material.

(16) The imaging apparatus according to any one of (1) to (15), further including:
a second light control member which is disposed on a side closer to the first surface of the semiconductor substrate than to the first light control member and is disposed to surround the charge holding unit.

(17) The imaging apparatus according to (16),
wherein the second light control member includes
a third light control portion which is disposed along a direction of the first surface, and
a fourth light control portion which is connected to the third light control portion and is disposed in a direction intersecting the third light control portion.

(18) The imaging apparatus according to (17),
wherein one end portion of the fourth light control portion is connected to the third light control portion, and the other end portion of the fourth light control portion is disposed along the first surface.

(19) The imaging apparatus according to (17),
wherein the fourth light control portion penetrates the third light control member and extends in the depth direction of the semiconductor substrate.

(20) An imaging apparatus manufacturing method including:
a step of forming a photoelectric conversion unit in a semiconductor substrate, the photoelectric conversion unit generating charge corresponding to the amount of received light by photoelectric conversion;
a step of forming a charge holding unit that holds the charge transferred from the photoelectric conversion unit on a side closer to a first surface of the semiconductor substrate than to the photoelectric conversion unit;
a step of forming a charge transfer unit that transfers the charge from the photoelectric conversion unit to the charge holding unit;
a step of forming a vertical electrode in a depth direction of the semiconductor substrate, the vertical electrode transmitting the charge generated by the photoelectric conversion unit to the charge transfer unit; and
a step of forming a first light control member which is disposed at a position overlapping the vertical electrode when seen in a plan view from a normal direction of the first surface of the semiconductor substrate, and is provided inside the photoelectric conversion unit on a side further inside than a boundary between pixels.

(21) Electronic equipment including:
an imaging apparatus,
wherein the imaging apparatus includes
a semiconductor substrate,
a photoelectric conversion unit which is provided in the semiconductor substrate and generates charge corresponding to the amount of received light by photoelectric conversion,
a charge holding unit which is disposed on a side closer to a first surface of the semiconductor substrate than to the photoelectric conversion unit, and holds the charge transferred from the photoelectric conversion unit,
a charge transfer unit which transfers the charge from the photoelectric conversion unit to the charge holding unit,
a vertical electrode which is disposed in a depth direction of the semiconductor substrate, the vertical electrode transmitting the charge generated by the photoelectric conversion unit to the charge transfer unit, and
a first light control member which is disposed at a position overlapping the vertical electrode when the semiconductor substrate is seen in a plan view from a normal direction of the first surface, and is provided in a pixel region without straddling a boundary between pixels.

REFERENCE SIGNS LIST

11 Semiconductor substrate
12 Second light shielding portion
12A Inner layer portion
12B Outer layer portion
12H Horizontal light shielding portion
12V Vertical light shielding portion
13 First light shielding portion
13A Inner layer portion
13B Outer layer portion
13H Horizontal light shielding portion
13V Vertical light shielding portion
14 P-type semiconductor region
15 Fixed charge film
16 P-type semiconductor region
17 Etching stopper
18 Insulating layer
20 Element separation portion
22, 23 Remaining region
51 Photoelectric conversion unit
TRX, TRY, TRZ, TRG Transfer transistor
52H Horizontal terminal unit
52V Vertical gate electrode
54 Charge holding unit (MEM)
FD Charge voltage conversion unit (FD)
ORG Discharge transistor
58 RST Reset transistor
AMP Amplification transistor
SEL Selection transistor
101 Imaging apparatus
111 Pixel array unit
112 Vertical drive unit
113 Ramp wave module
114 Column signal processing unit
115 Clock module
116 Data storage unit
117 Horizontal drive unit
118 System control unit
119 Signal processing unit
121 Sensor pixel
122 Pixel drive line
123 Vertical signal line

The invention claimed is:
1. An imaging apparatus, comprising:
a semiconductor substrate;
a photoelectric conversion unit in the semiconductor substrate, wherein the photoelectric conversion unit is configured to generate charge corresponding to an amount of received light by photoelectric conversion;
a charge holding unit on a side closer to a first surface of the semiconductor substrate than to the photoelectric conversion unit, wherein the charge holding unit is configured to hold the charge transferred from the photoelectric conversion unit;
a charge transfer unit configured to transfer the charge from the photoelectric conversion unit to the charge holding unit;
a vertical electrode in a depth direction of the semiconductor substrate, wherein the vertical electrode is configured to transmit the charge generated by the photoelectric conversion unit to the charge transfer unit; and
a first light control member at a position that overlaps with the vertical electrode in a case where the semiconductor substrate is seen in a plan view from a normal direction of the first surface, wherein
the first light control member is in a pixel region without straddling a boundary between pixels, and
the first light control member includes
a first light control portion on a side closer to a second surface of the semiconductor substrate than to the vertical electrode,
the first light control portion is along the second surface of the semiconductor substrate,
the second surface of the semiconductor substrate is opposite to the first surface of the semiconductor substrate, and a second light control portion, connected to the first light control portion, extends in the depth direction of the semiconductor substrate.

2. The imaging apparatus according to claim 1, wherein
the second light control portion is provided inside the photoelectric conversion unit in the pixel region, and
the first light control portion is separately provided for each pixel of the pixels.

3. The imaging apparatus according to claim 1, further comprising:
an element separation portion which extends in the depth direction of the semiconductor substrate along the boundary between the pixels,
wherein the first light control portion and the second light control portion are in the pixel region surrounded by the element separation portion.

4. The imaging apparatus according to claim 1, wherein
the semiconductor substrate has a crystal plane of silicon represented by a plane index, and
the first light control portion includes
a first light control surface in a first direction different from the depth direction of the semiconductor substrate, wherein the first light control surface is along a first crystal plane represented by the plane index, and
a second light control surface in a second direction different from the depth direction of the semiconductor substrate wherein the second light control surface is along a second crystal plane represented by the plane index.

5. The imaging apparatus according to claim 1, wherein
a plurality of vertical electrodes are for each pixel of the pixels, and
the first light control portion is at a position that overlaps the plurality of vertical electrodes in a case where the semiconductor substrate is seen in the plan view from the normal direction of the first surface, and
the plurality of vertical electrodes includes the vertical electrode.

6. The imaging apparatus according to claim 5,
wherein an end side of the first light control portion is substantially in parallel with an end side of the second light control portion in a case where the semiconductor substrate is seen in the plan view from the normal direction of the first surface.

7. The imaging apparatus according to claim 5,
wherein an end side of the charge holding unit is substantially in parallel with a least one of the end side of the first light control portion and the end side of the second light control portion in a case where the semiconductor substrate is seen in the plan view from the normal direction of the first surface.

8. The imaging apparatus according to claim 1,
wherein the second light control portion is in the depth direction of the semiconductor substrate toward the first light control portion from a side of the second surface.

9. The imaging apparatus according to claim 1,
wherein the second light control portion is in the depth direction of the semiconductor substrate toward the first light control portion from a side of the first surface.

10. The imaging apparatus according to claim 1,
wherein the first light control portion has a shape corresponding to an extension direction, extension length, and number of the second light control portion.

11. The imaging apparatus according to claim 1,
wherein one end portion of the second light control portion is connected to the first light control portion.

12. The imaging apparatus according to claim 1,
wherein the second light control portion is in the depth direction of the semiconductor substrate so as to penetrate the first light control portion.

13. The imaging apparatus according to claim 1,
wherein at least one of the first light control portion and the second light control portion has a property of absorbing or reflecting incident light.

14. The imaging apparatus according to claim 13,
wherein at least one of the first light control portion and the second light control portion includes an insulator, a metal, polysilicon, a metal oxide, a carbon-containing material, or an electrochromic material.

15. The imaging apparatus according to claim 1, further comprising:
a second light control member on a side closer to the first surface of the semiconductor substrate than to the first light control member, wherein the second light control member is surround the charge holding unit.

16. The imaging apparatus according to claim 15, wherein
the second light control member includes
a third light control portion along a direction of the first surface, and
a fourth light control portion connected to the third light control portion, wherein the fourth light control portion is in a direction that intersects the third light control portion.

17. The imaging apparatus according to claim 16, wherein
a first end portion of the fourth light control portion is connected to the third light control portion, and
a second end portion of the fourth light control portion is along the first surface.

18. The imaging apparatus according to claim 16,
wherein the fourth light control portion penetrates the third light control portion and extends in the depth direction of the semiconductor substrate.

19. An imaging apparatus manufacturing method, comprising:
forming a photoelectric conversion unit in a semiconductor substrate, wherein the photoelectric conversion unit is configured to generate charge corresponding to an amount of received light by photoelectric conversion;
forming a charge holding unit configured to hold the charge transferred from the photoelectric conversion unit on a side closer to a first surface of the semiconductor substrate than to the photoelectric conversion unit;
forming a charge transfer unit configured to transfer the charge from the photoelectric conversion unit to the charge holding unit;
forming a vertical electrode in a depth direction of the semiconductor substrate, wherein the vertical electrode is configured to transmit the charge generated by the photoelectric conversion unit to the charge transfer unit; and
forming a first light control member at a position overlapping the vertical electrode when seen in a plan view from a normal direction of the first surface of the semiconductor substrate, wherein
the first light control member is in a pixel region without straddling a boundary between pixels, and
the first light control member includes
a first light control portion on a side closer to a second surface of the semiconductor substrate than to the vertical electrode,
the first light control portion is along the second surface of the semiconductor substrate, the second surface of the semiconductor substrate is opposite to the first surface of the semiconductor substrate, and a second light control portion, connected to the first light control portion, extends in the depth direction of the semiconductor substrate.

20. Electronic equipment, comprising:

an imaging apparatus, wherein the imaging apparatus includes a semiconductor substrate, a photoelectric conversion unit in the semiconductor substrate, wherein the photoelectric conversion unit is configured to generate charge corresponding to an amount of received light by photoelectric conversion, a charge holding unit on a side closer to a first surface of the semiconductor substrate than to the photoelectric conversion unit, wherein the charge holding unit is configured to hold the charge transferred from the photoelectric conversion unit, a charge transfer unit configured to transfer the charge from the photoelectric conversion unit to the charge holding unit, a vertical electrode in a depth direction of the semiconductor substrate, wherein the vertical electrode is configured to transmit the charge generated by the photoelectric conversion unit to the charge transfer unit, and a first light control member at a position overlapping the vertical electrode in a case where the semiconductor substrate is seen in a plan view from a normal direction of the first surface, wherein the first light control member is in a pixel region without straddling a boundary between pixels, and the first light control member includes a first light control portion on a side closer to a second surface of the semiconductor substrate than to the vertical electrode, the first light control portion is along the second surface of the semiconductor substrate, the second surface of the semiconductor substrate is opposite to the first surface of the semiconductor substrate, and a second light control portion, connected to the first light control portion, extends in the depth direction of the semiconductor substrate.

* * * * *